United States Patent
Shinkai et al.

(10) Patent No.: US 9,785,006 B2
(45) Date of Patent: Oct. 10, 2017

(54) DISPLAY APPARATUS AND ILLUMINATION UNIT

(71) Applicant: Sony Corporation, Tokyo (JP)

(72) Inventors: Shogo Shinkai, Kanagawa (JP); Akira Ebisui, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/418,769

(22) PCT Filed: Jul. 25, 2013

(86) PCT No.: PCT/JP2013/070130
§ 371 (c)(1),
(2) Date: Jan. 30, 2015

(87) PCT Pub. No.: WO2014/024688
PCT Pub. Date: Feb. 13, 2014

(65) Prior Publication Data
US 2015/0293402 A1   Oct. 15, 2015

(30) Foreign Application Priority Data
Aug. 8, 2012   (JP) ................... 2012-176490

(51) Int. Cl.
*G09G 3/36* (2006.01)
*G02F 1/1335* (2006.01)
(Continued)

(52) U.S. Cl.
CPC ....... *G02F 1/133526* (2013.01); *G02B 3/005* (2013.01); *G02B 3/0043* (2013.01);
(Continued)

(58) Field of Classification Search
CPC .............. G02F 1/133526; G02B 3/0043
See application file for complete search history.

(56) References Cited

U.S. PATENT DOCUMENTS

| 8,493,526 B2 | 7/2013 | Uchida et al. |
| 9,494,803 B2 | 11/2016 | Ebisui et al. |

(Continued)

FOREIGN PATENT DOCUMENTS

| JP | 2010-139754 | * | 6/2010 |
| JP | 2011-134560 A | | 7/2011 |

(Continued)

*Primary Examiner* — Sang V Nguyen
(74) *Attorney, Agent, or Firm* — Wolf, Greenfield & Sacks, P.C.

(57) ABSTRACT

An illumination unit of an embodiment of the present technology includes: an illumination optical system configured to generate illumination light; and a plurality of lenses configured to reduce a divergence angle of the illumination light. The illumination optical system includes: a light source (20) configured to apply light onto an end surface of one of a first substrate and a second substrate; and a light modulation layer (30) provided in a gap between the first substrate and the second substrate. The illumination optical system includes an electrode configured to generate an electric filed that generates, in the light modulation layer (30), a plurality of linear scattering regions (30B) in a three-dimensional mode, and to generate an electric field that generates, in the light modulation layer, a planar scattering region in a two-dimensional display mode. The lenses are arranged side by side in a direction in which the linear scattering regions extend, and are also arranged side by side in a direction intersecting with the direction in which the linear scattering regions extend.

10 Claims, 66 Drawing Sheets

(51) Int. Cl.
G02B 27/22 (2006.01)
H04N 13/04 (2006.01)
G09G 3/00 (2006.01)
G09G 3/34 (2006.01)
G02B 3/00 (2006.01)
G02F 1/1347 (2006.01)
F21V 8/00 (2006.01)
G02F 1/1334 (2006.01)

(52) U.S. Cl.
CPC ..... *G02B 27/2214* (2013.01); *G02F 1/13476* (2013.01); *G02F 1/133504* (2013.01); *G02F 1/133528* (2013.01); *G09G 3/003* (2013.01); *G09G 3/3406* (2013.01); *G09G 3/36* (2013.01); *H04N 13/0404* (2013.01); *H04N 13/0406* (2013.01); *H04N 13/0409* (2013.01); *H04N 13/0411* (2013.01); *H04N 13/0415* (2013.01); *H04N 13/0454* (2013.01); *G02B 6/0038* (2013.01); *G02B 6/0046* (2013.01); *G02B 6/0061* (2013.01); *G02B 6/0068* (2013.01); *G02B 6/0071* (2013.01); *G02F 1/1334* (2013.01); *G02F 1/1336* (2013.01); *G02F 2001/133626* (2013.01); *H04N 13/0422* (2013.01)

(56) References Cited

U.S. PATENT DOCUMENTS 9,507,197 B2 11/2016 Uchida et al.
2008/0278640 A1* 11/2008 Ijzerman ............ G02B 5/0242
 349/15
2009/0051833 A1* 2/2009 Watanabe ........... G02B 3/0056
 349/8
2010/0039797 A1* 2/2010 Shinkai .............. G02B 3/0006
 362/97.1
2010/0085510 A1* 4/2010 Okuyama ......... G02F 1/133615
 349/65
2010/0328575 A1* 12/2010 Shinkai .............. G02B 5/0215
 349/62
2011/0242146 A1 10/2011 Uchida et al.
2011/0249221 A1* 10/2011 Uchida ................ G02B 6/005
 349/65
2012/0013602 A1* 1/2012 Lee ................... G02B 27/2214
 345/419
2012/0069063 A1* 3/2012 Sato .................. H04N 13/0452
 345/690
2012/0113358 A1* 5/2012 Kashiwagi ........ G02B 27/2214
 349/65
2012/0281273 A1* 11/2012 Shinkai ............ G02F 1/133615
 359/315
2013/0314620 A1* 11/2013 Ebisui .................. G02F 1/1313
 349/1
2014/0192285 A1* 7/2014 Shinkai ............. H04N 13/0402
 349/15
2014/0300528 A1 10/2014 Ebisui et al.

FOREIGN PATENT DOCUMENTS

WO WO 2011/125392 A1 10/2011
WO WO 2013/051464 A1 4/2013

* cited by examiner

[ FIG. 1 ]
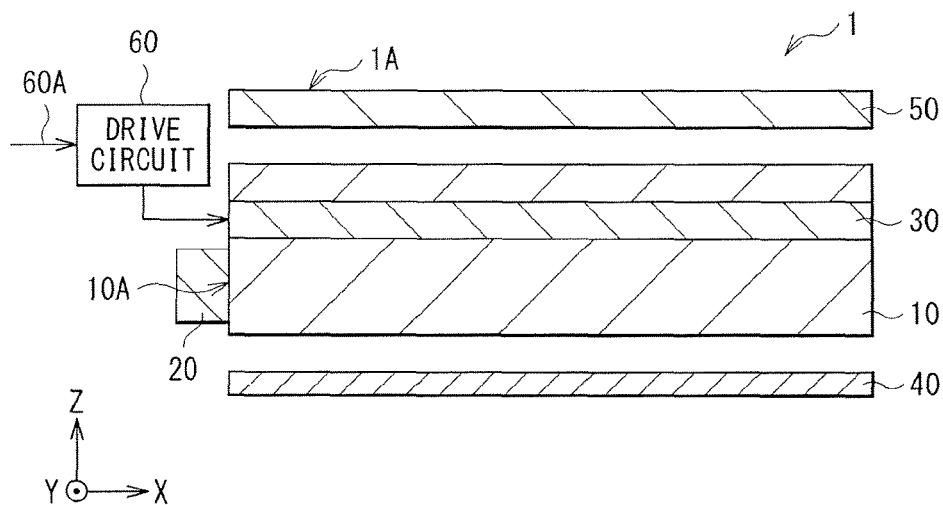
[ FIG. 2 ]
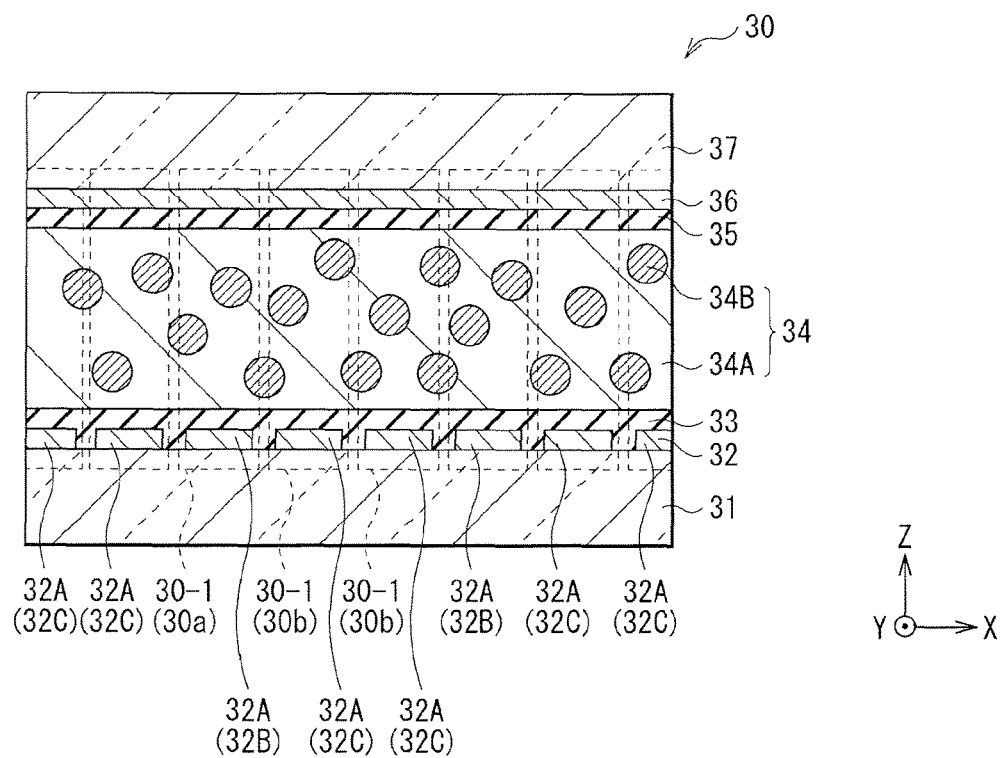

[ FIG. 3 ]
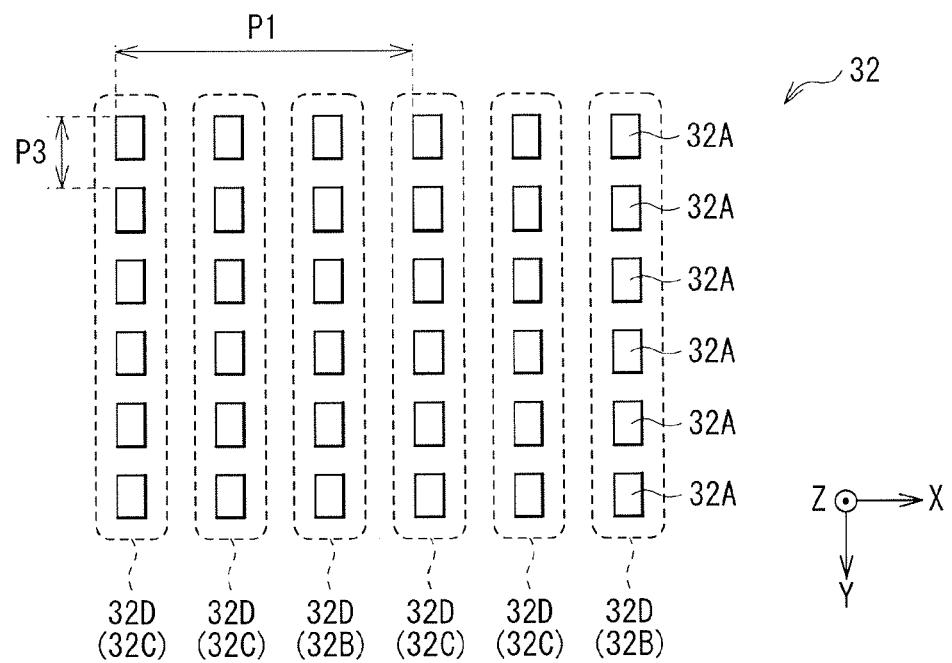

[ FIG. 4A ]
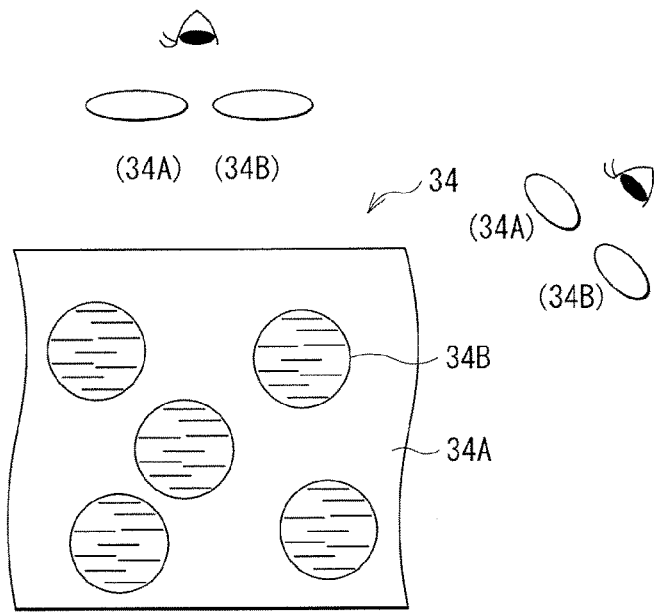
[ FIG. 4B ]
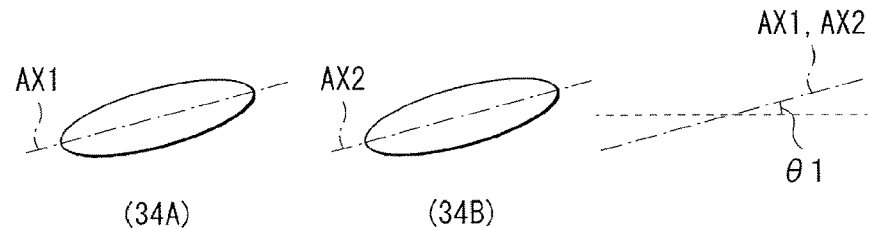
[ FIG. 4C ]
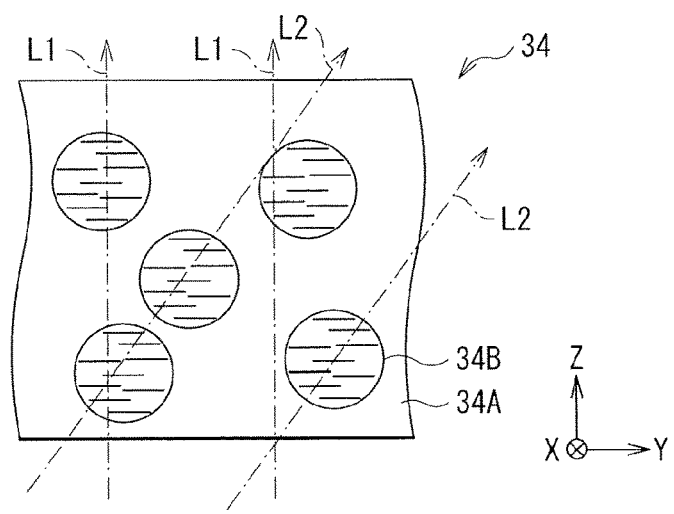

[ FIG. 5A ]
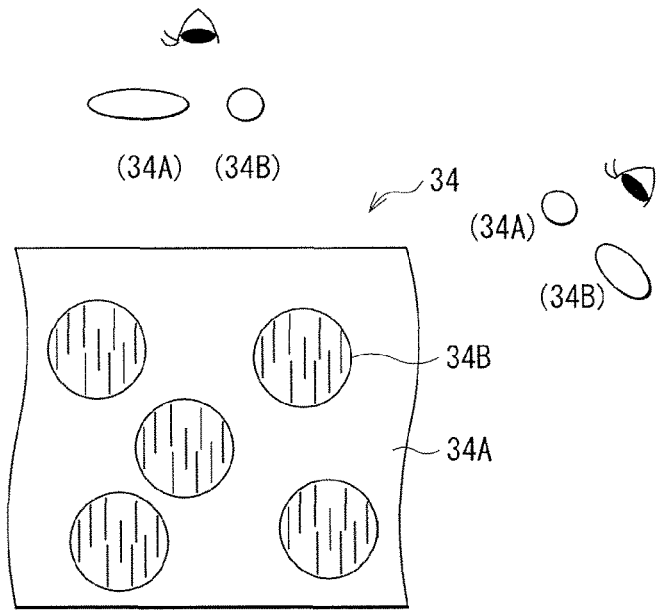
[ FIG. 5B ]
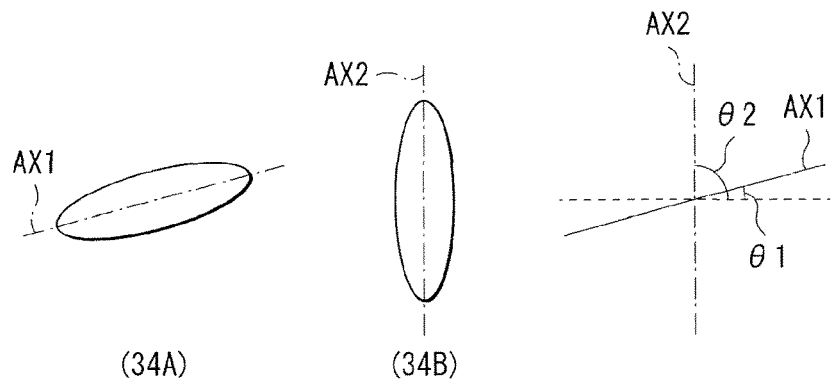
[ FIG. 5C ]
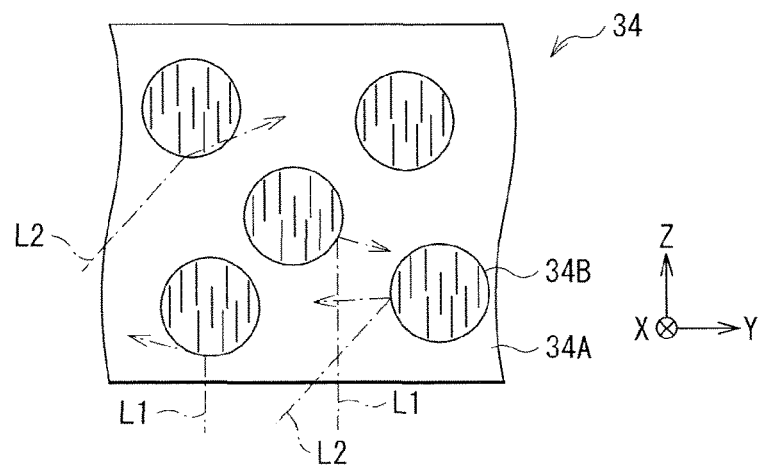

[ FIG. 6 ]
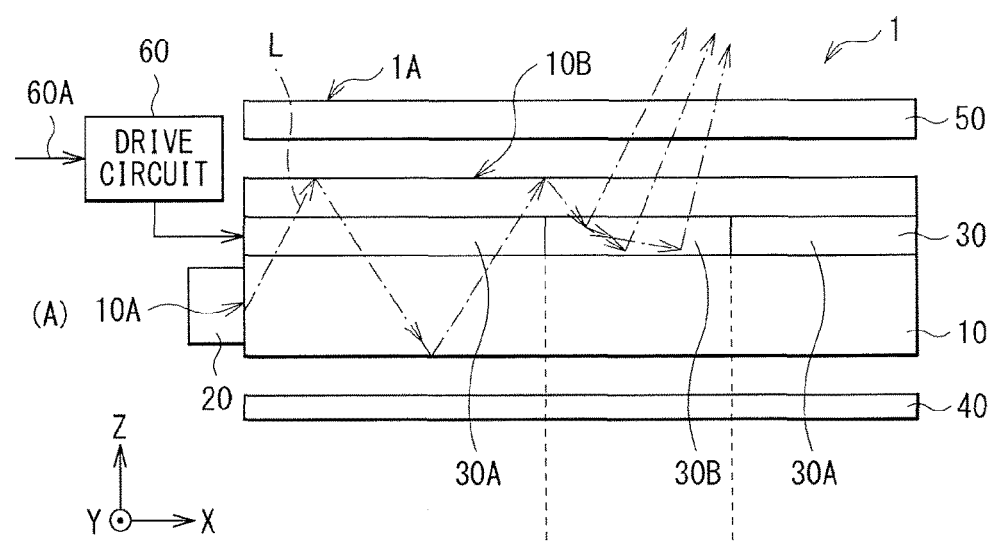
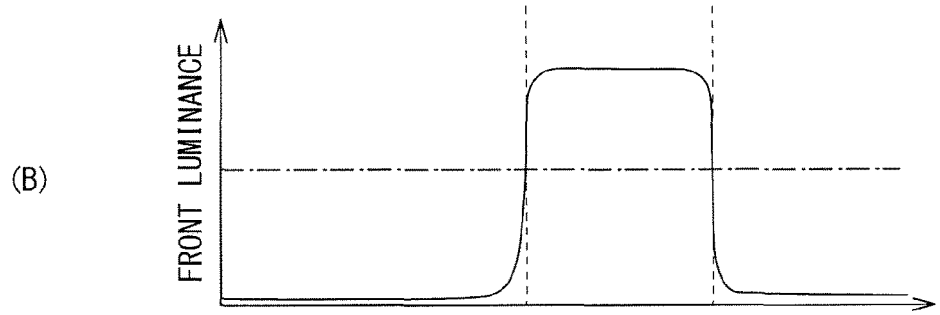

[ FIG. 7 ]
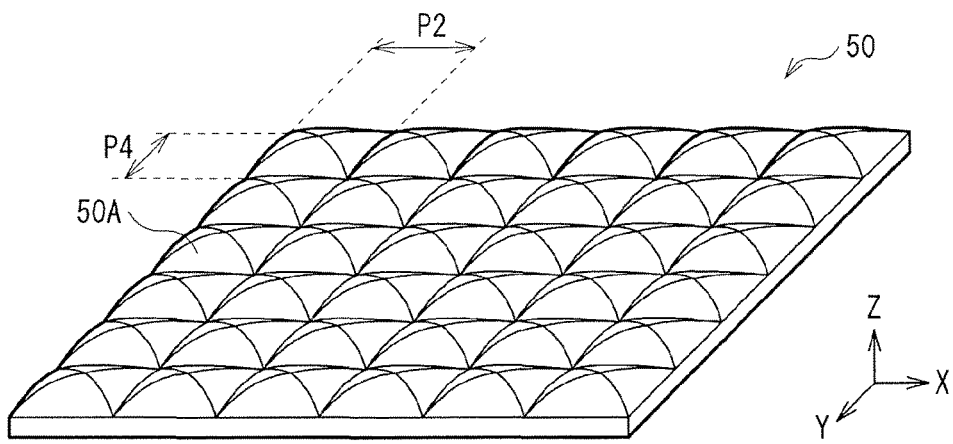
[ FIG. 8 ]
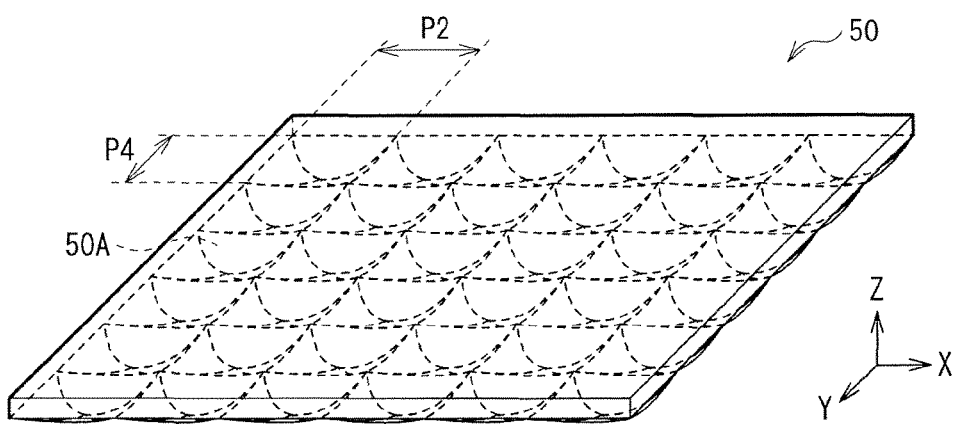
[ FIG. 9A ]
[ FIG. 9B ]

[ FIG. 10 ]
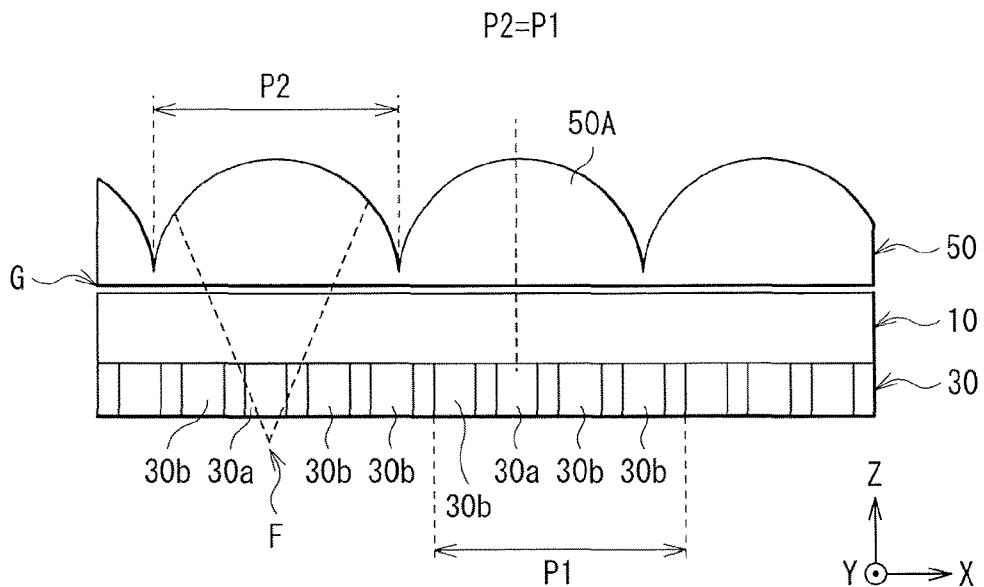
[ FIG. 11 ]
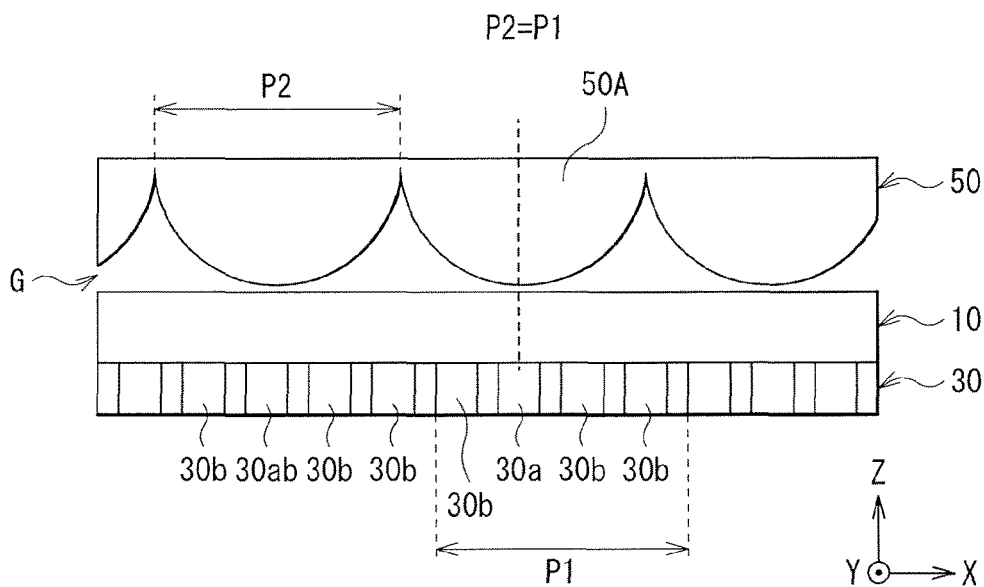

[ FIG. 12 ]
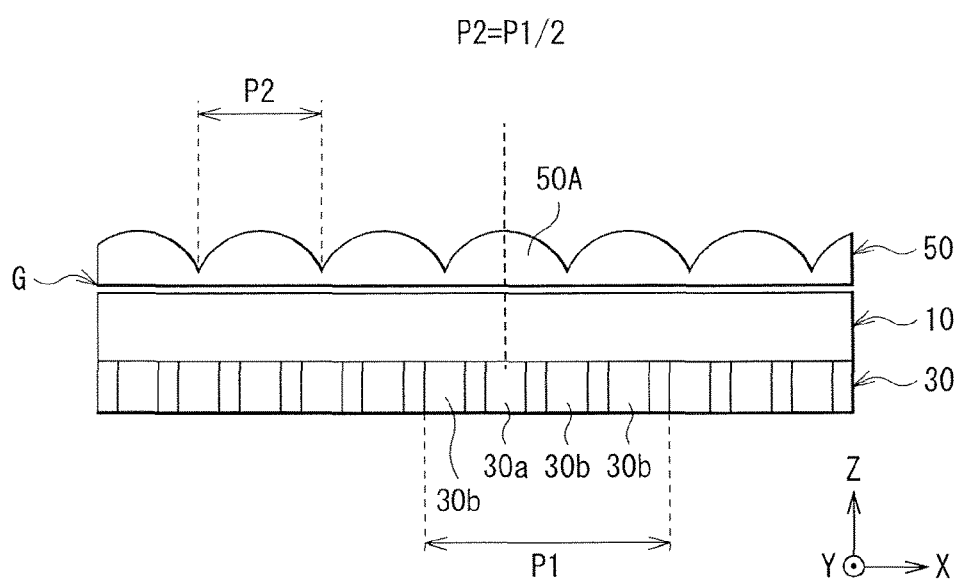
[ FIG. 13 ]
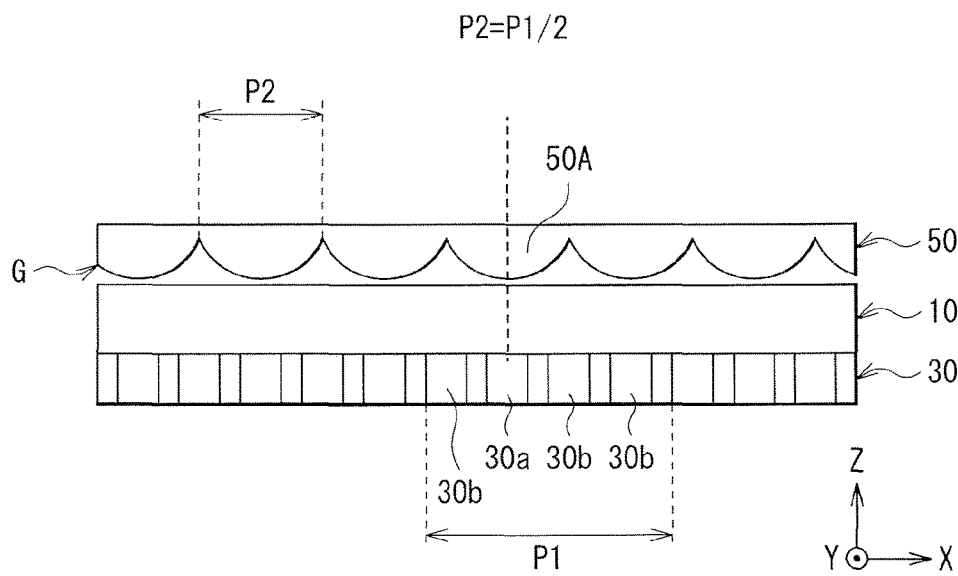

[ FIG. 14 ]
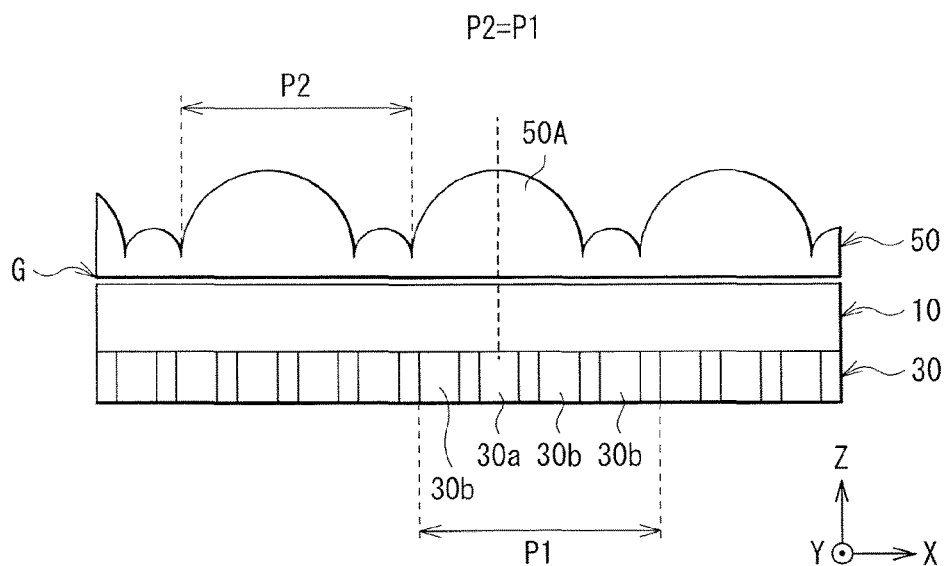
[ FIG. 15 ]
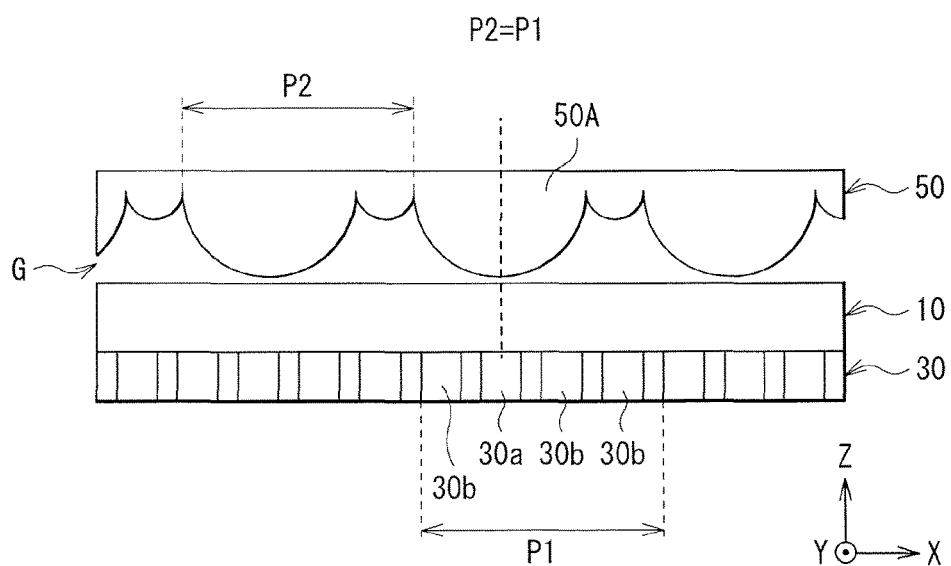

[ FIG. 16 ]
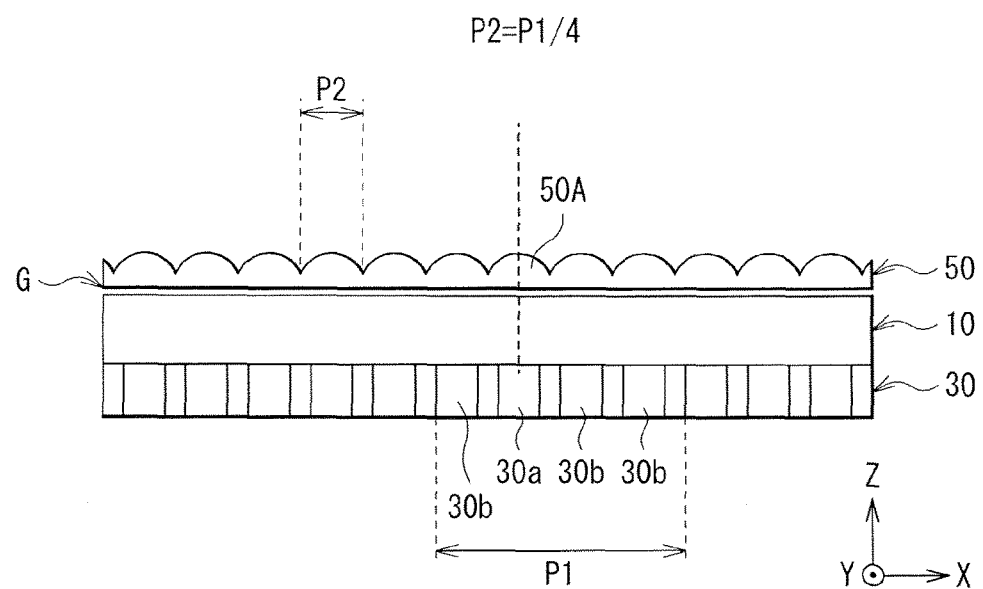
[ FIG. 17 ]
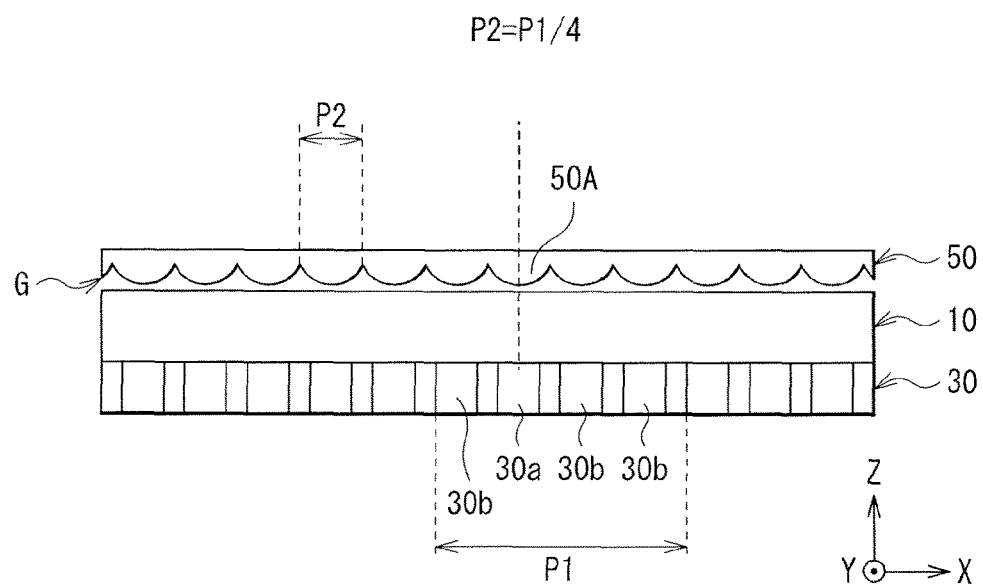

[ FIG. 18 ]
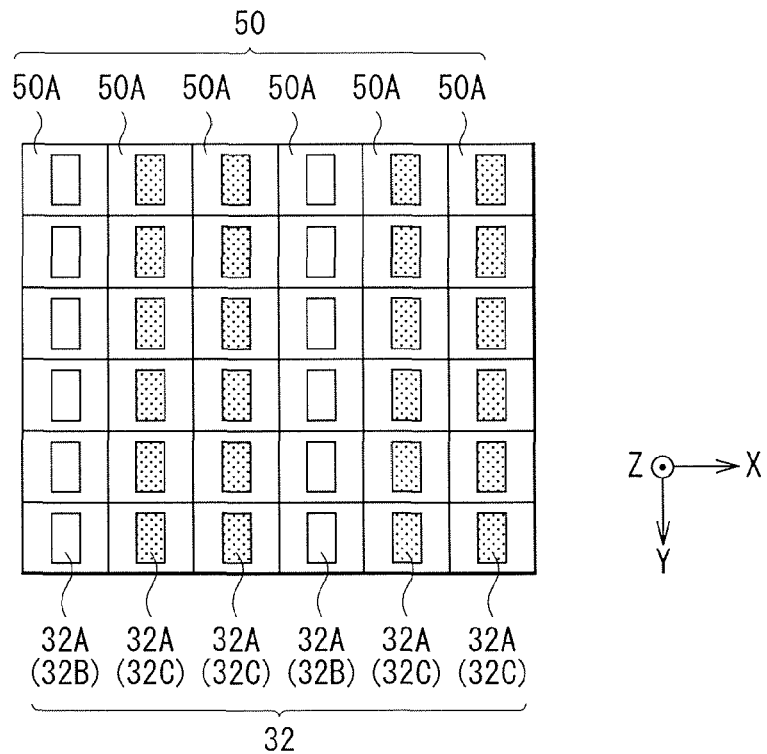
[ FIG. 19 ]
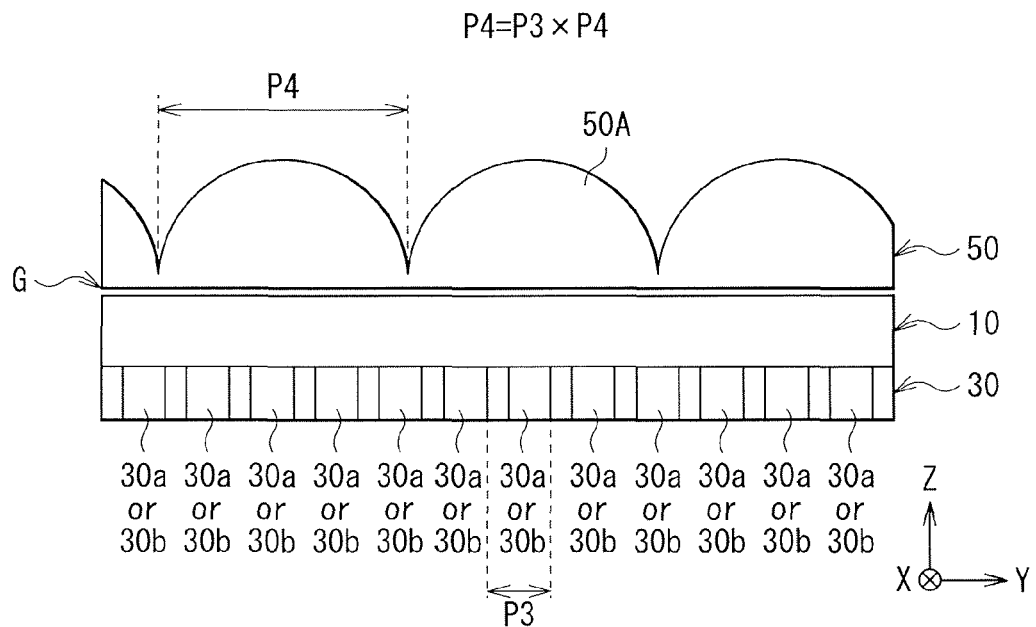

[ FIG. 20 ]
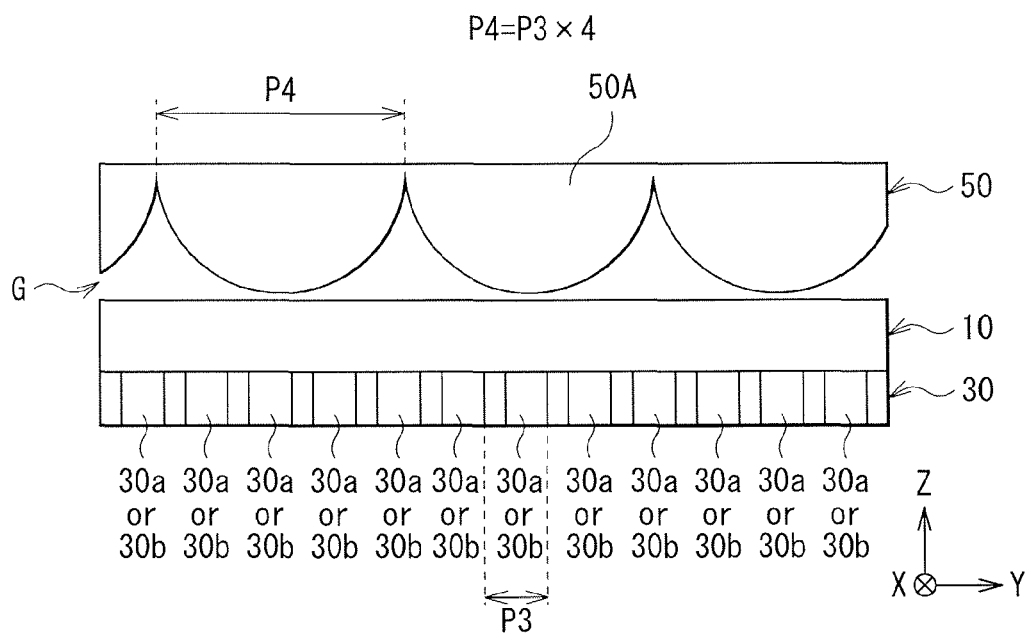
[ FIG. 21 ]
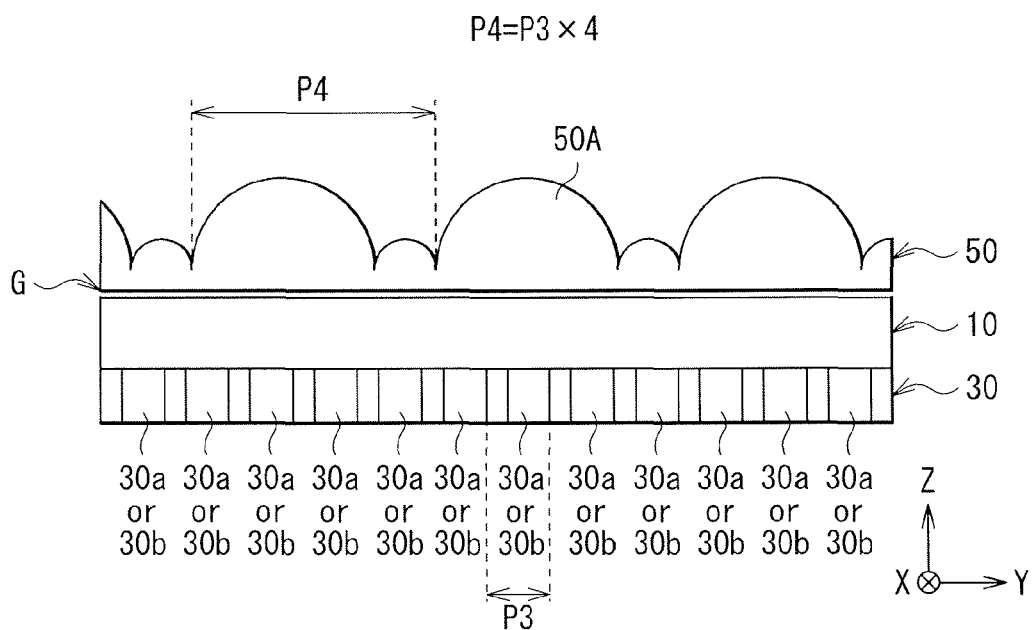

[ FIG. 22 ]
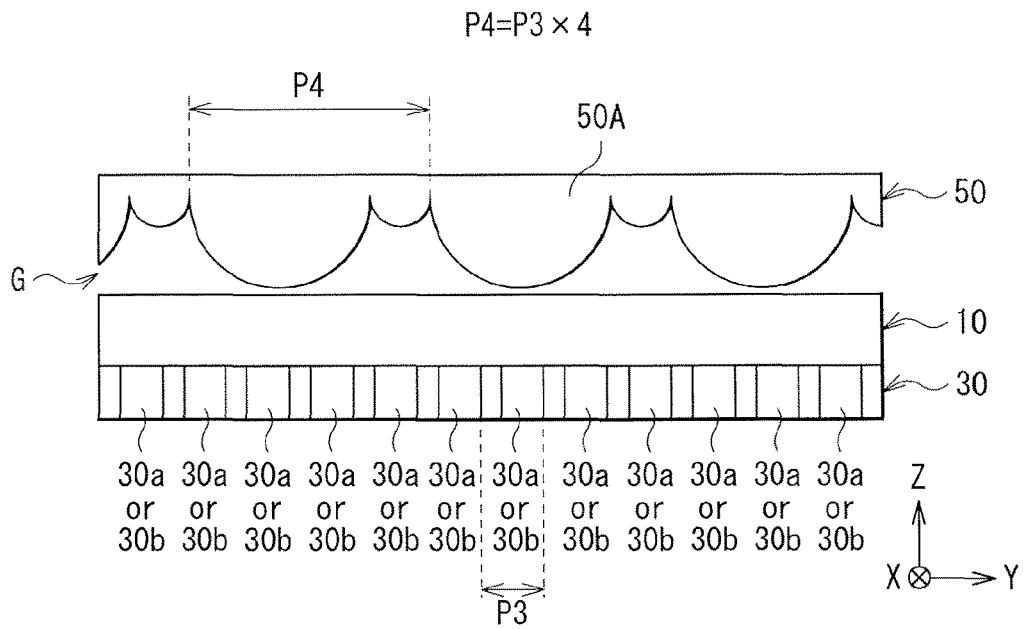
[ FIG. 23 ]
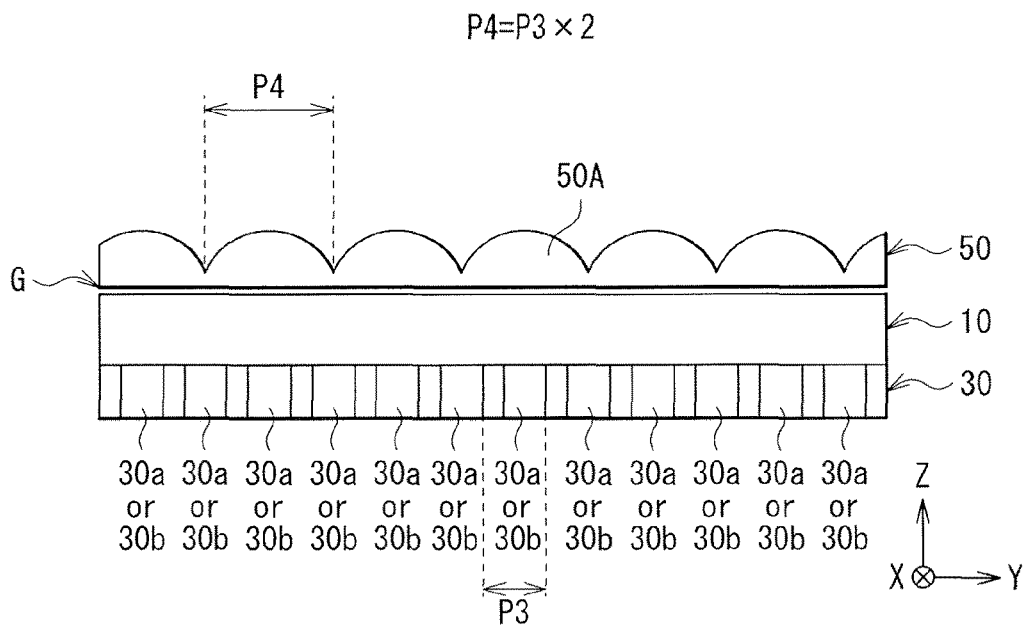

[ FIG. 24 ]
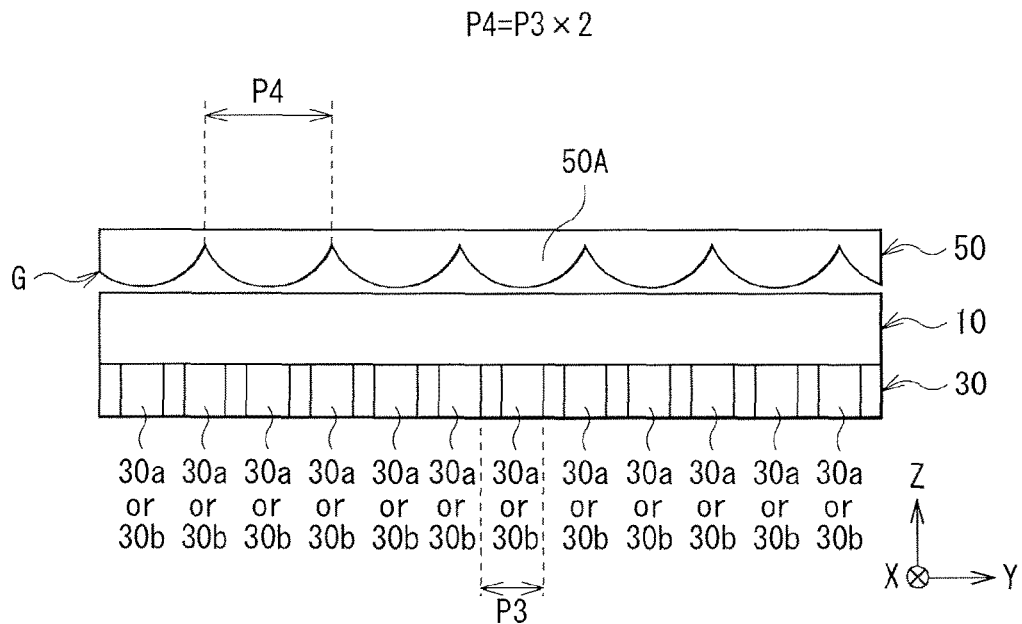
[ FIG. 25 ]
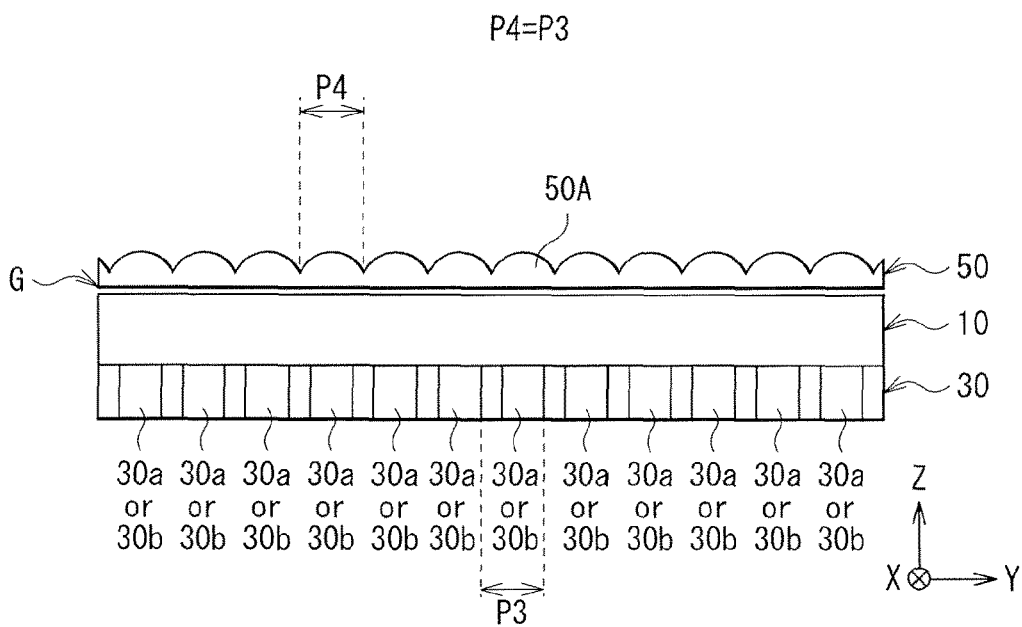

[ FIG. 26 ]
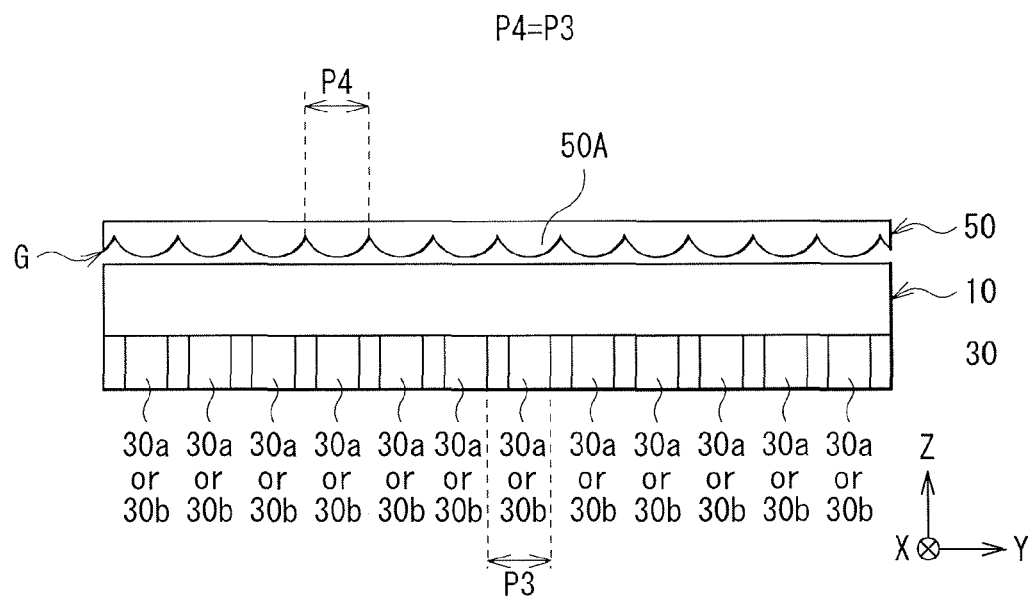
[ FIG. 27 ]
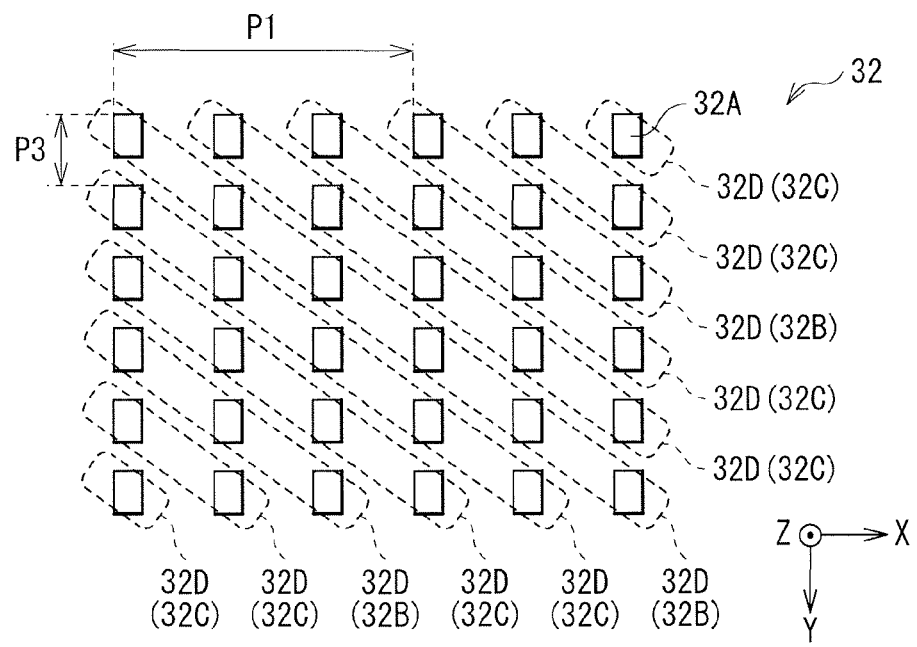

[ FIG. 28A ]
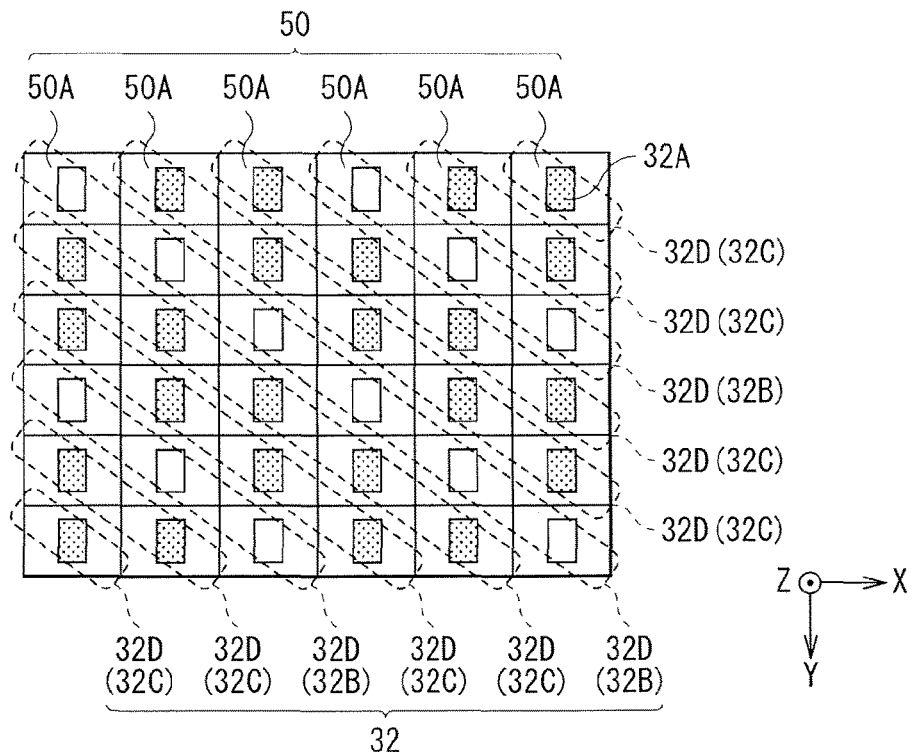
[ FIG. 28B ]
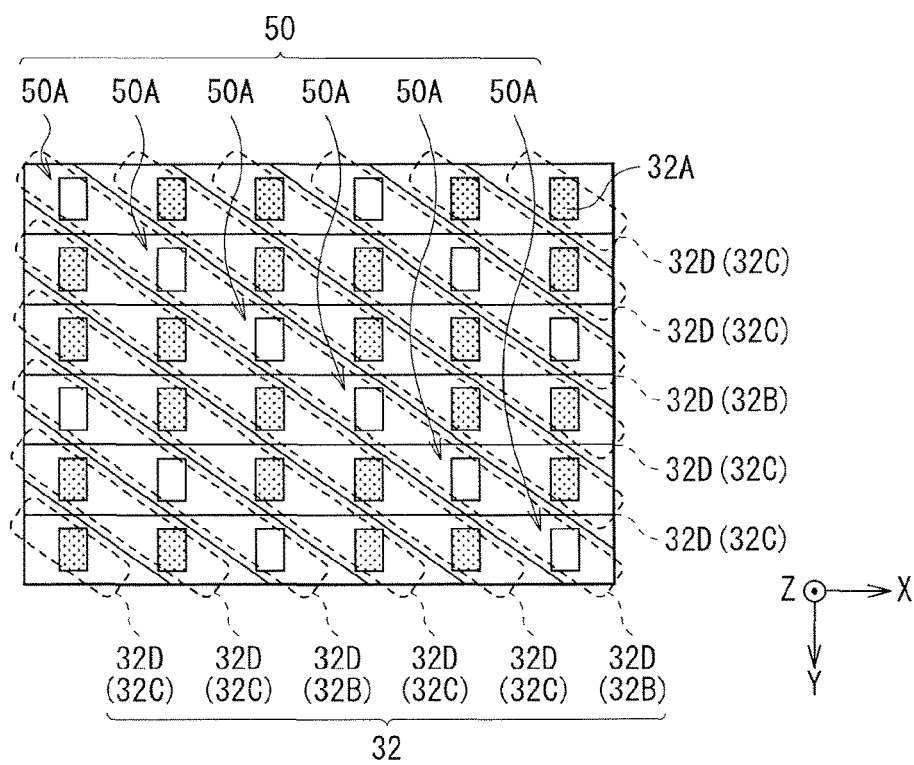

[ FIG. 29 ]
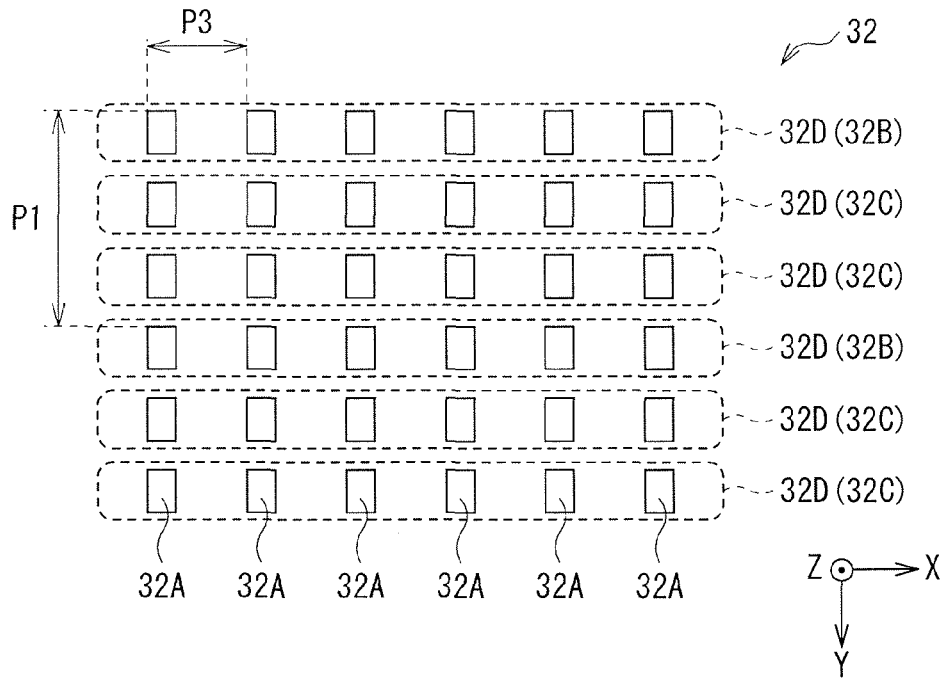
[ FIG. 30 ]
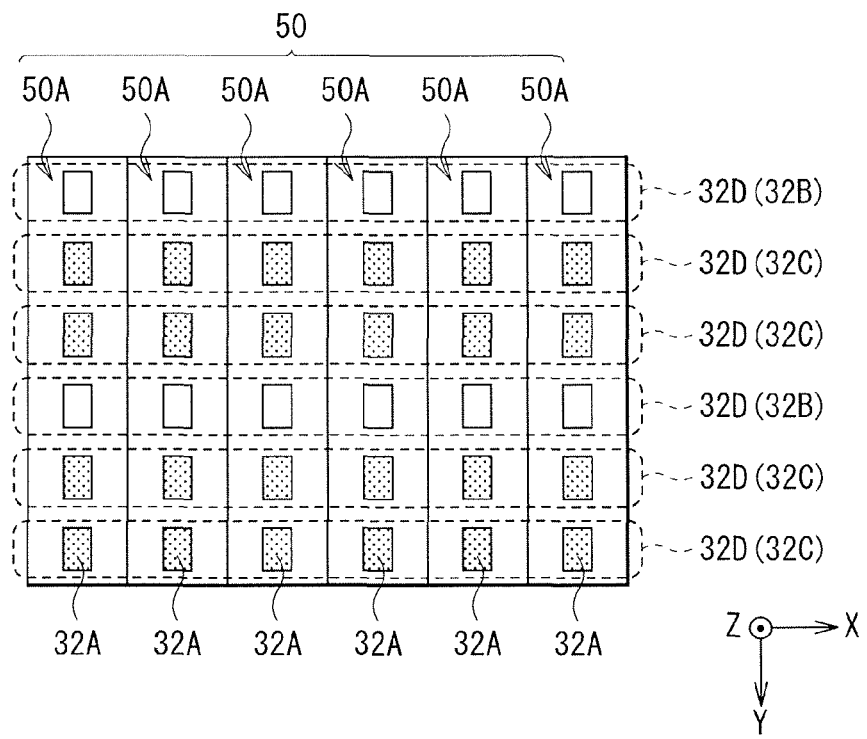

[ FIG. 31 ]
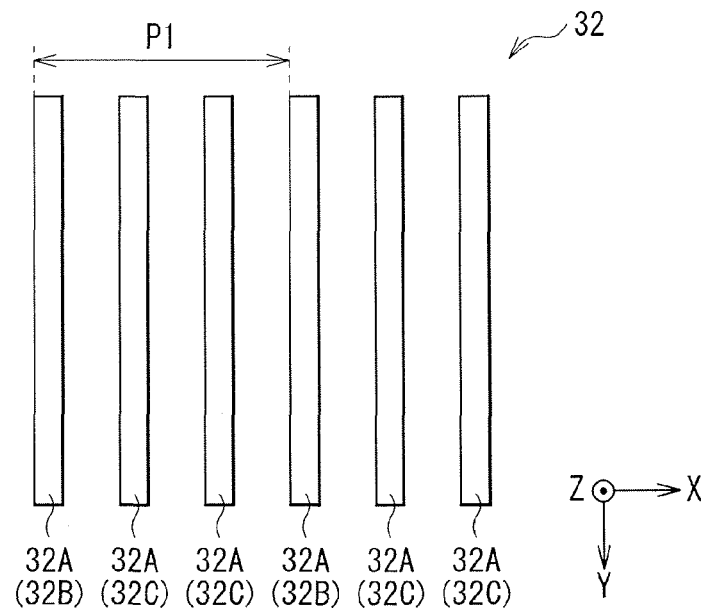
[ FIG. 32 ]
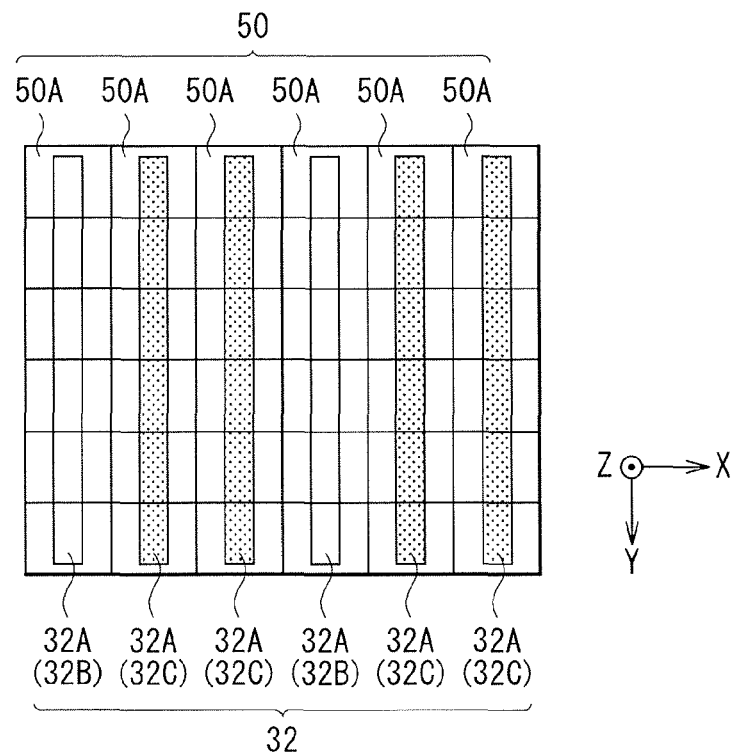

[ FIG. 33 ]
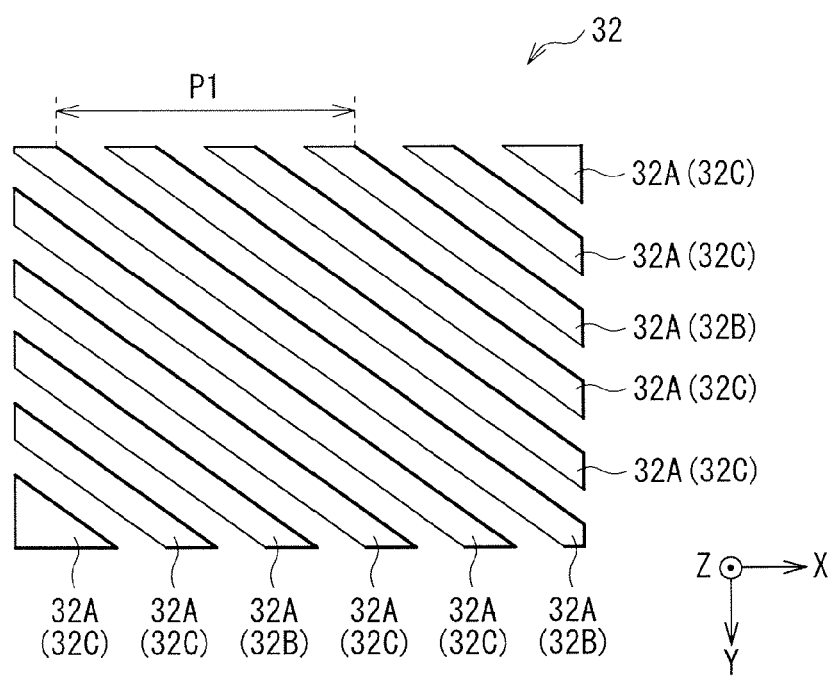

[ FIG. 34A ]
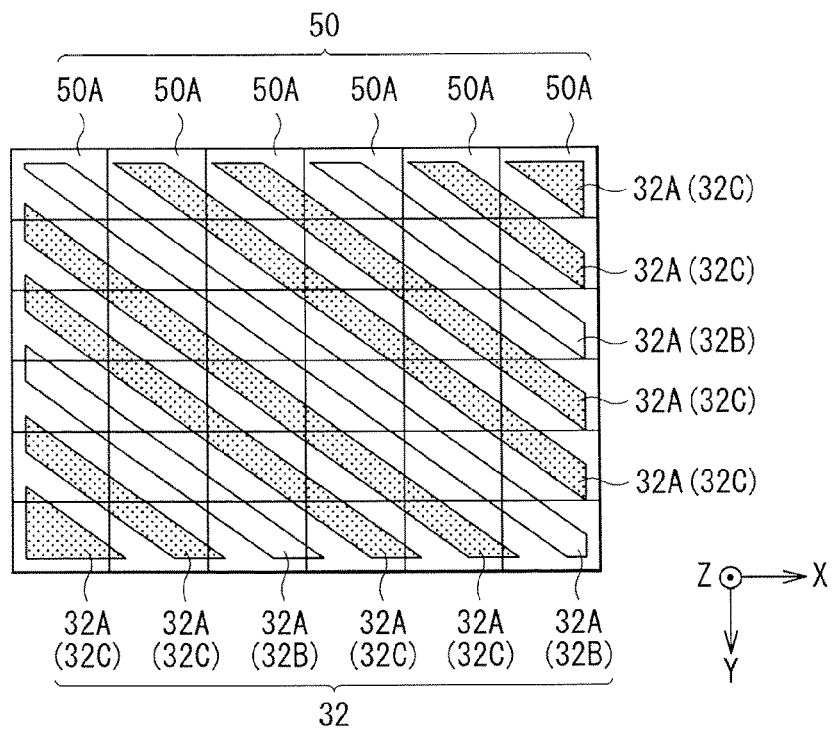
[ FIG. 34B ]
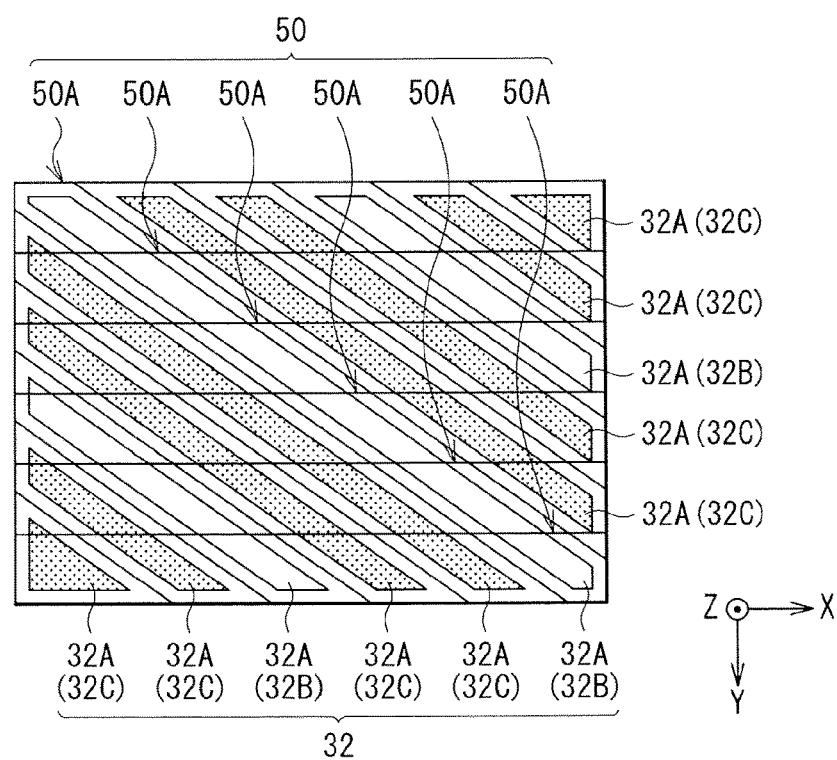

[ FIG. 35 ]
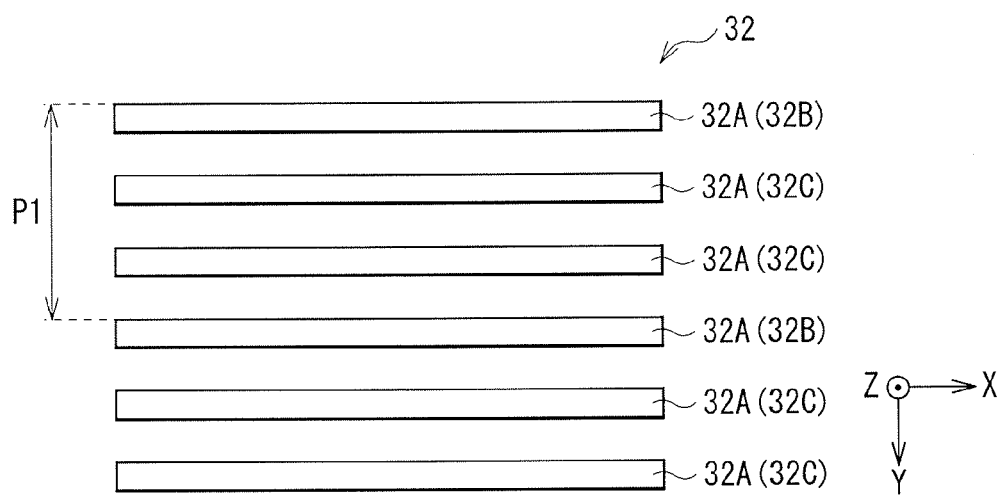
[ FIG. 36 ]
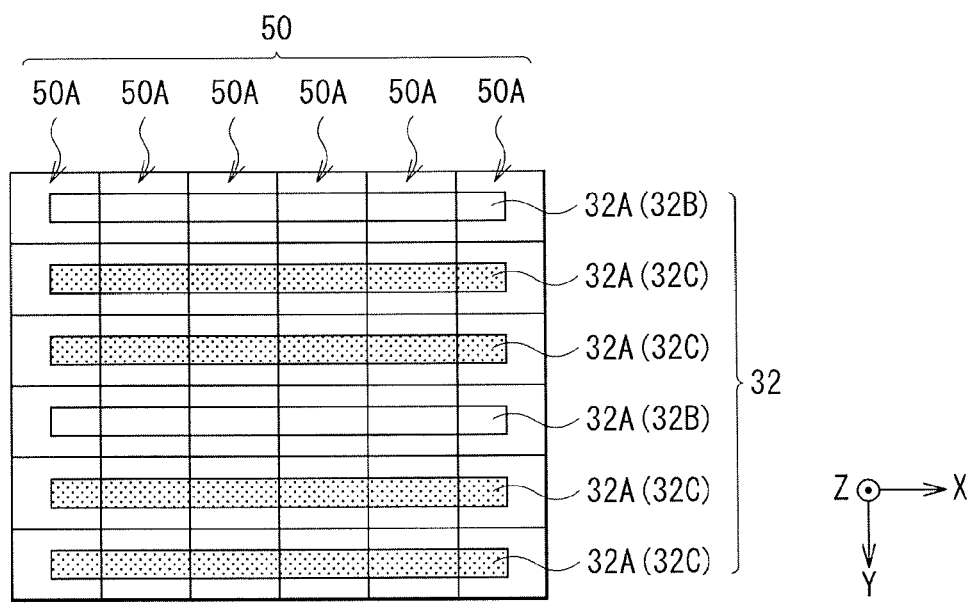

[ FIG. 37 ]
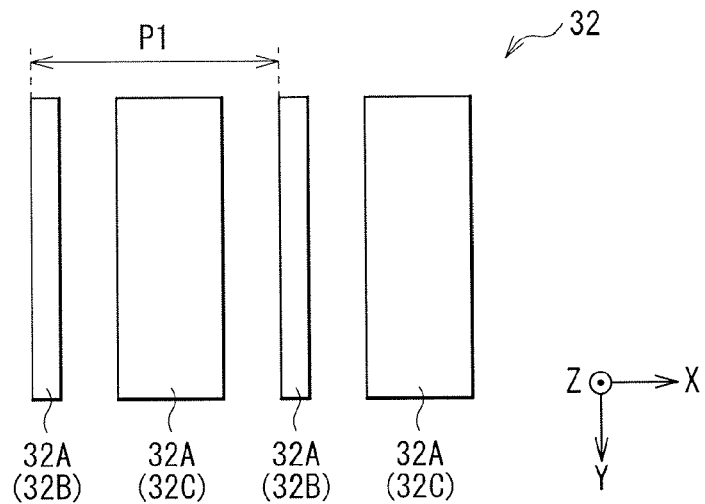
[ FIG. 38 ]
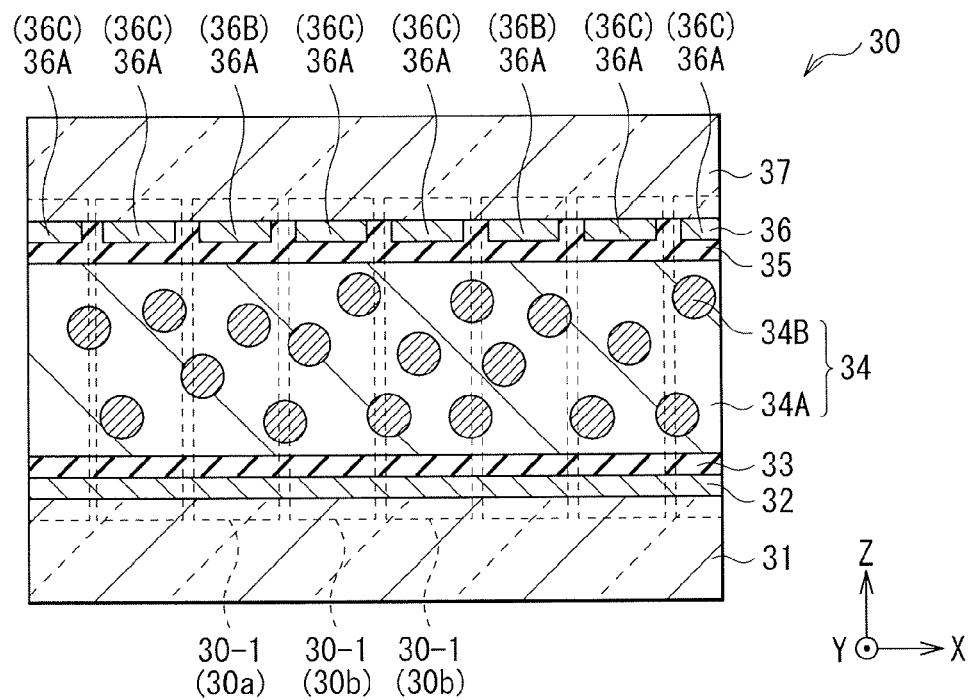

[ FIG. 39 ]
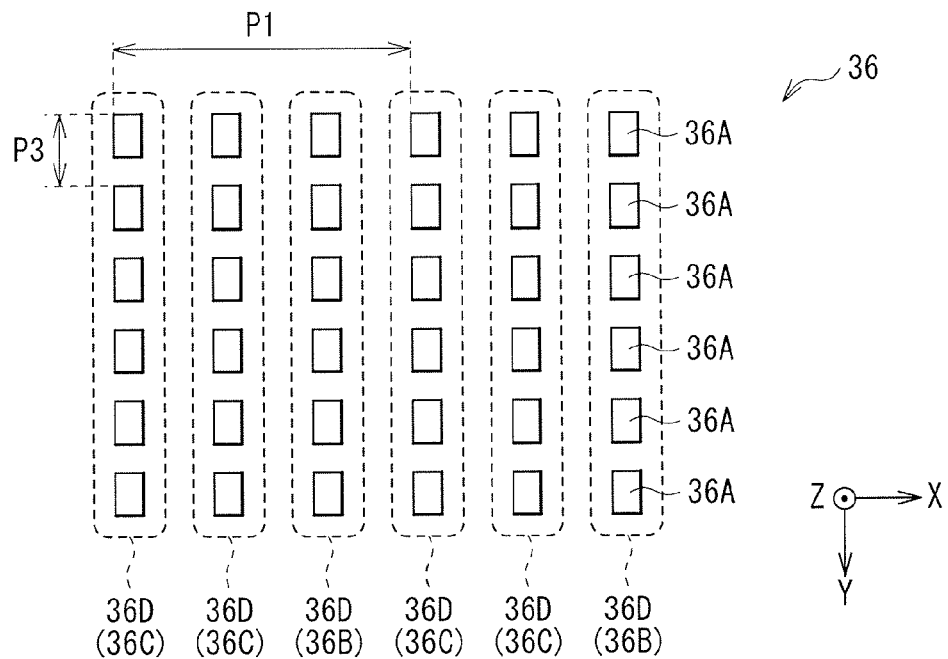
[ FIG. 40 ]
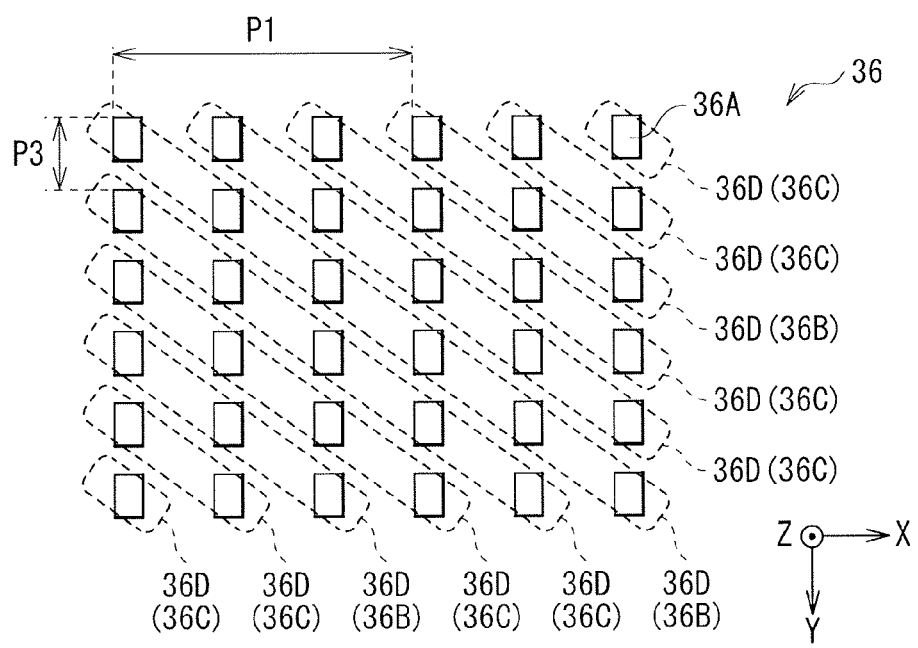

[ FIG. 41 ]
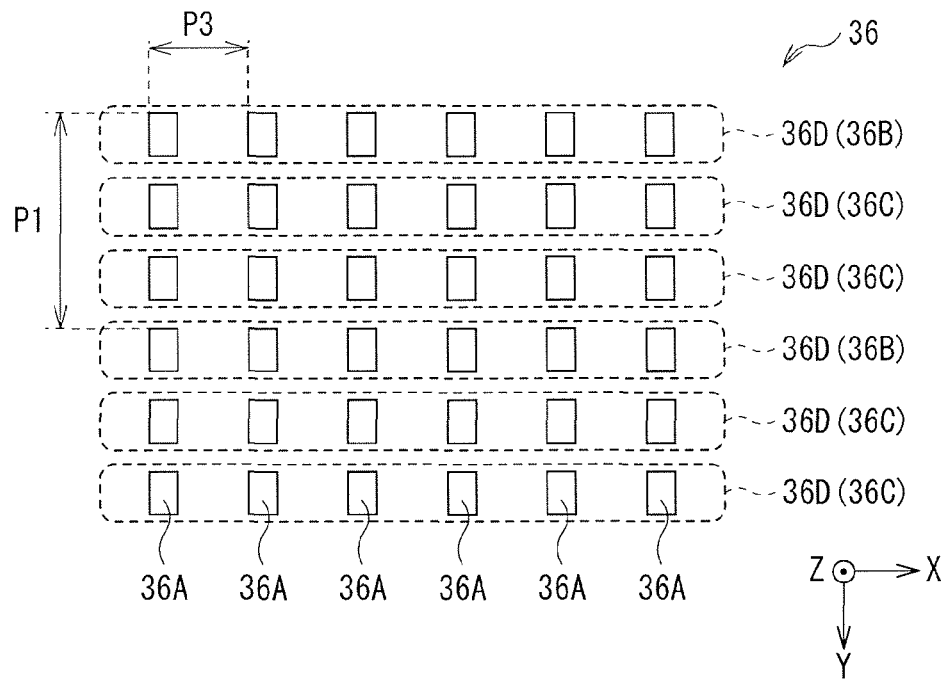
[ FIG. 42 ]
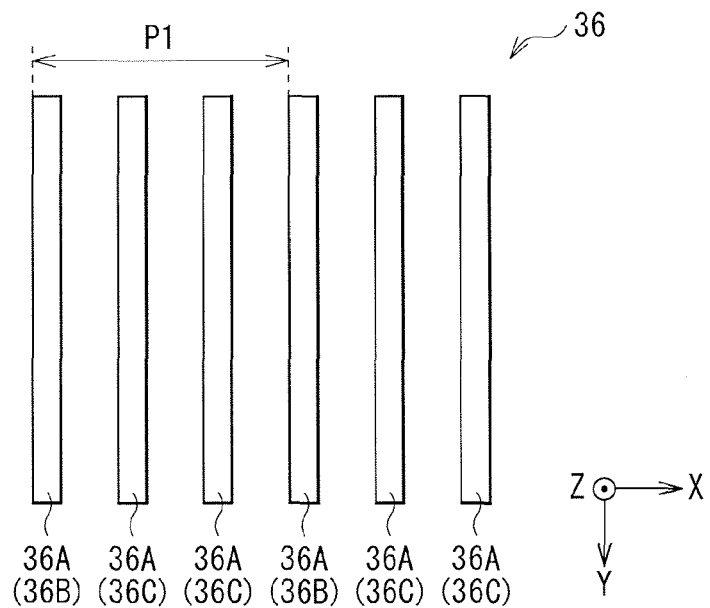

[ FIG. 43 ]
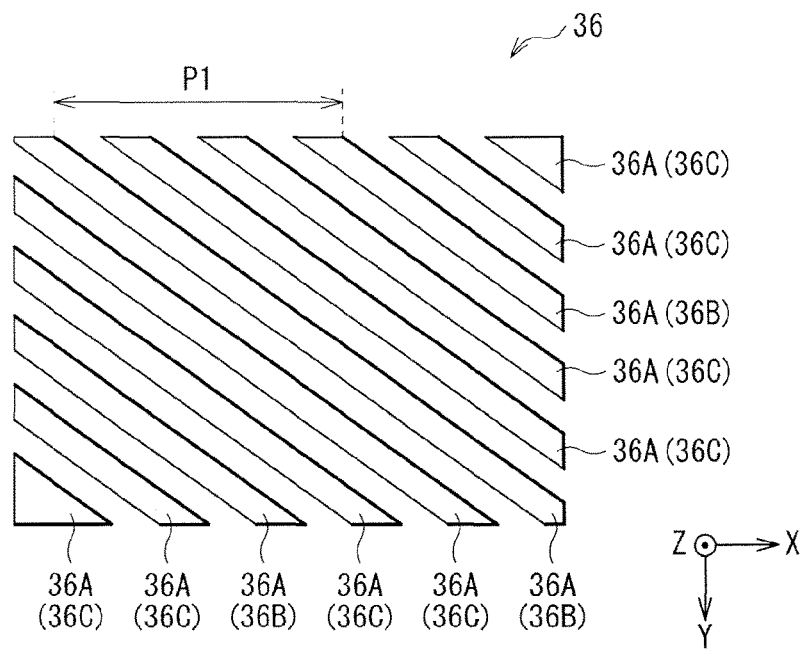
[ FIG. 44 ]
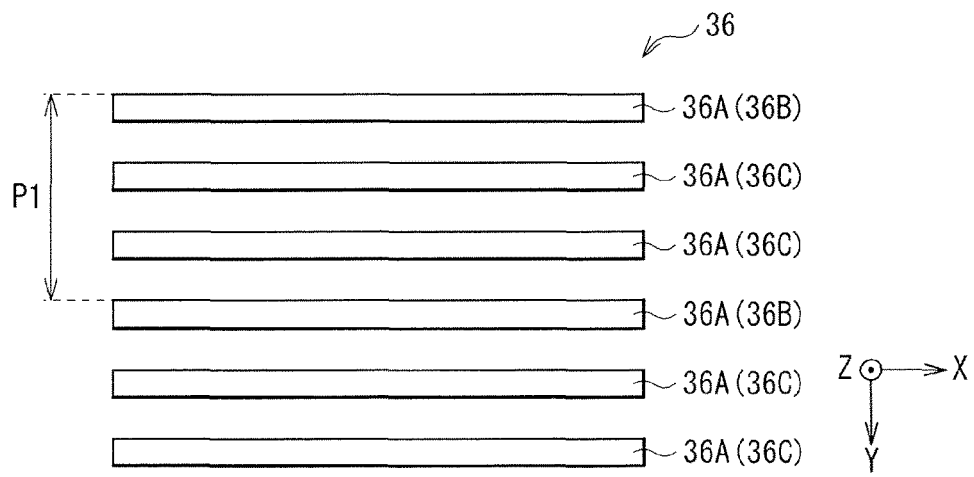

[ FIG. 45 ]
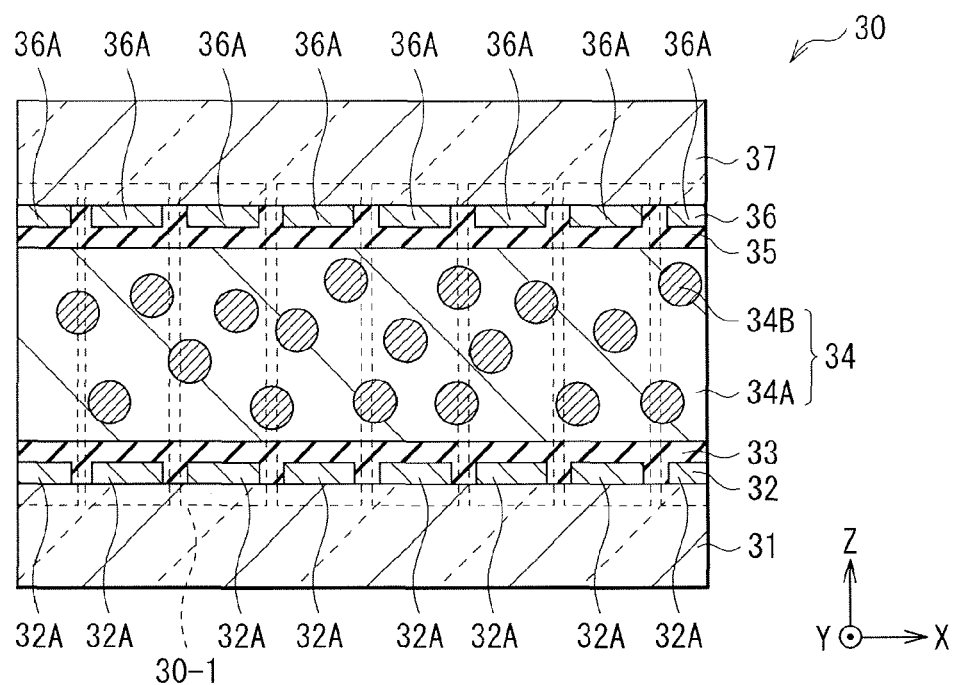
[ FIG. 46 ]
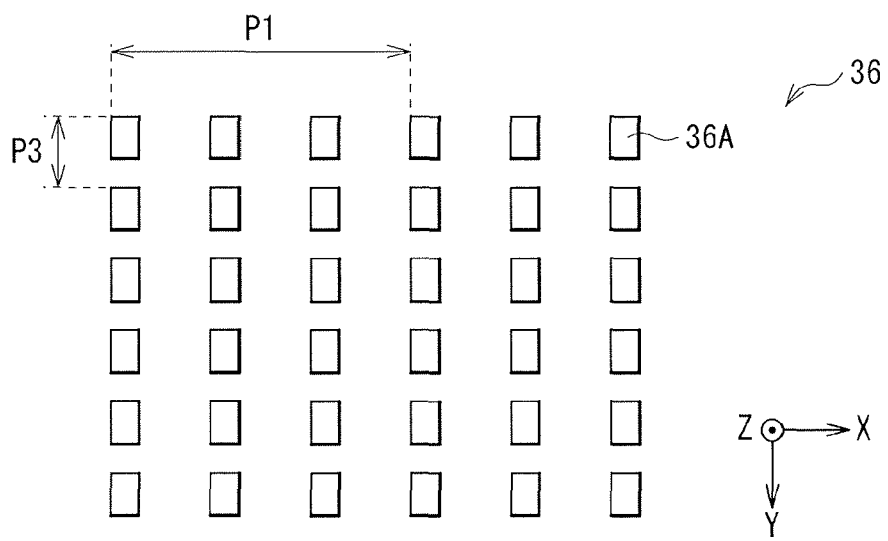

[ FIG. 47 ]
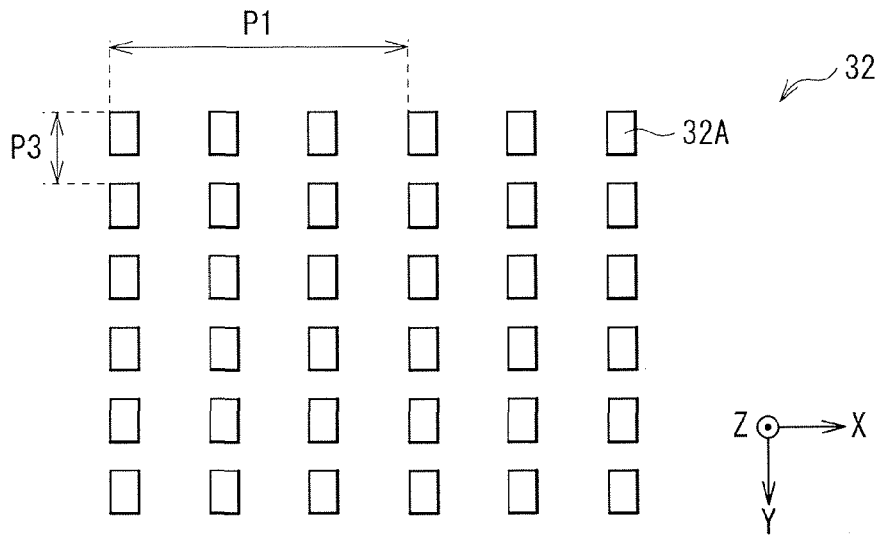
[ FIG. 48 ]
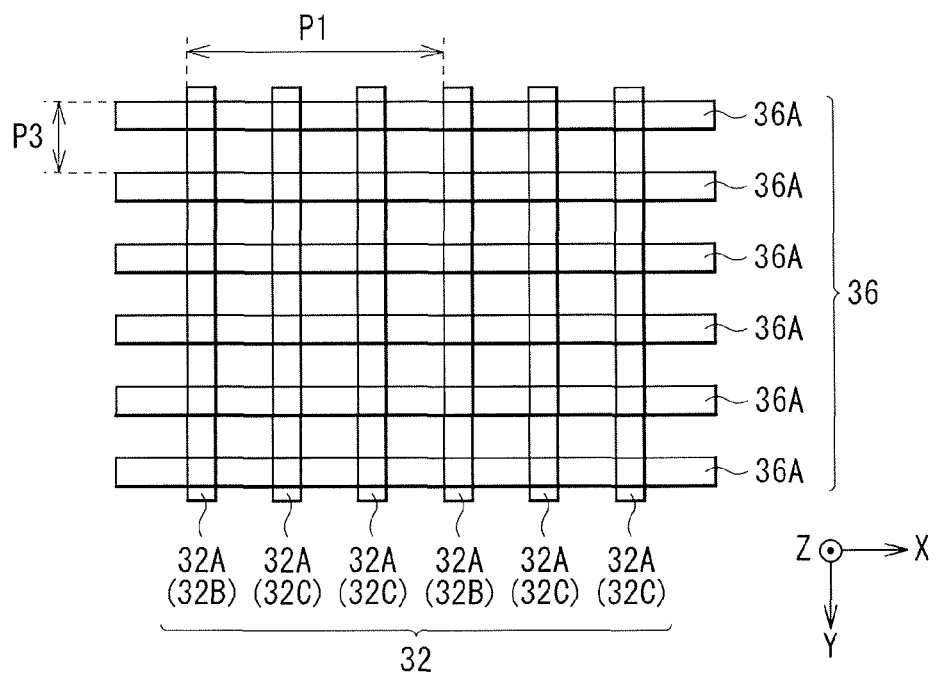

[ FIG. 49 ]
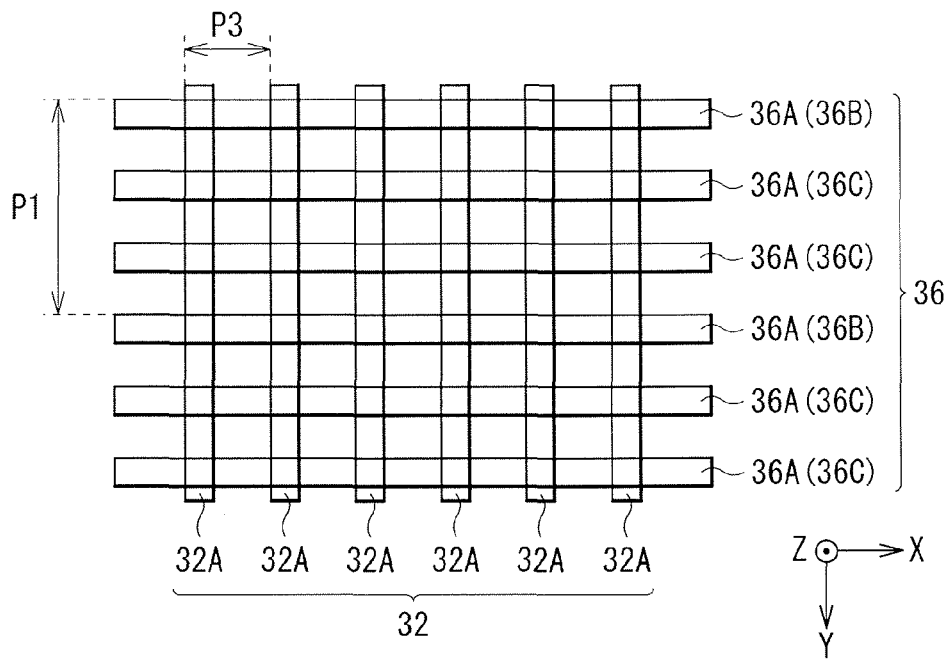
[ FIG. 50 ]
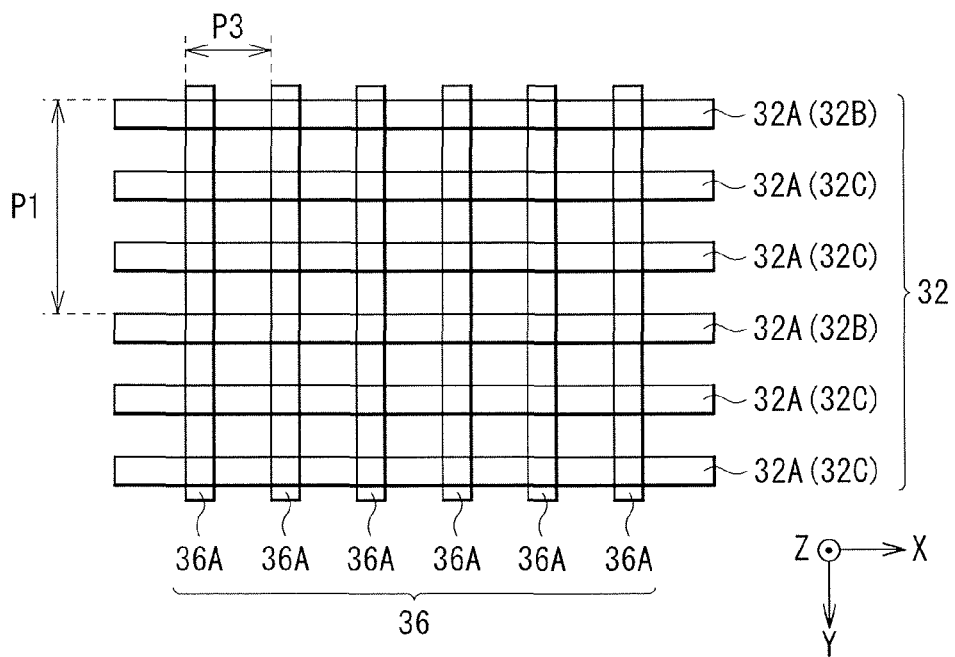

[ FIG. 51 ]
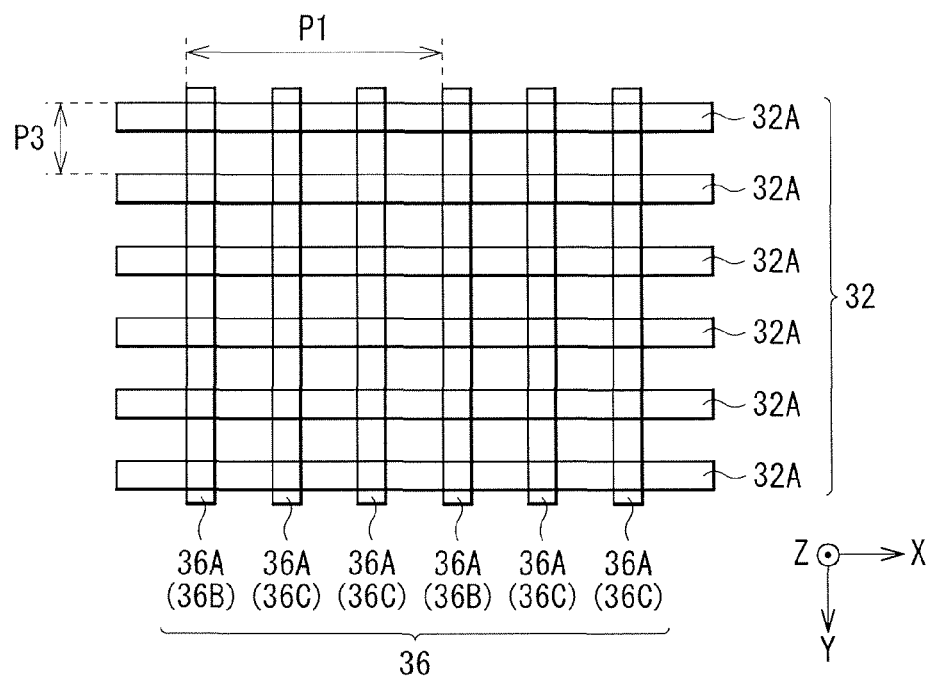
[ FIG. 52 ]
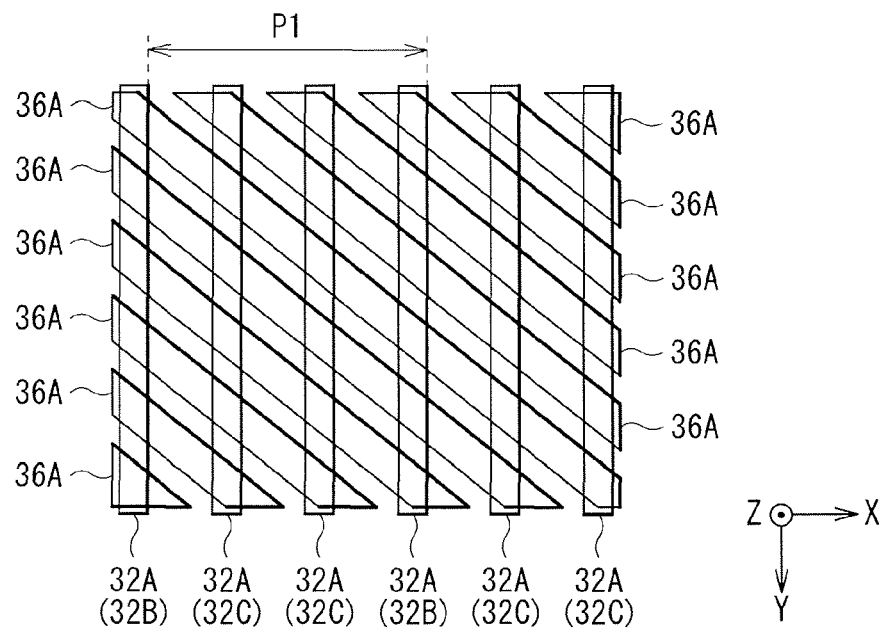

[ FIG. 53 ]
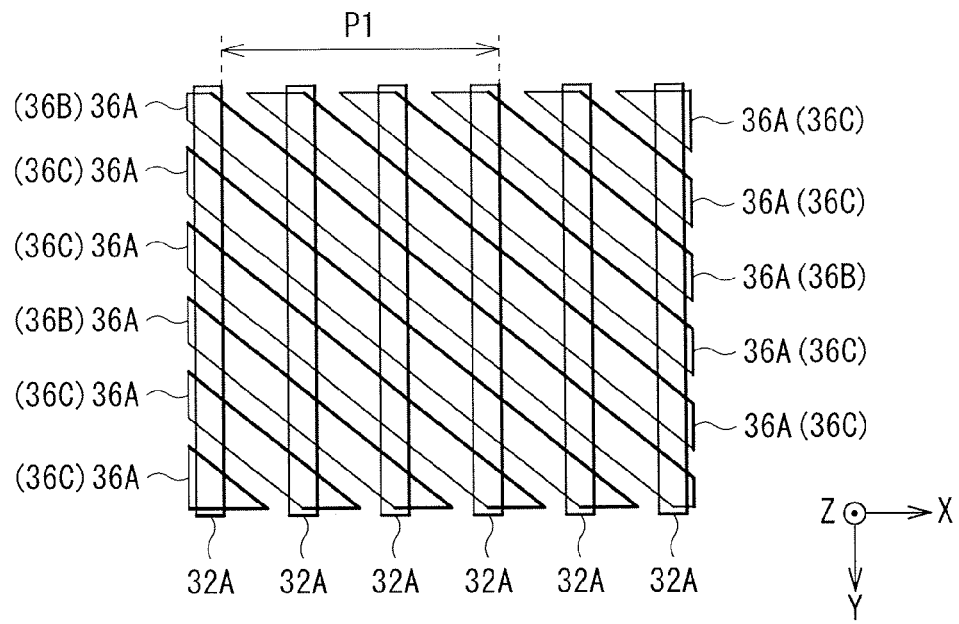
[ FIG. 54 ]
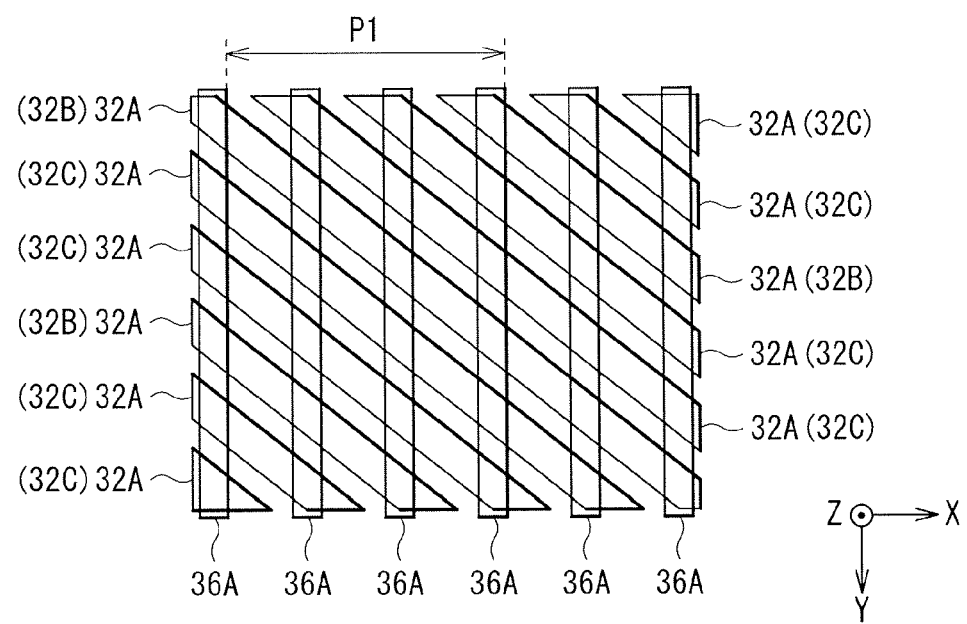

[ FIG. 55 ]
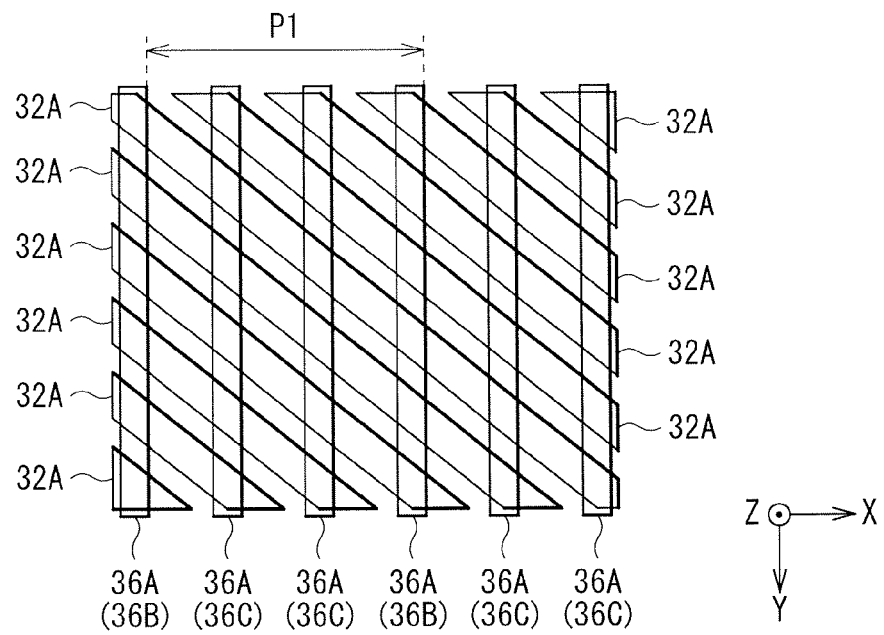
[ FIG. 56A ]
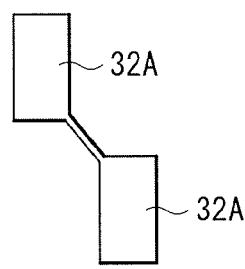
[ FIG. 56B ]
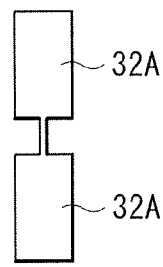

[ FIG. 57A ]
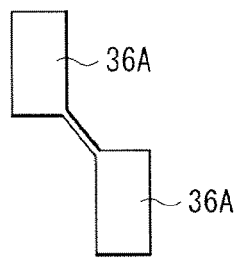
[ FIG. 57B ]
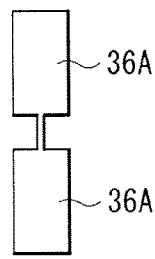
[ FIG. 58 ]
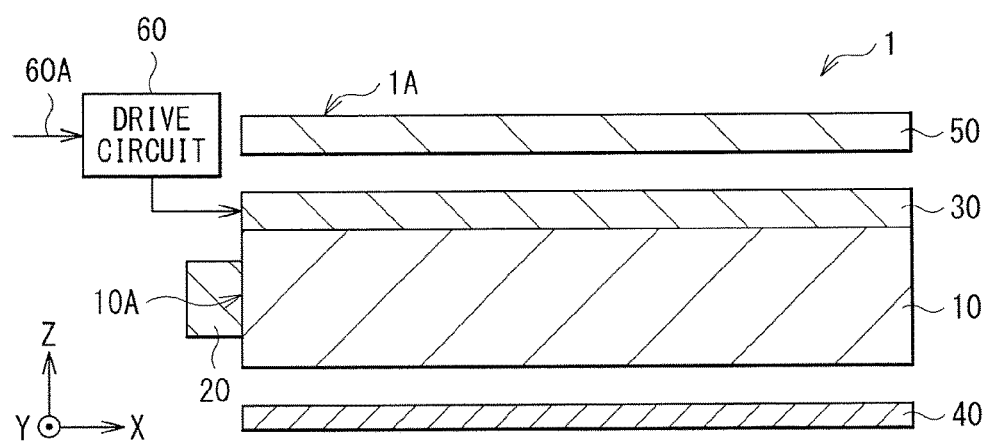

[ FIG. 59 ]
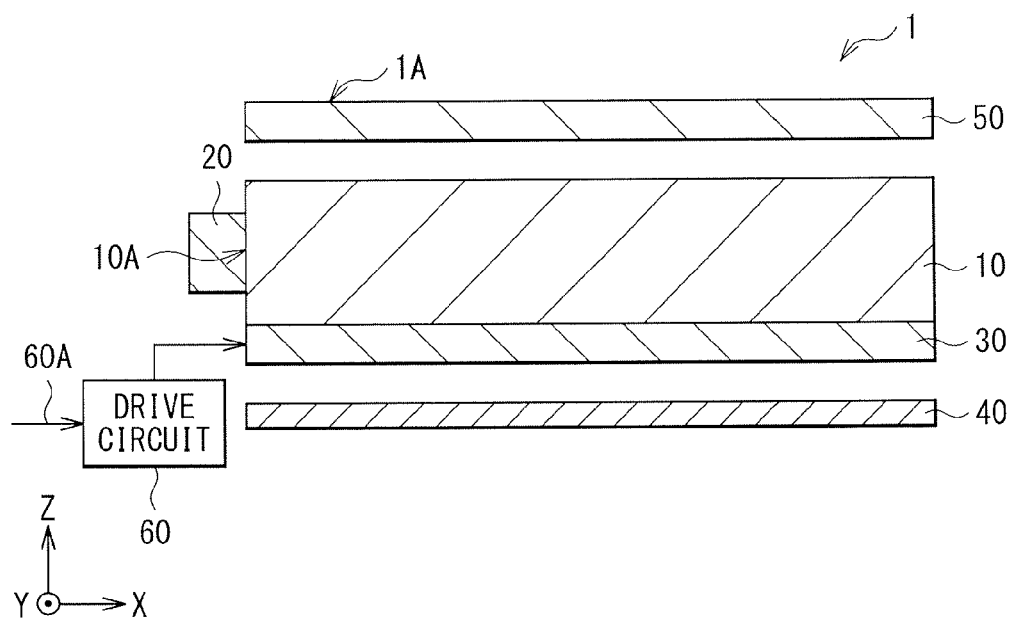

[ FIG. 60 ]
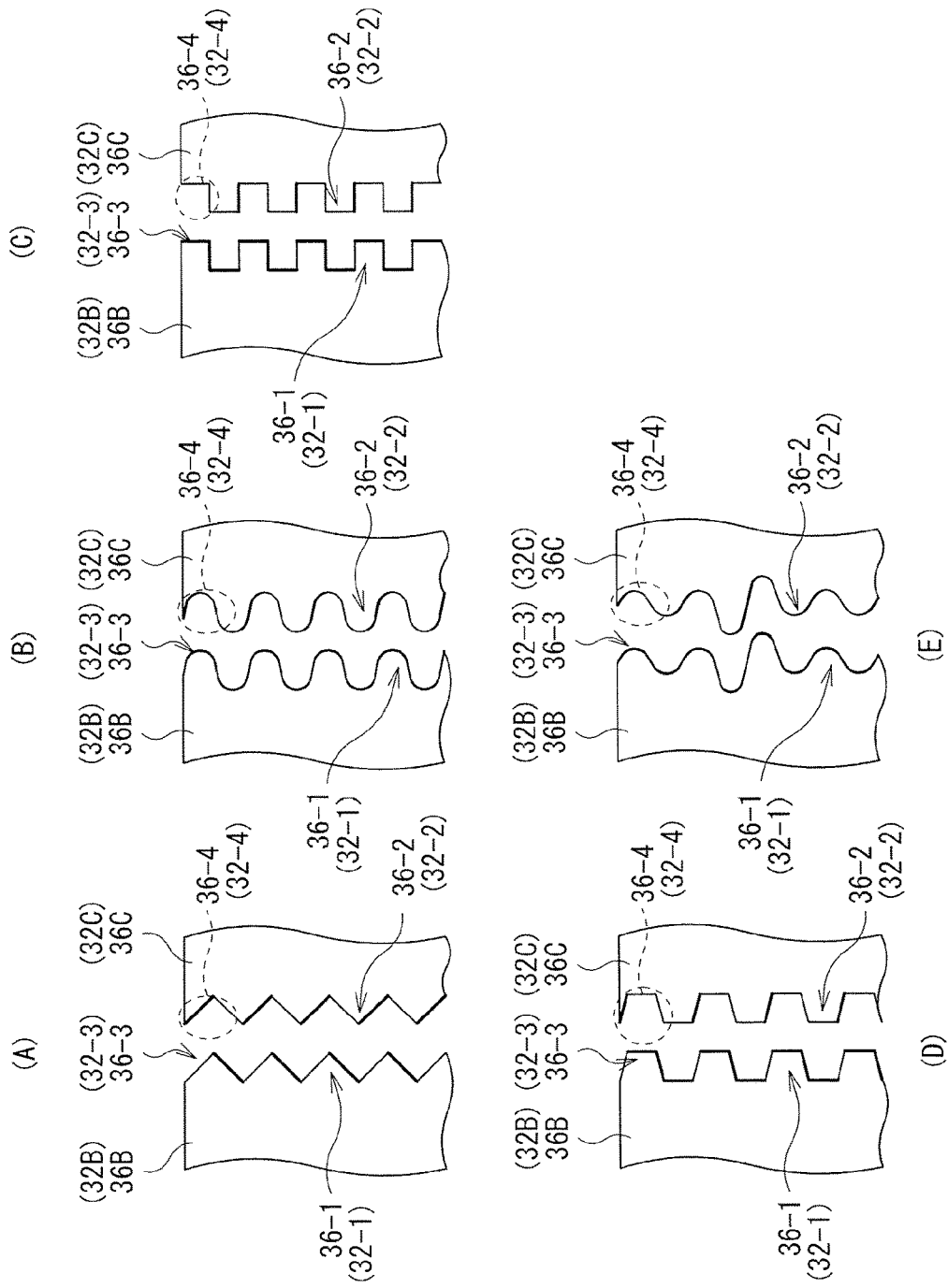

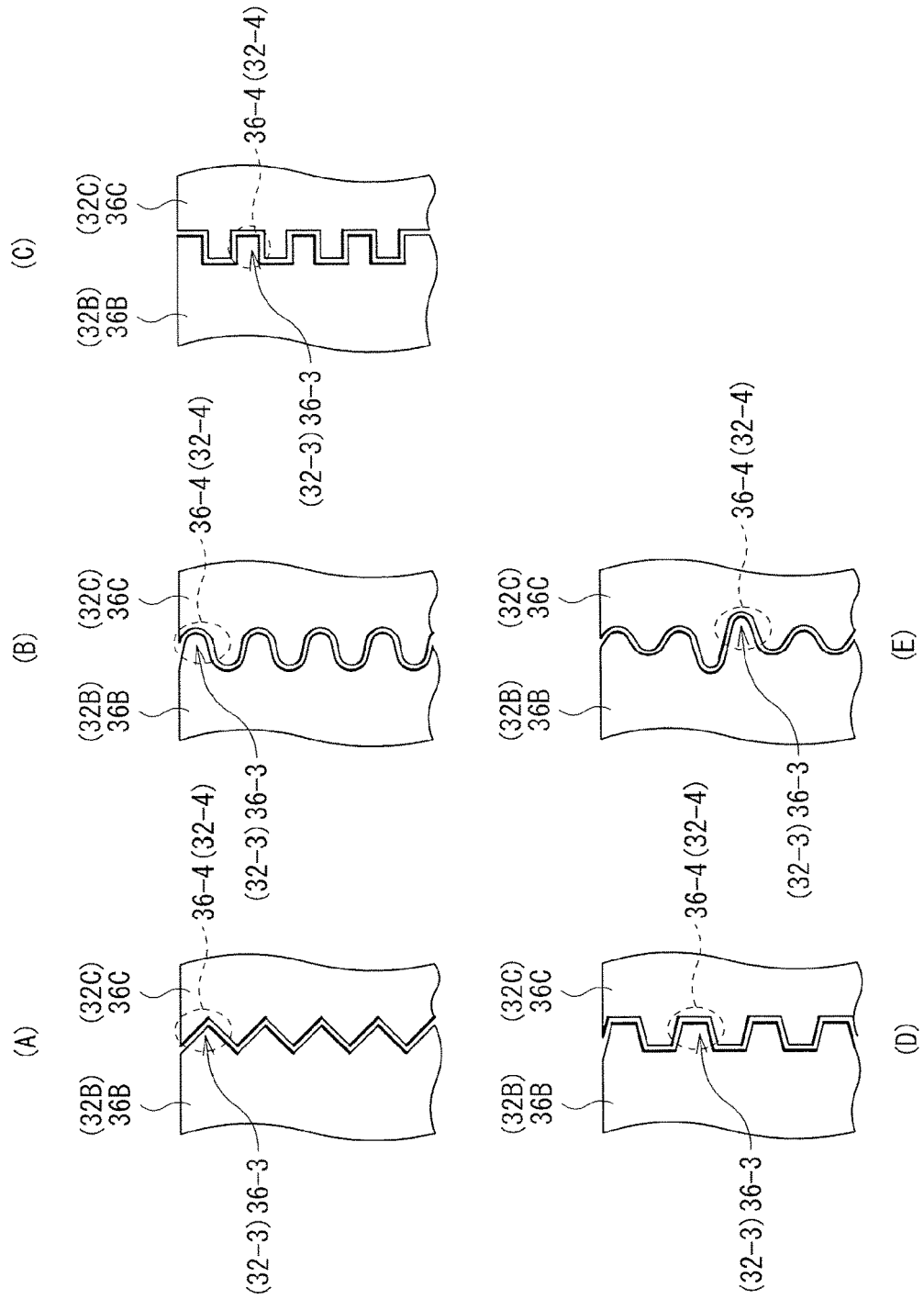
[ FIG. 61 ]

[ FIG. 62 ]
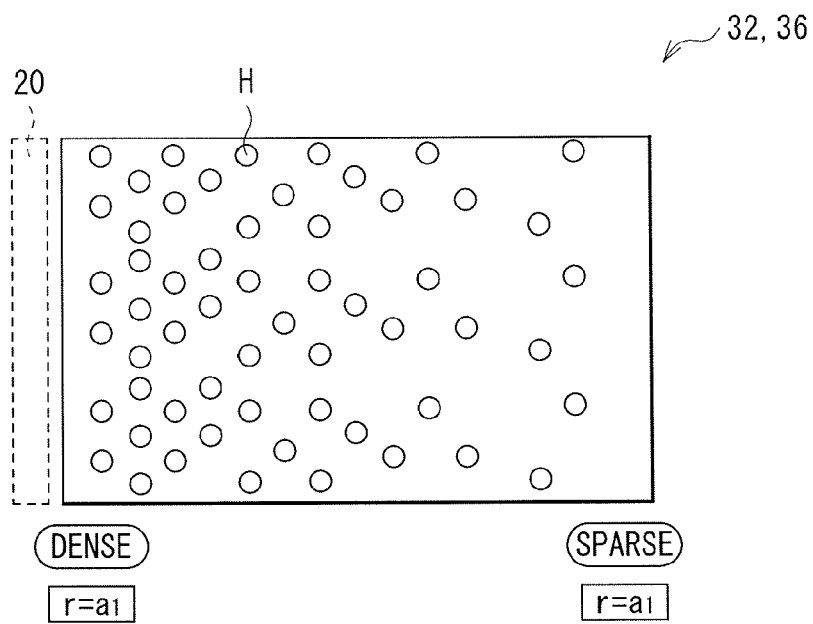
[ FIG. 63 ]
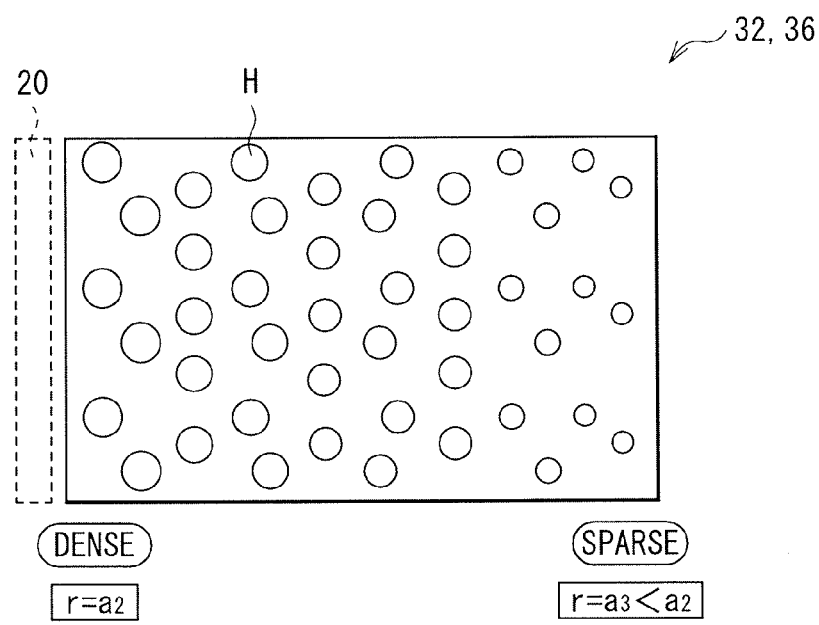

[ FIG. 64 ]
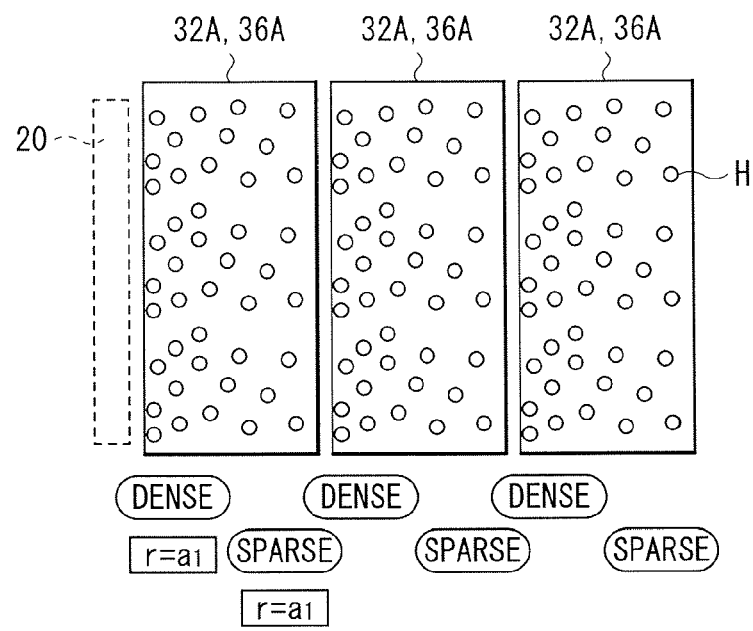
[ FIG. 65 ]
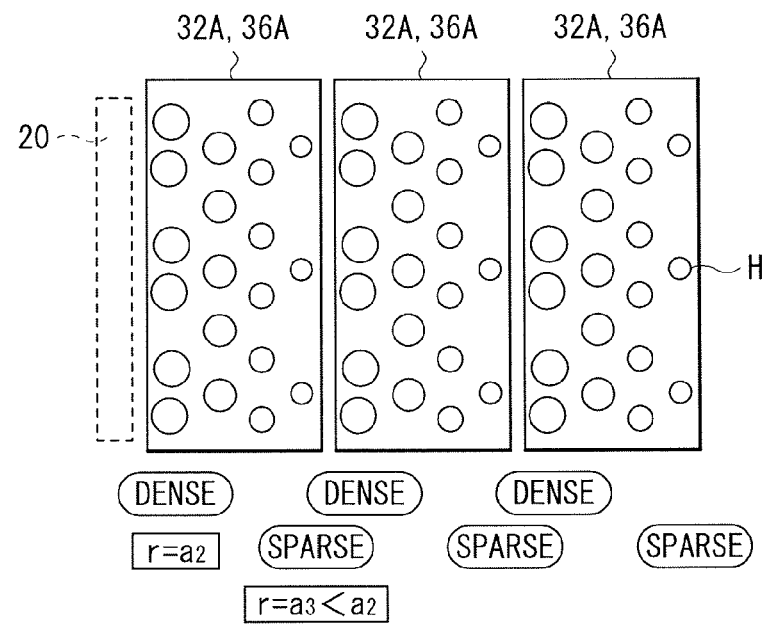

[ FIG. 66 ]
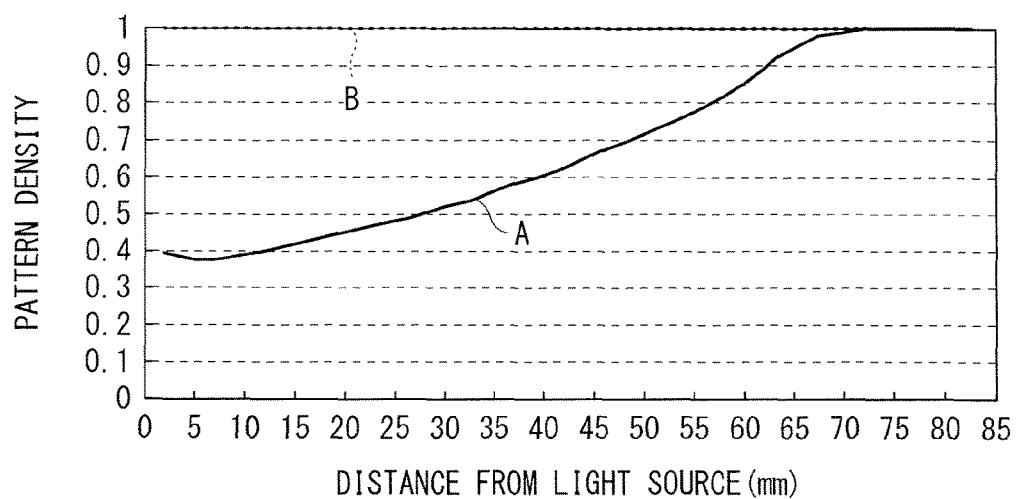
[ FIG. 67 ]
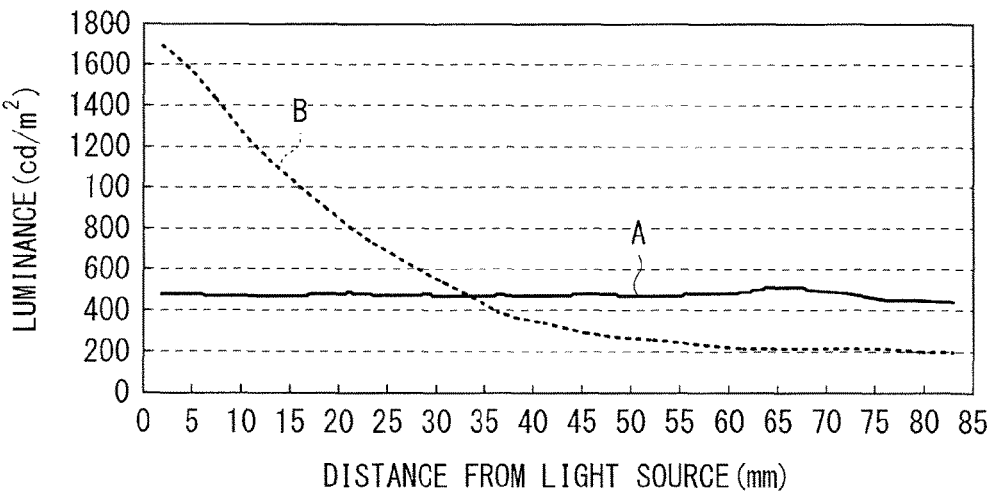

[ FIG. 68 ]
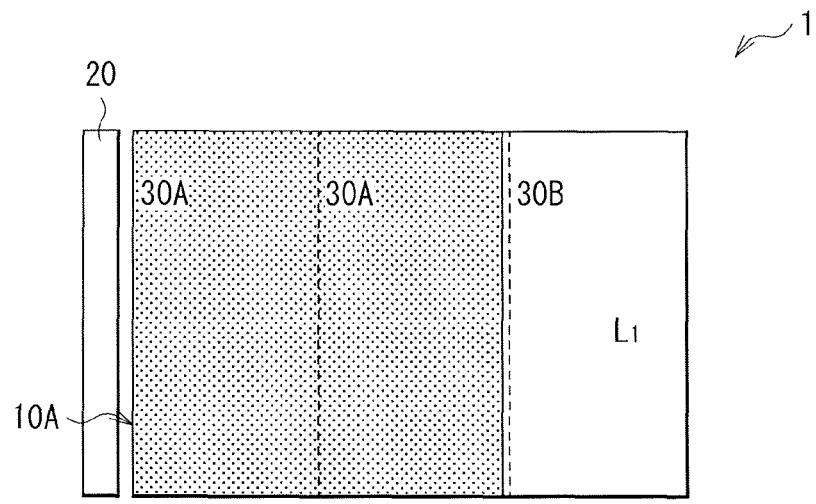
[ FIG. 69 ]
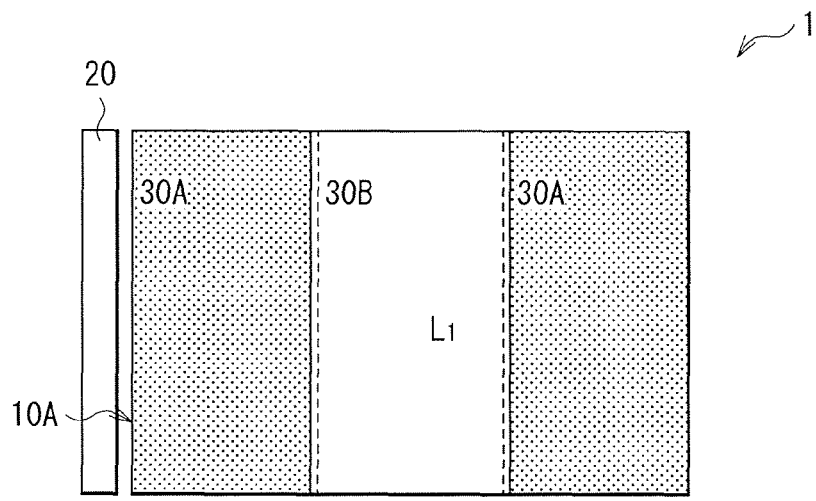

[ FIG. 70 ]
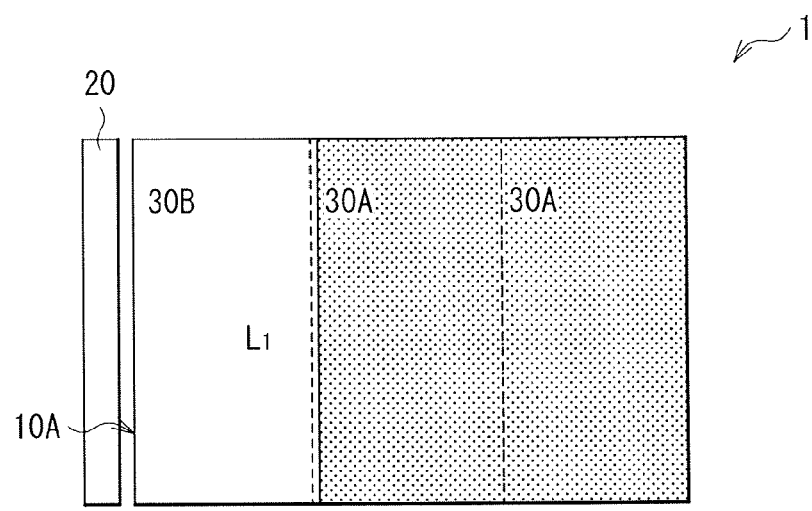

[ FIG. 71A ]
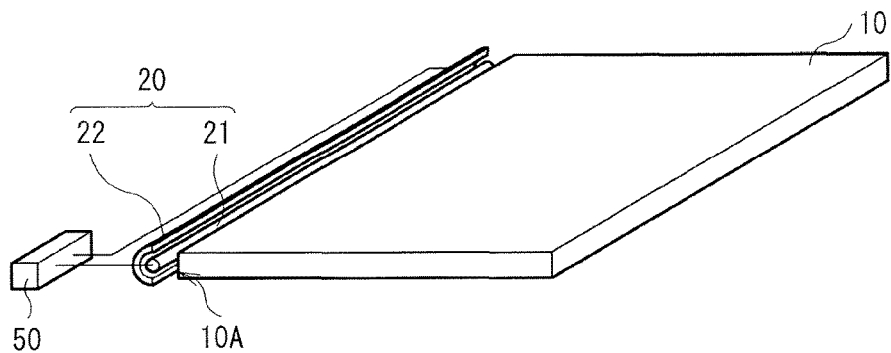
[ FIG. 71B ]
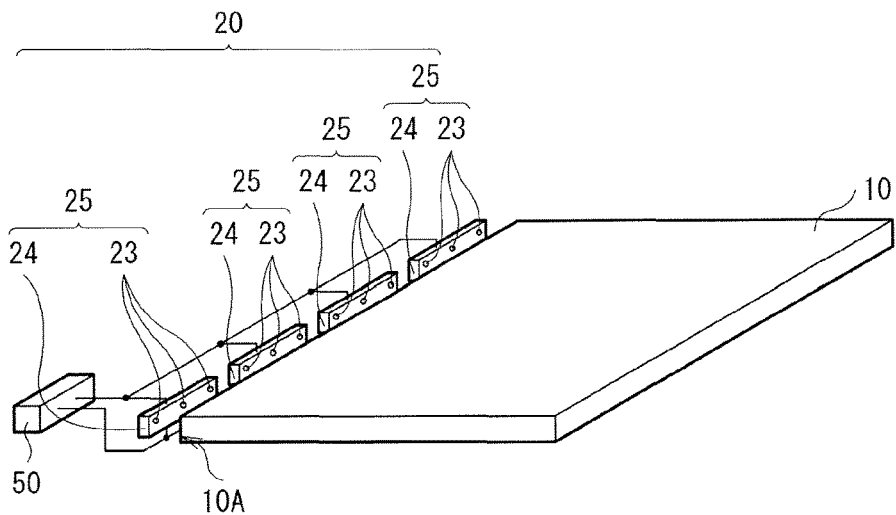
[ FIG. 71C ]
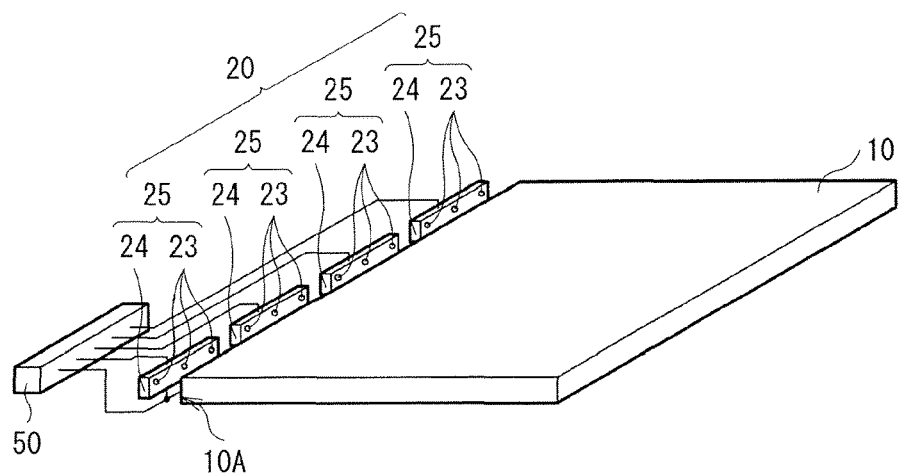

[ FIG. 72A ]
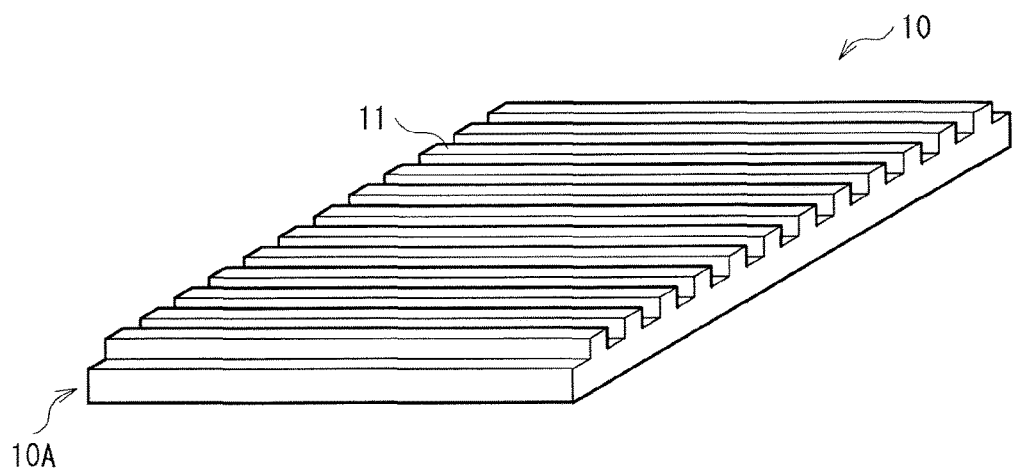
[ FIG. 72B ]
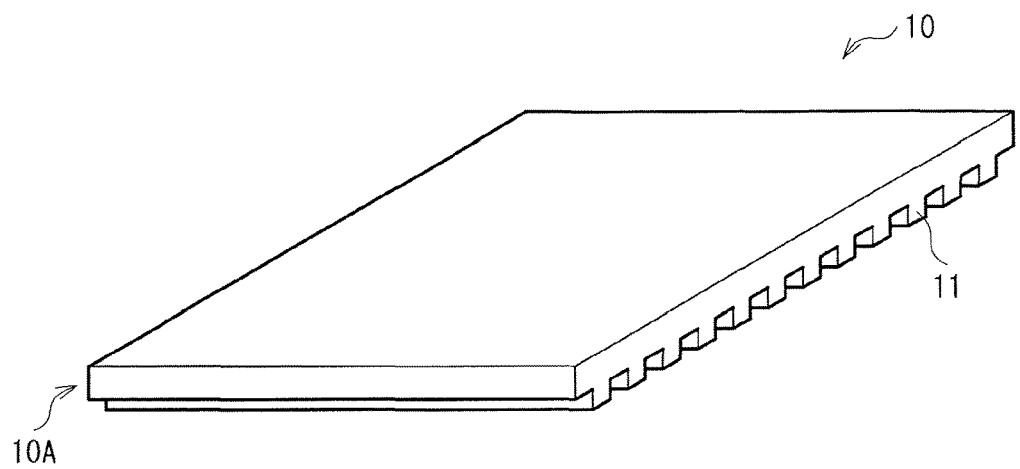

[ FIG. 73A ]
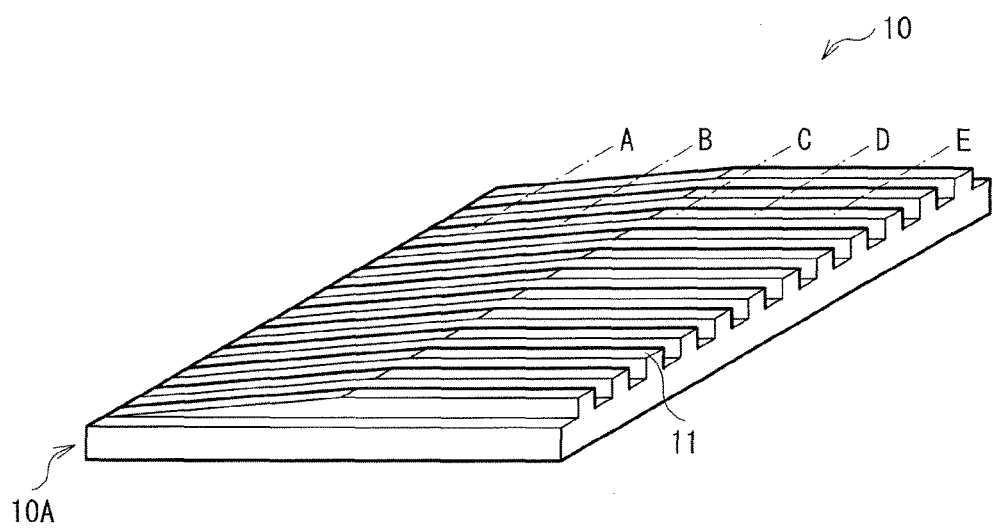
[ FIG. 73B ]
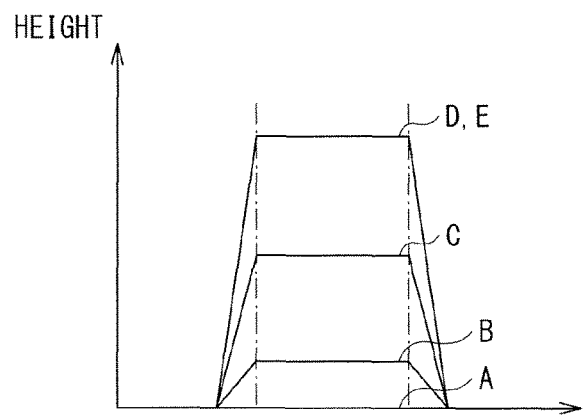

[ FIG. 74A ]
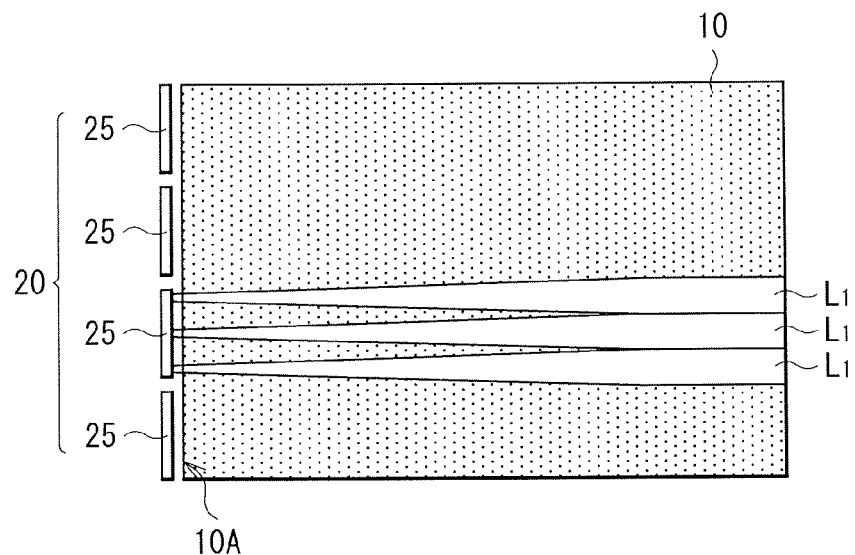
[ FIG. 74B ]
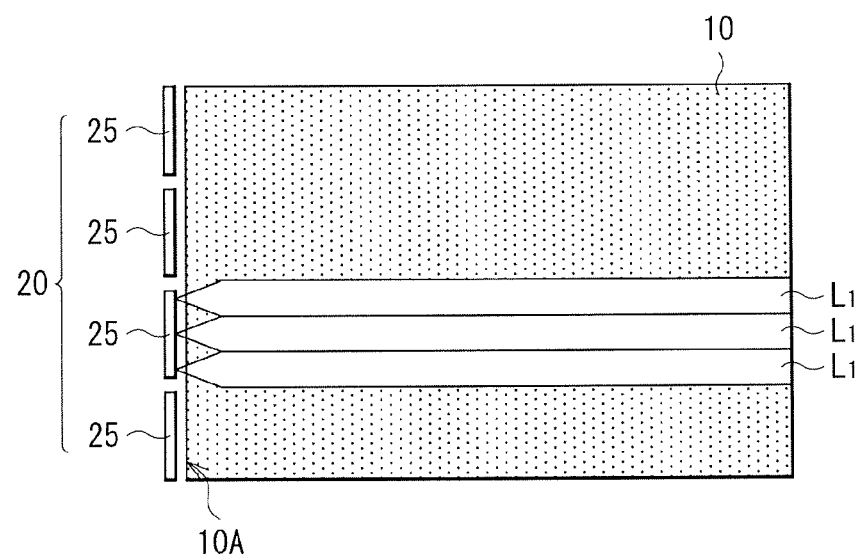

[ FIG. 75 ]
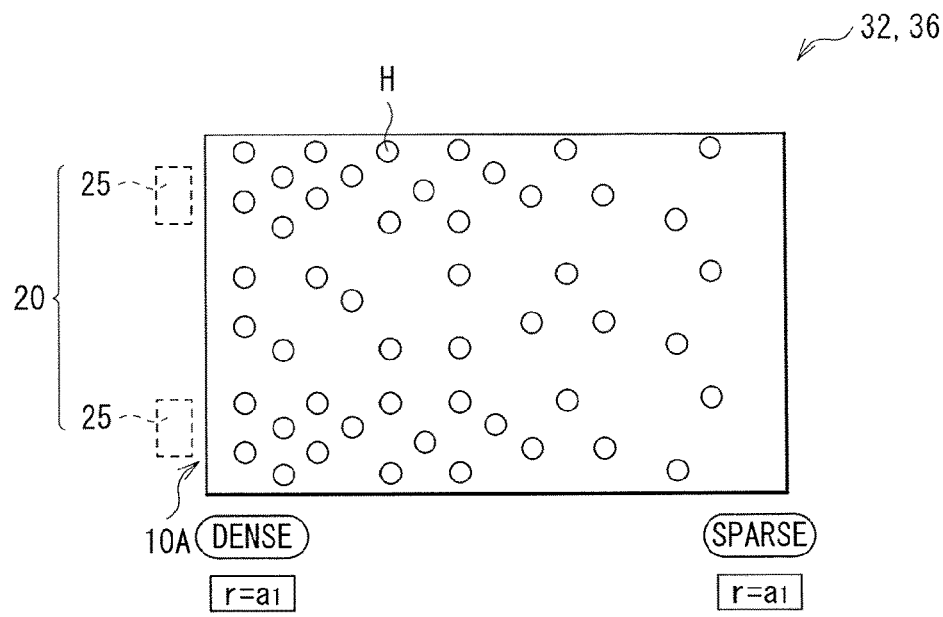
[ FIG. 76 ]
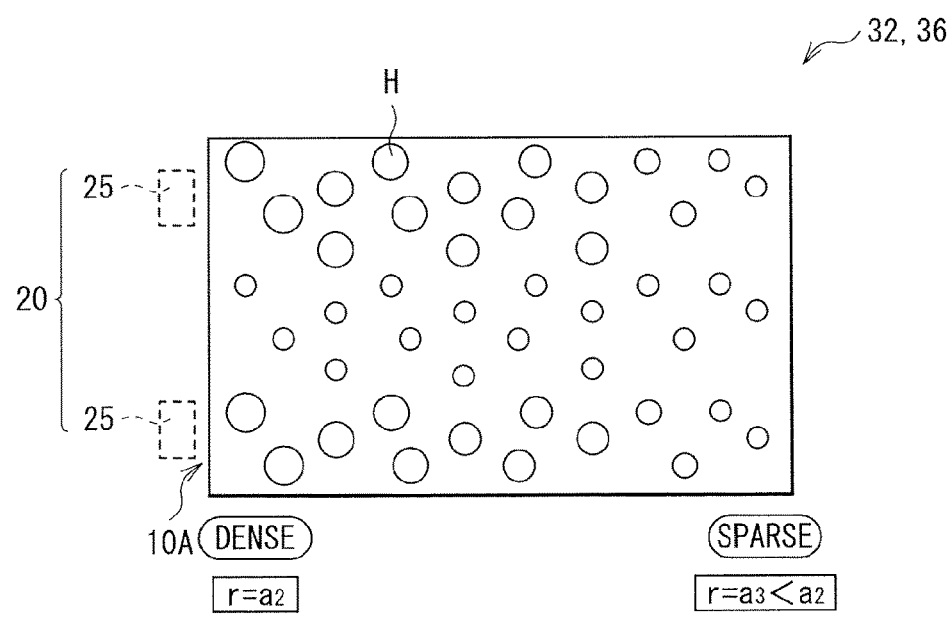

[ FIG. 77 ]
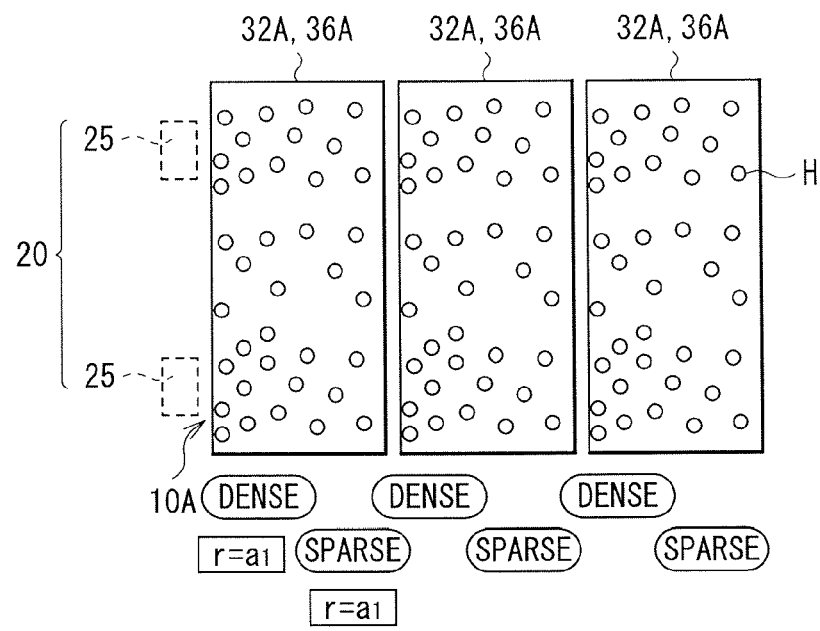
[ FIG. 78 ]
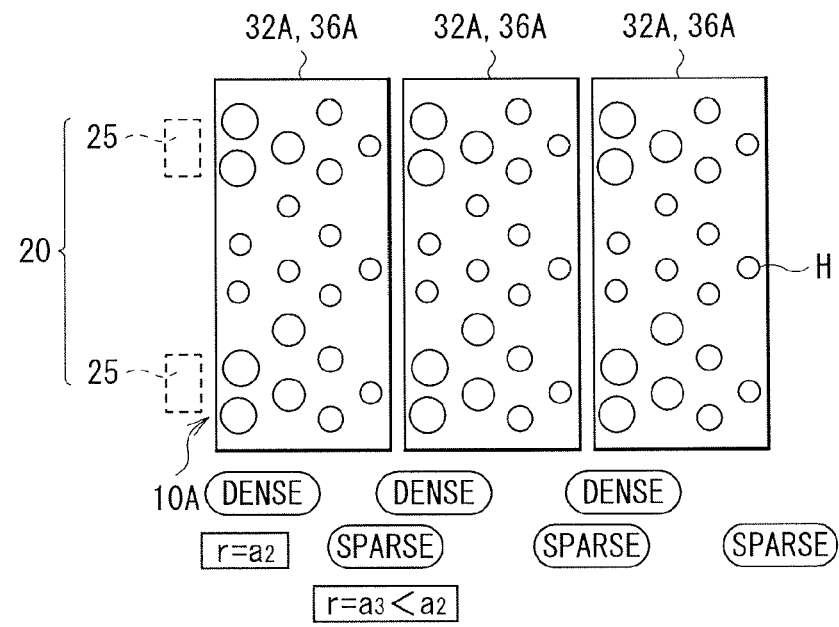

[ FIG. 79 ]
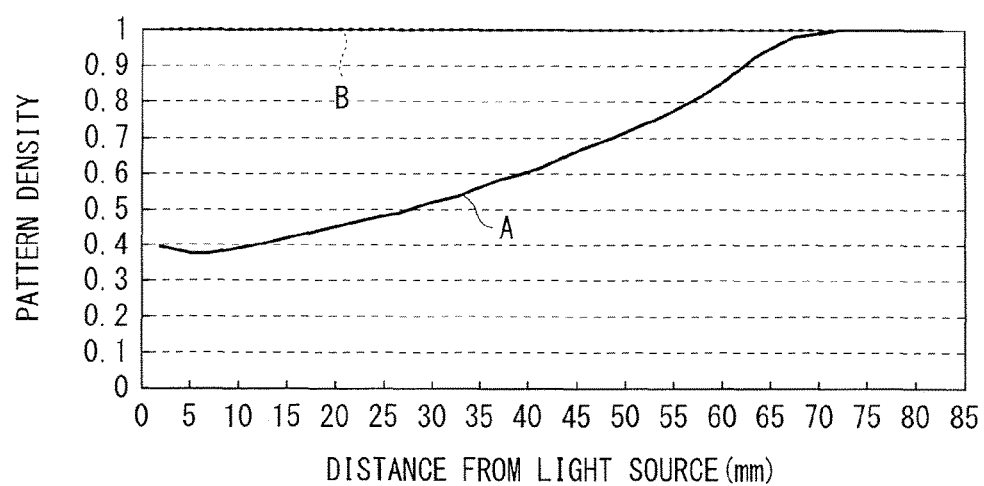
[ FIG. 80 ]
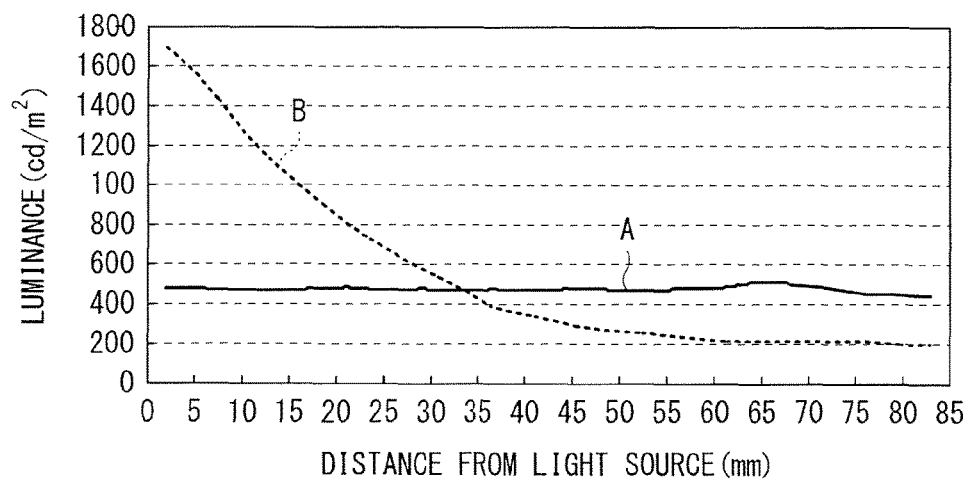

[ FIG. 81 ]
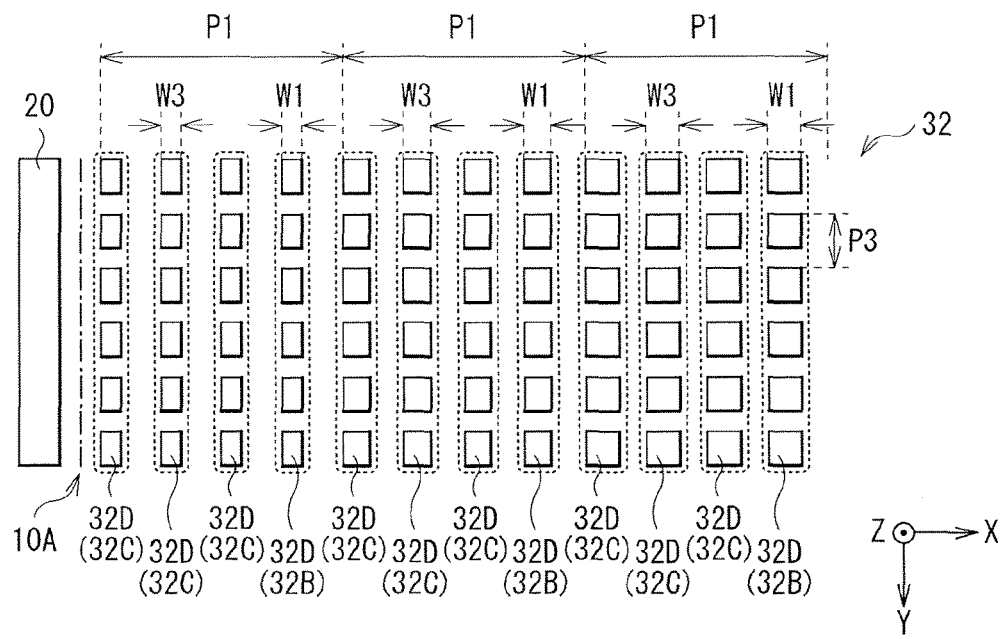
[ FIG. 82 ]
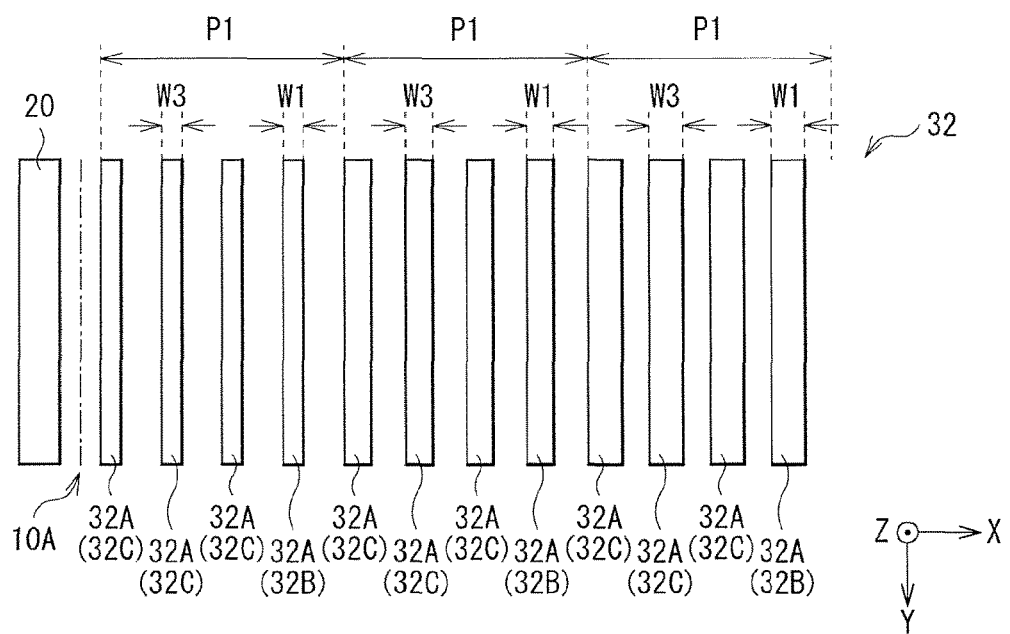

[ FIG. 83 ]
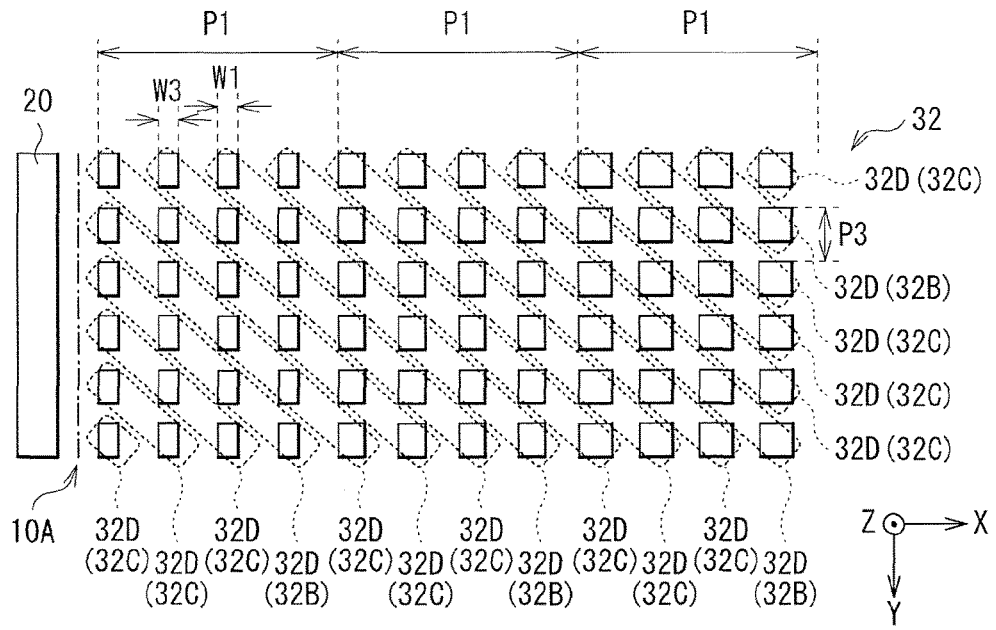
[ FIG. 84 ]
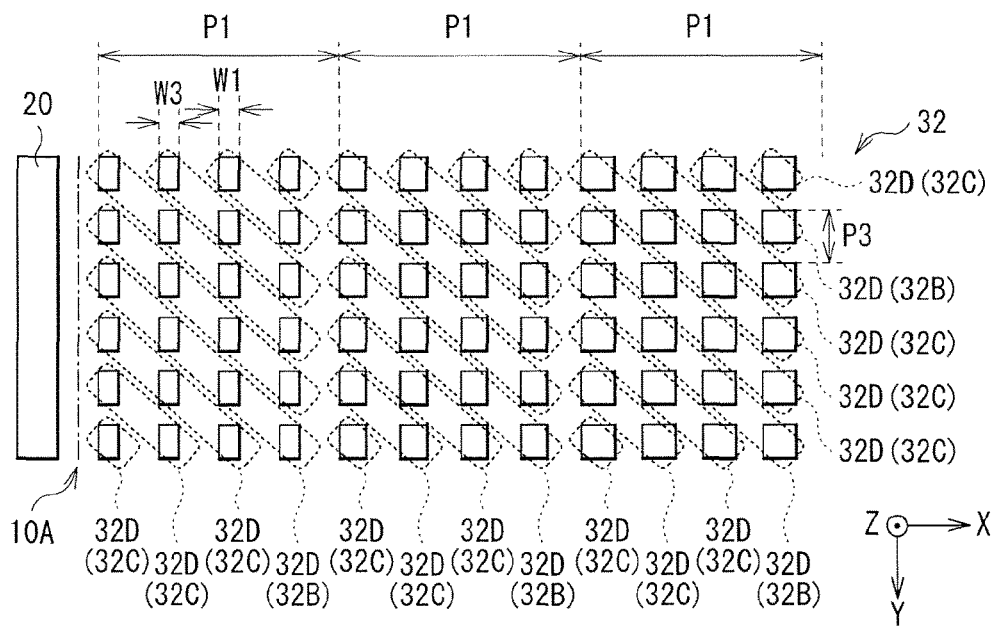

[ FIG. 85 ]
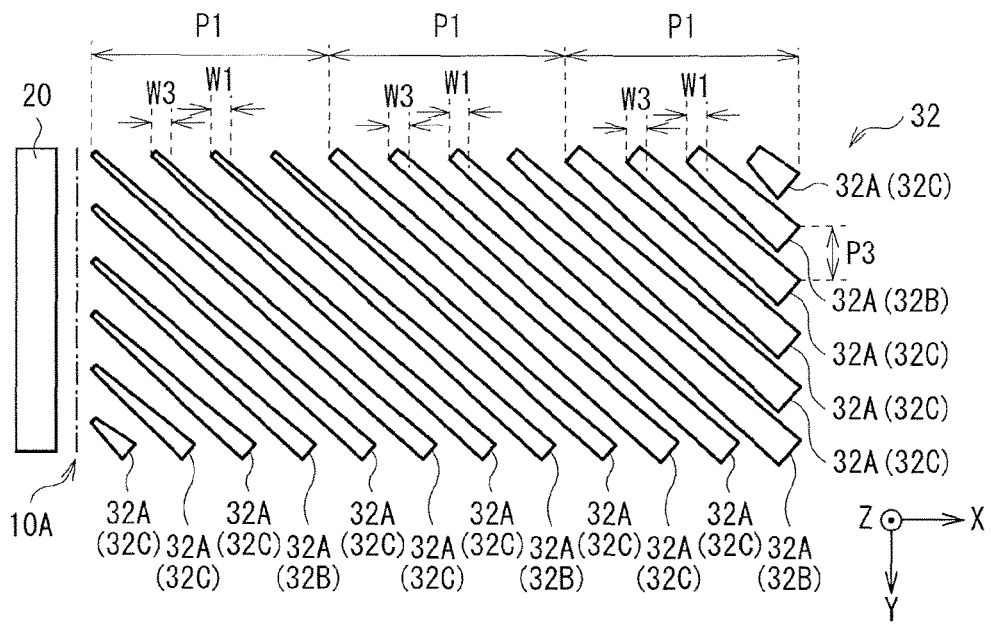
[ FIG. 86 ]
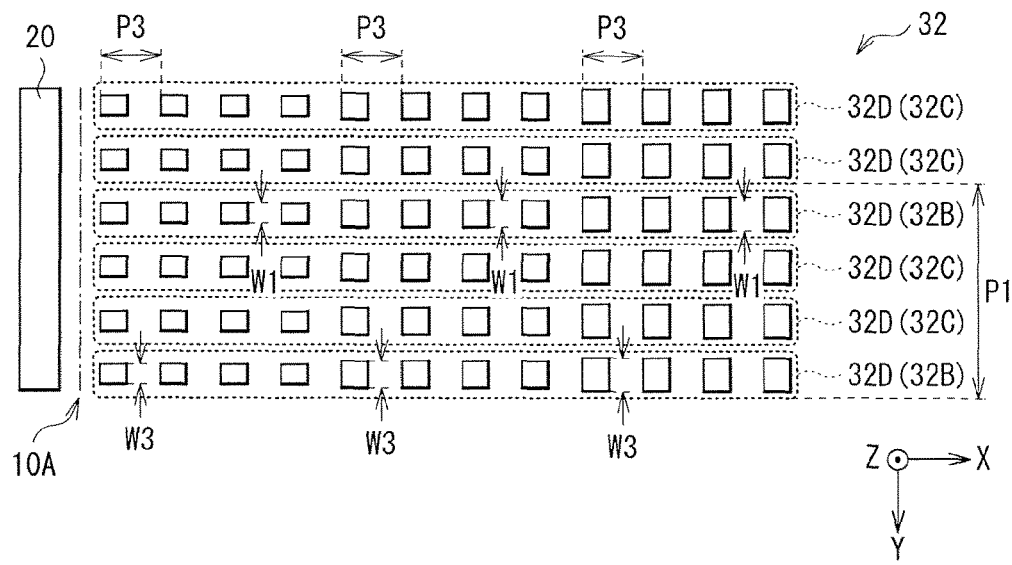

[ FIG. 87 ]
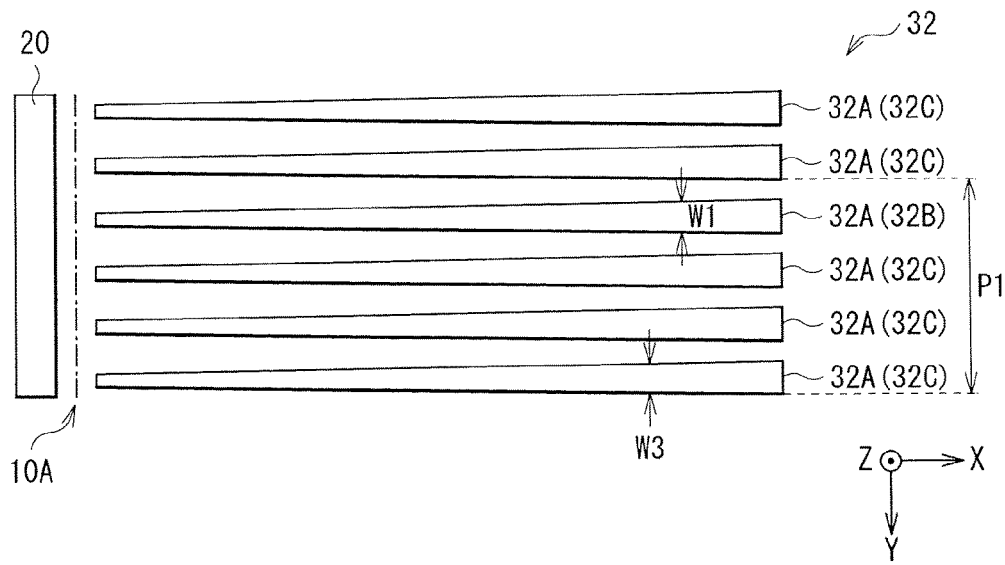
[ FIG. 88 ]
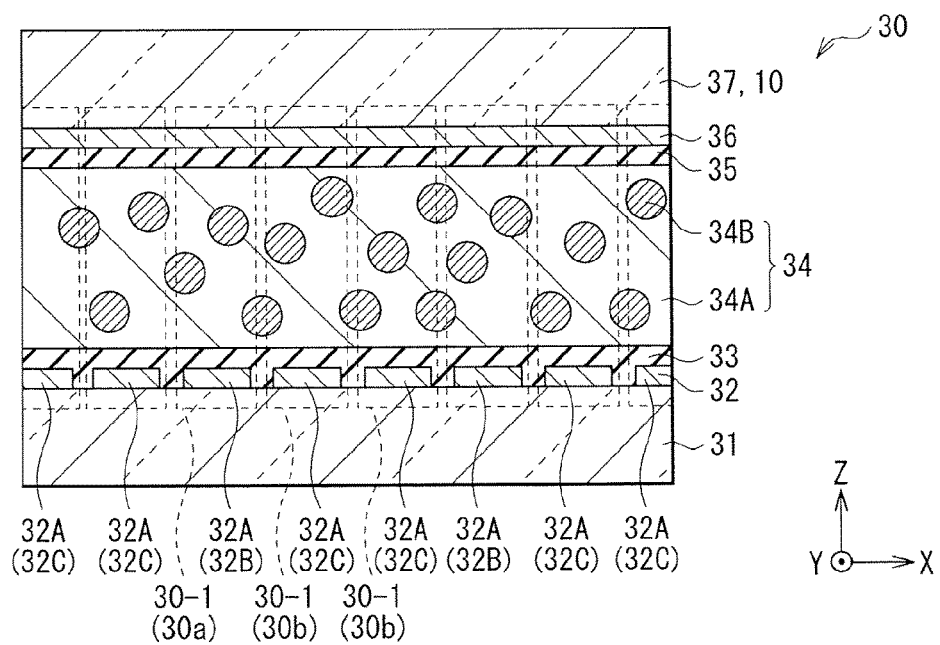

[ FIG. 89 ]
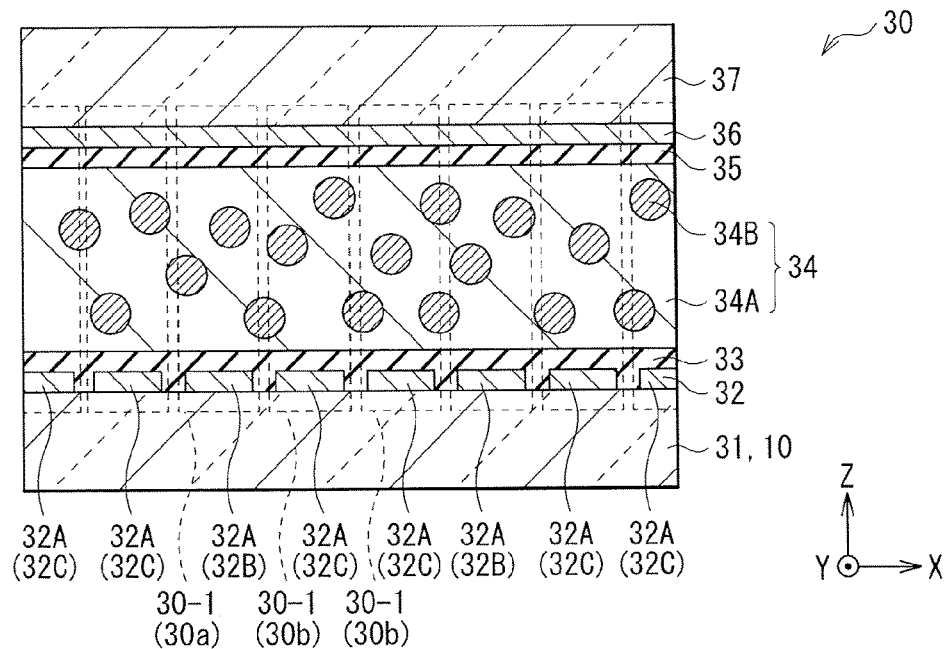
[ FIG. 90 ]
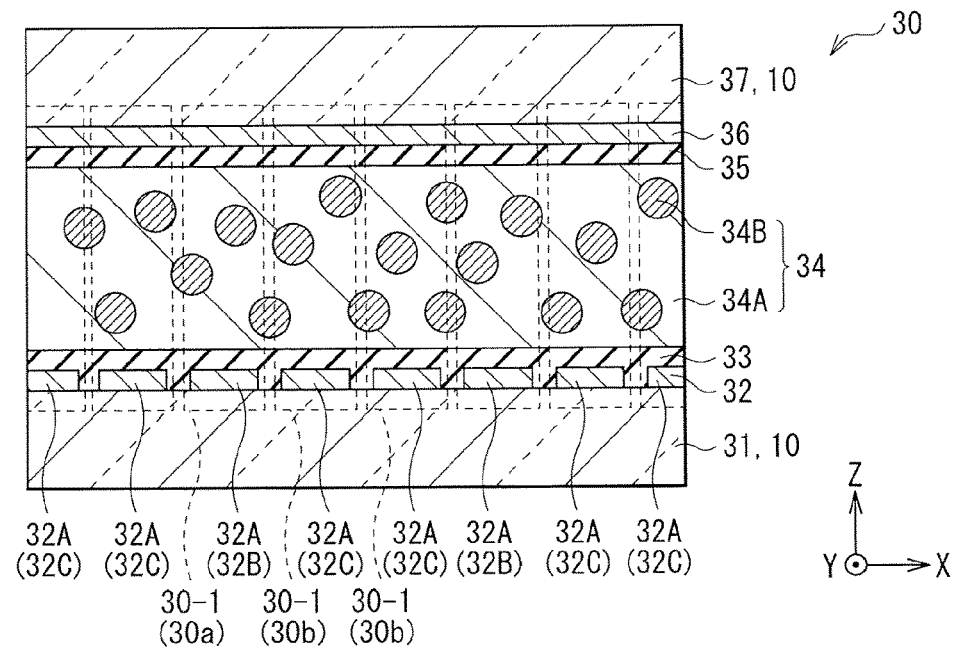

[ FIG. 91 ]
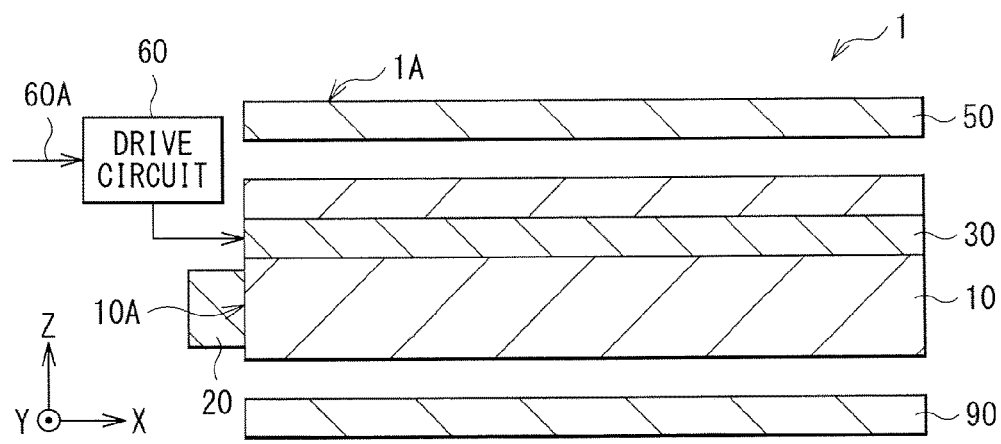
[ FIG. 92 ]
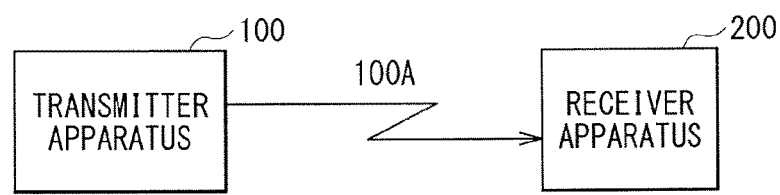

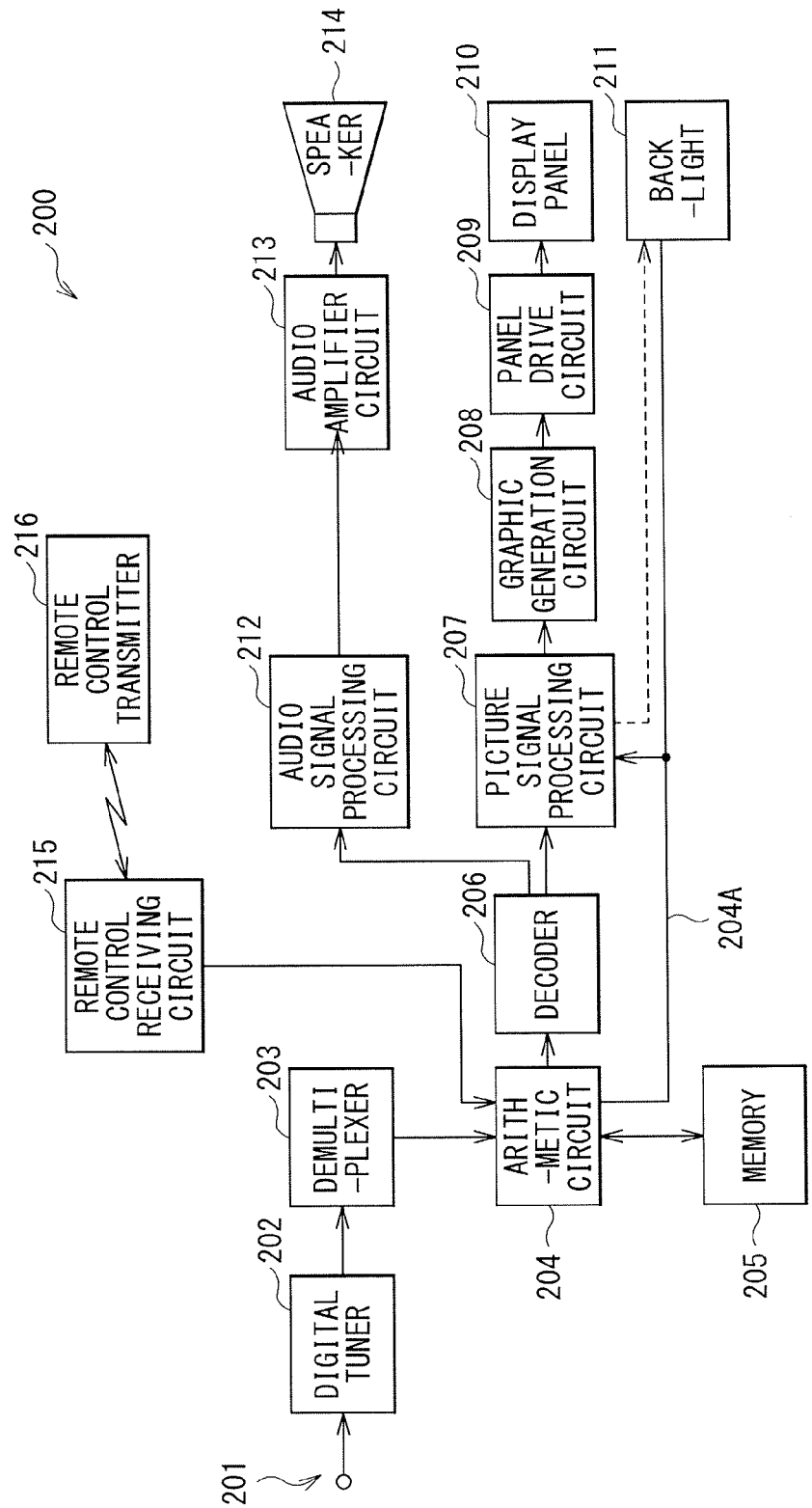
[ FIG. 93 ]

[ FIG. 94 ]
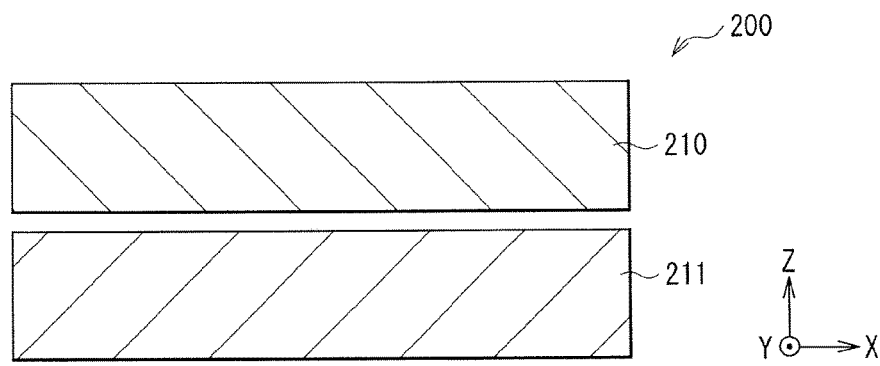
[ FIG. 95 ]
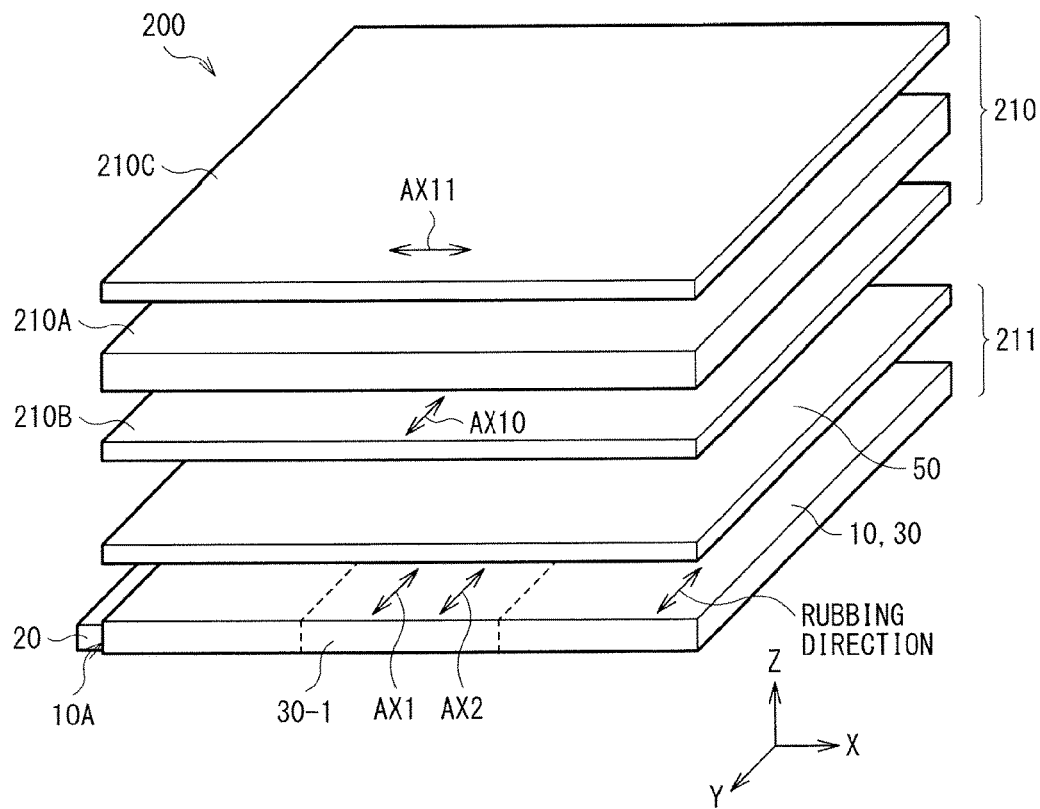

[ FIG. 96 ]
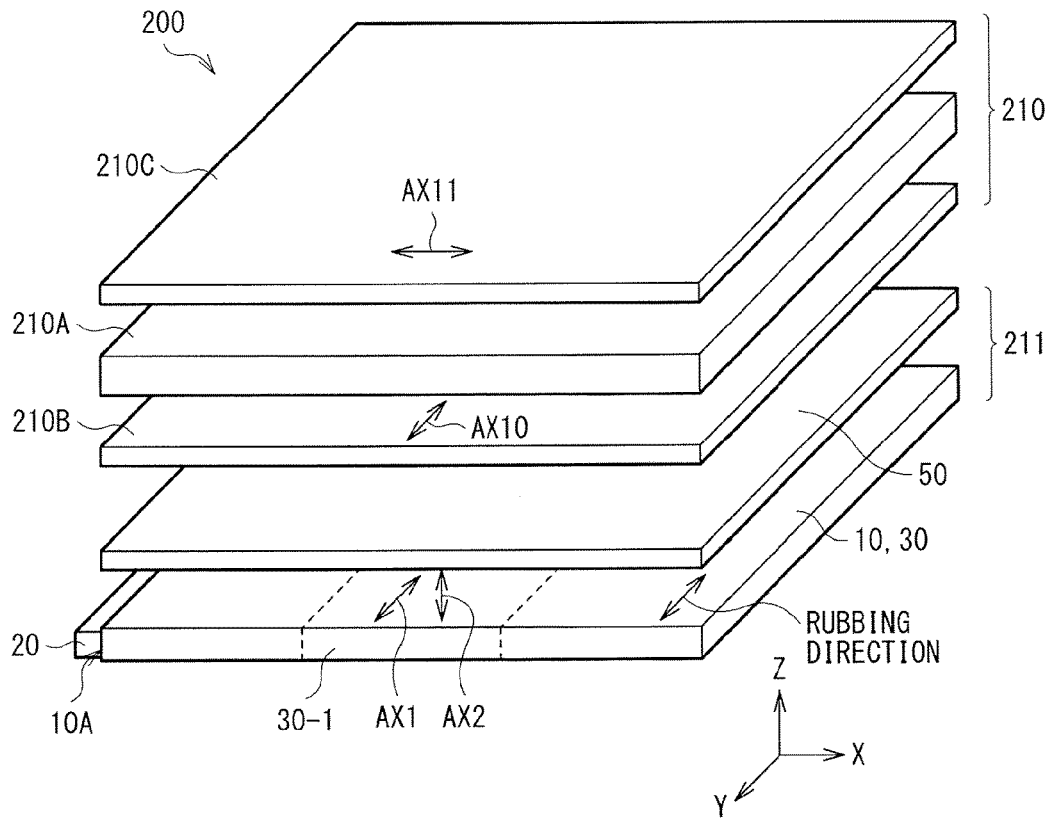
[ FIG. 97 ]
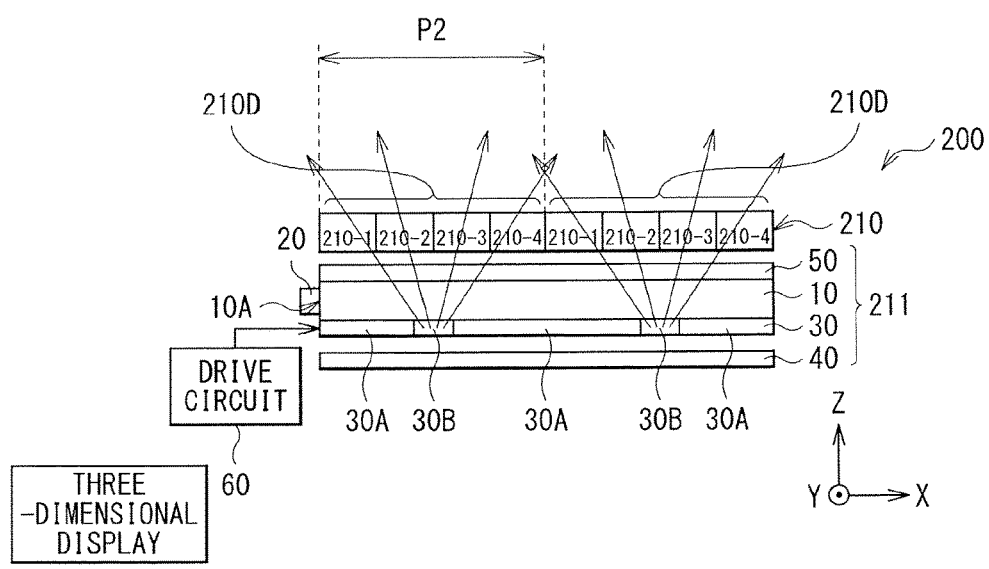

[ FIG. 98 ]
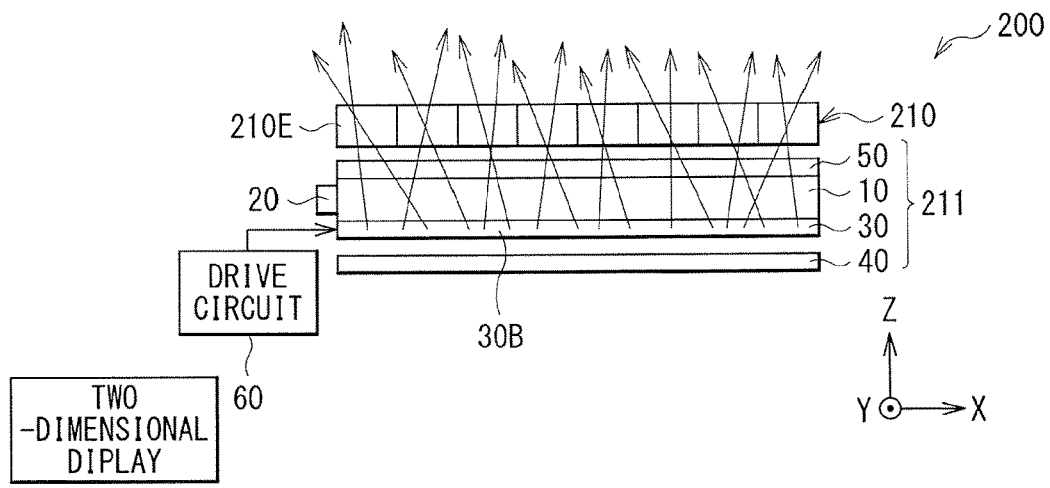
[ FIG. 99 ]
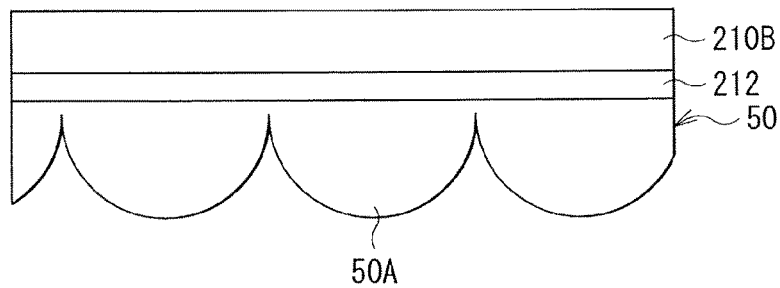
[ FIG. 100 ]
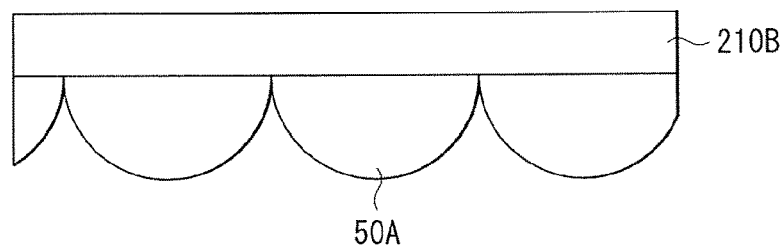

[ FIG. 101 ]
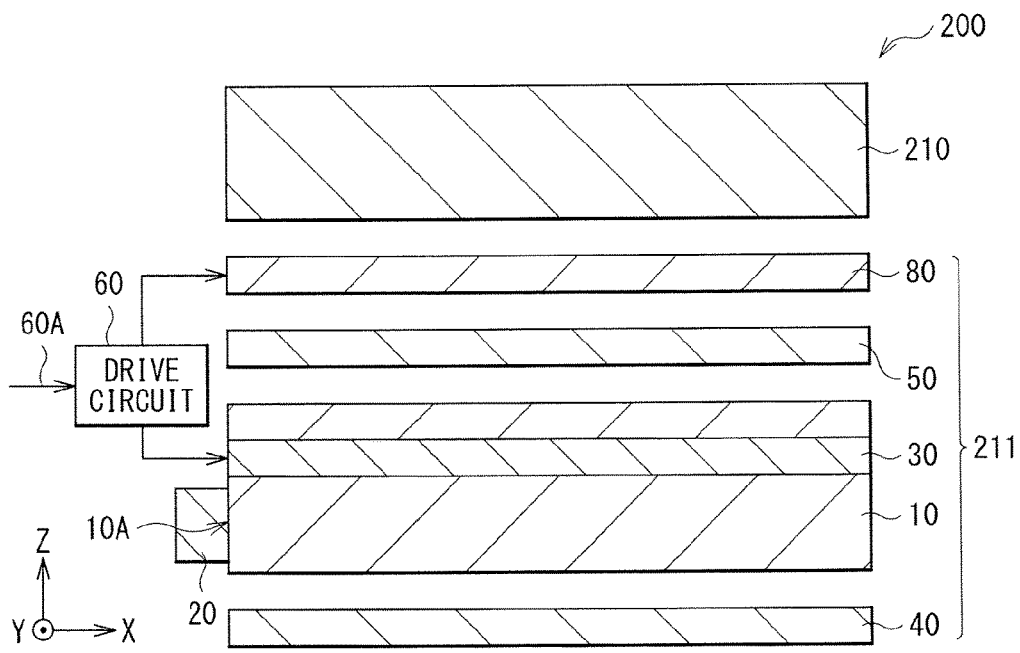
[ FIG. 102 ]
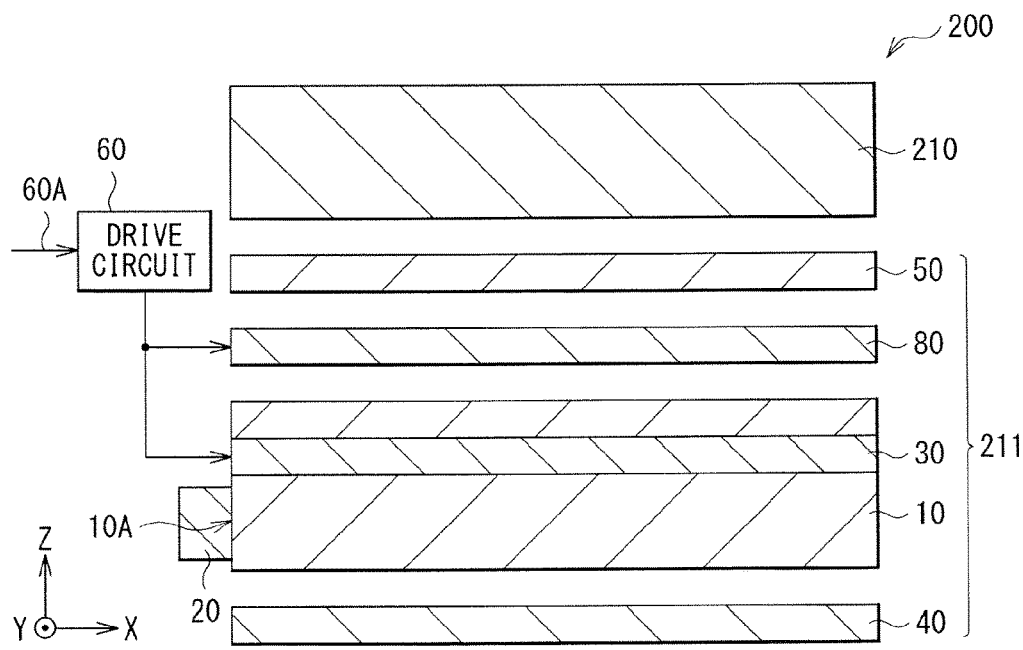

[ FIG. 103 ]
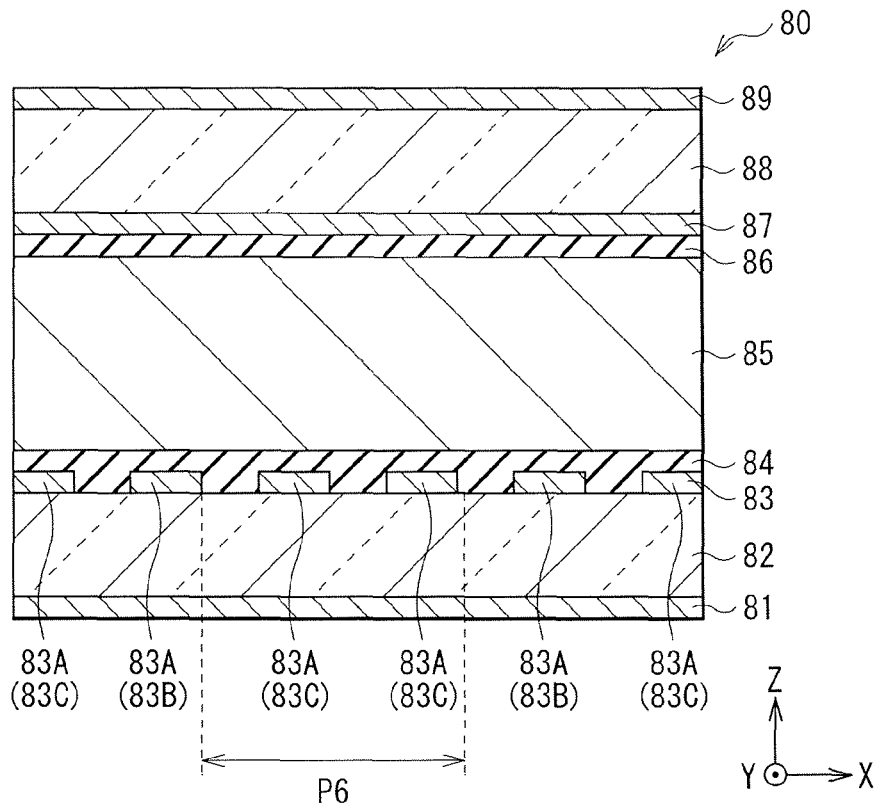
[ FIG. 104 ]
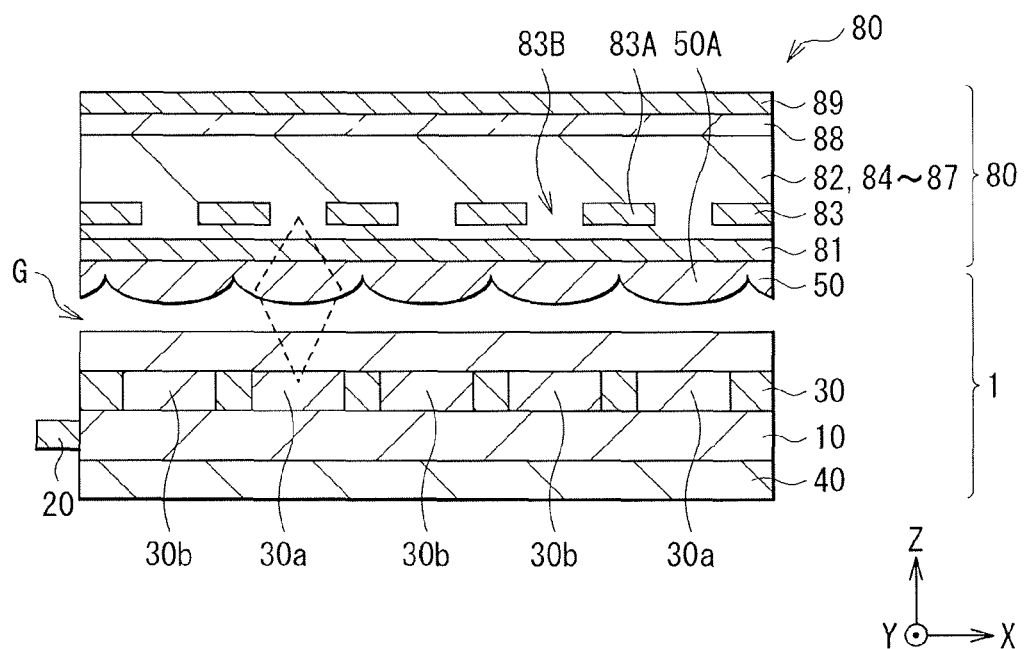

[ FIG. 105 ]
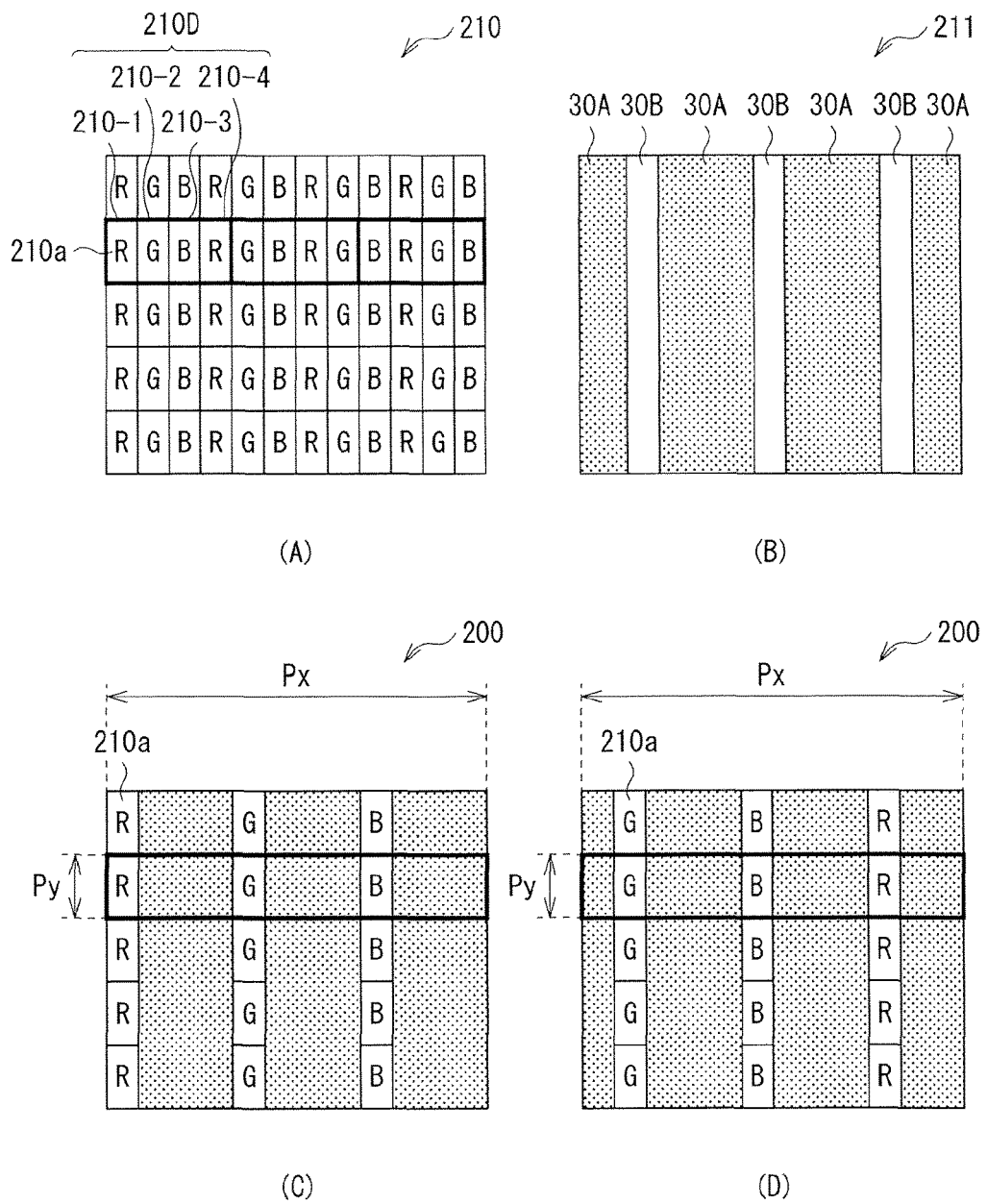
(A)　　　　　　　　　　(B)
(C)　　　　　　　　　　(D)

[ FIG. 106A ]
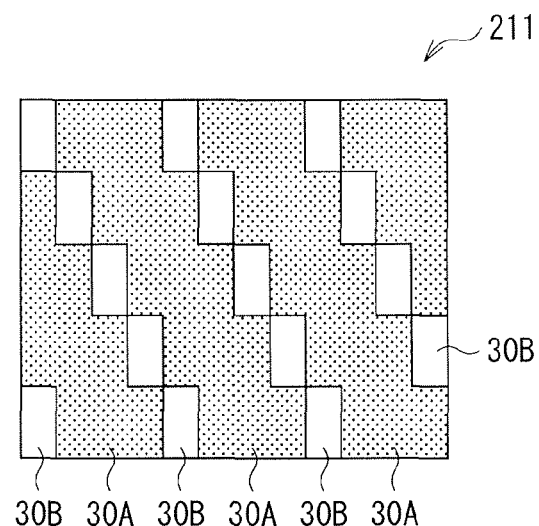
[ FIG. 106B ]
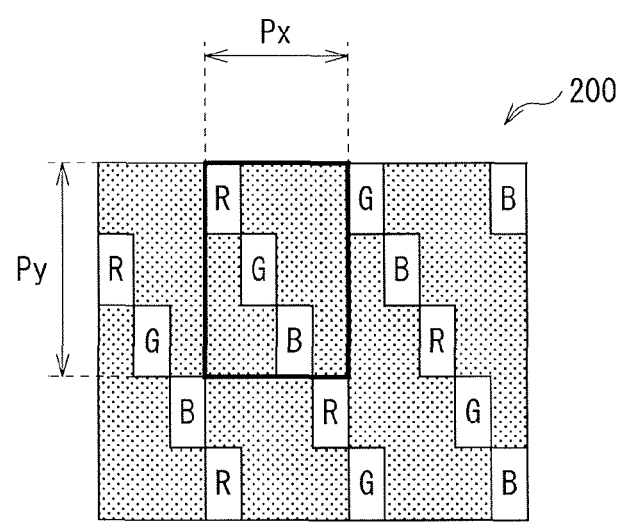

[ FIG. 107A ]
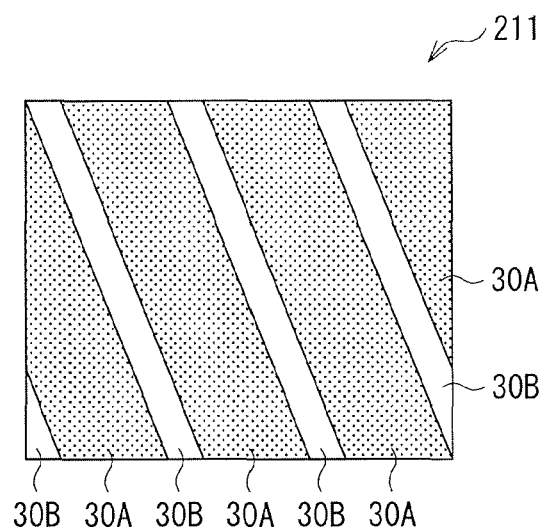
[ FIG. 107B ]
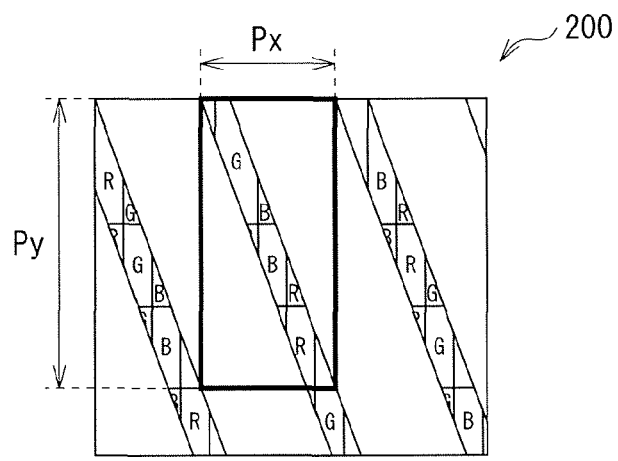

[ FIG. 108 ]
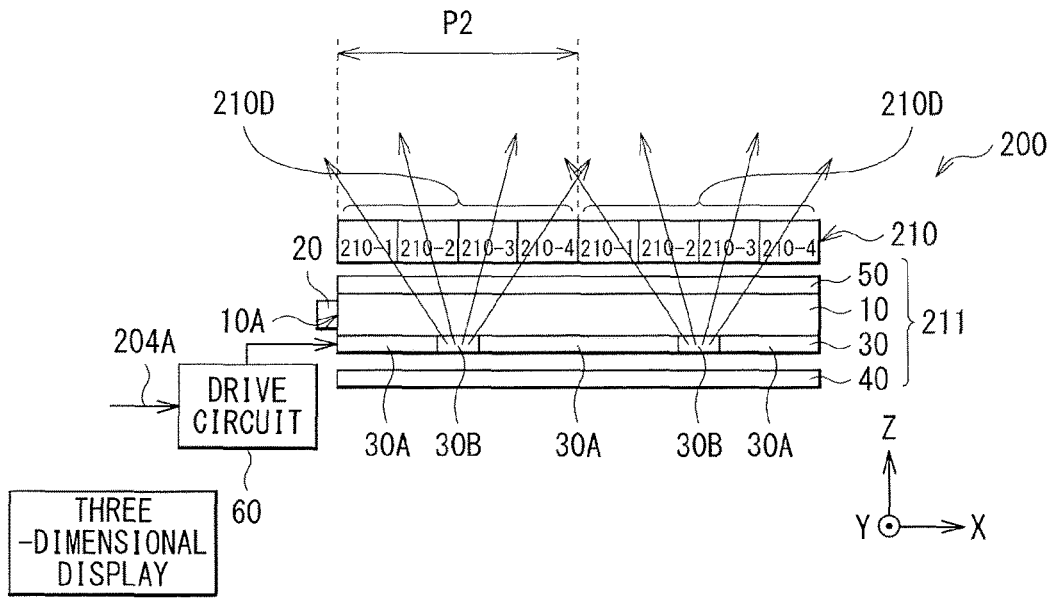
[ FIG. 109 ]
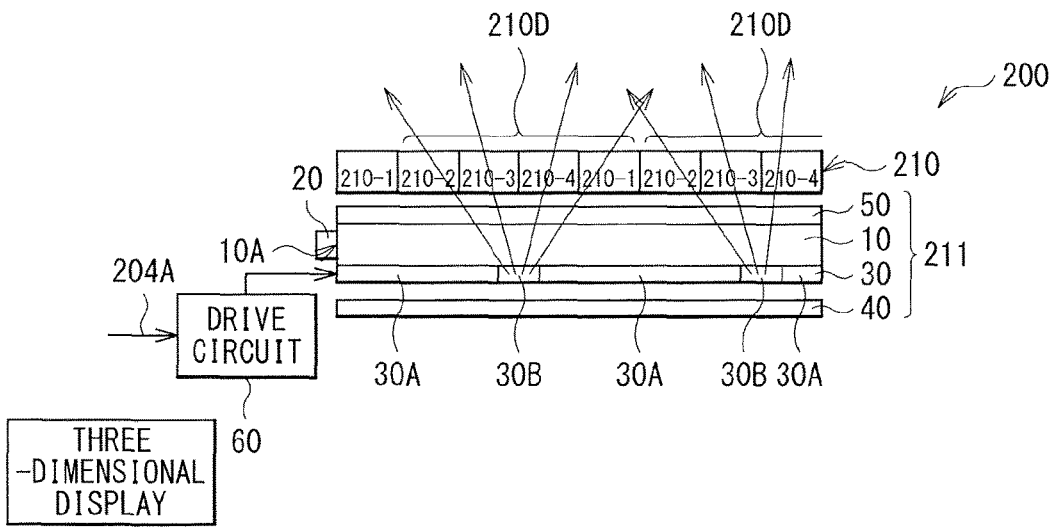

[ FIG. 110 ]
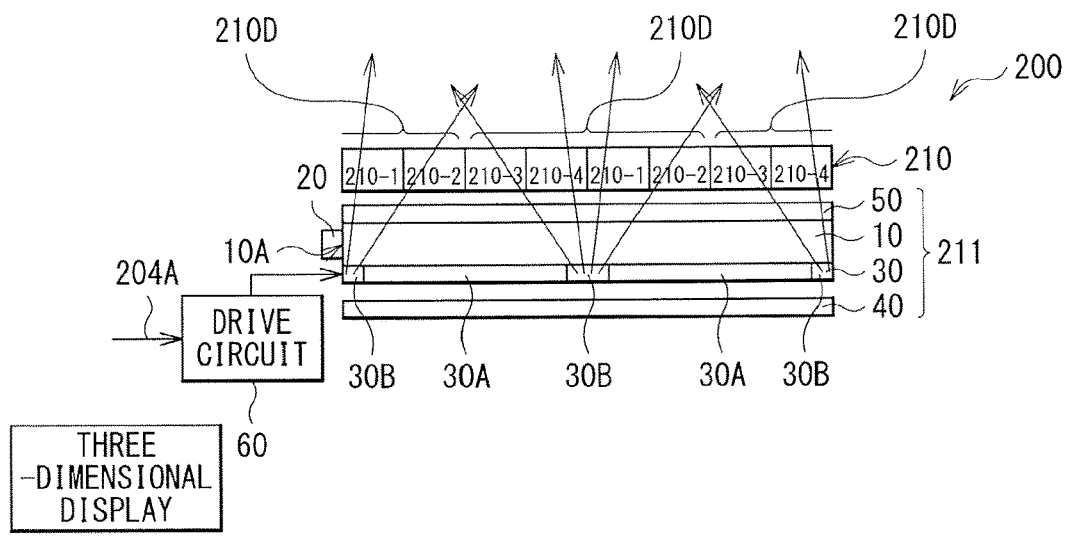
[ FIG. 111 ]
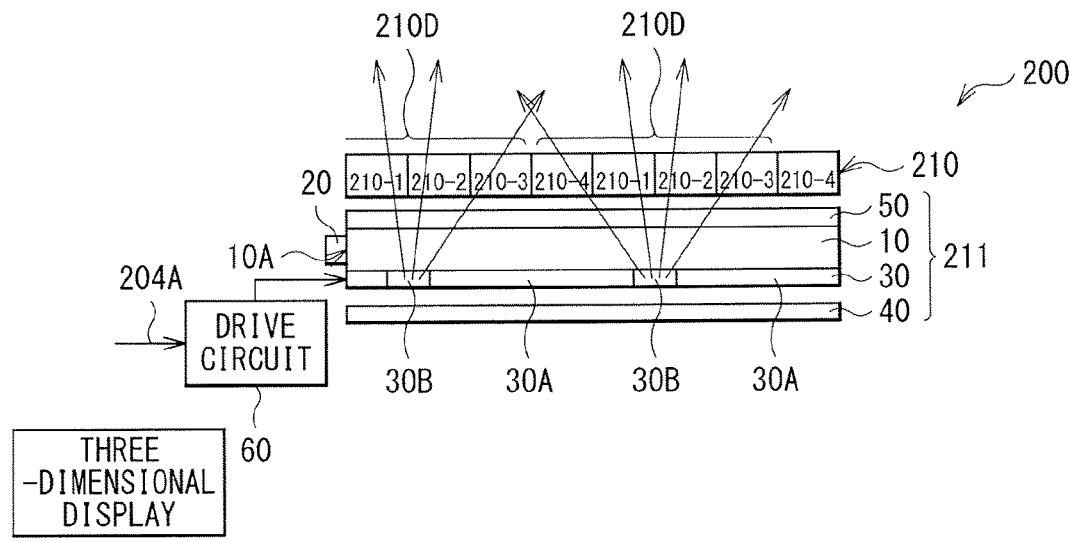

[ FIG. 112 ]
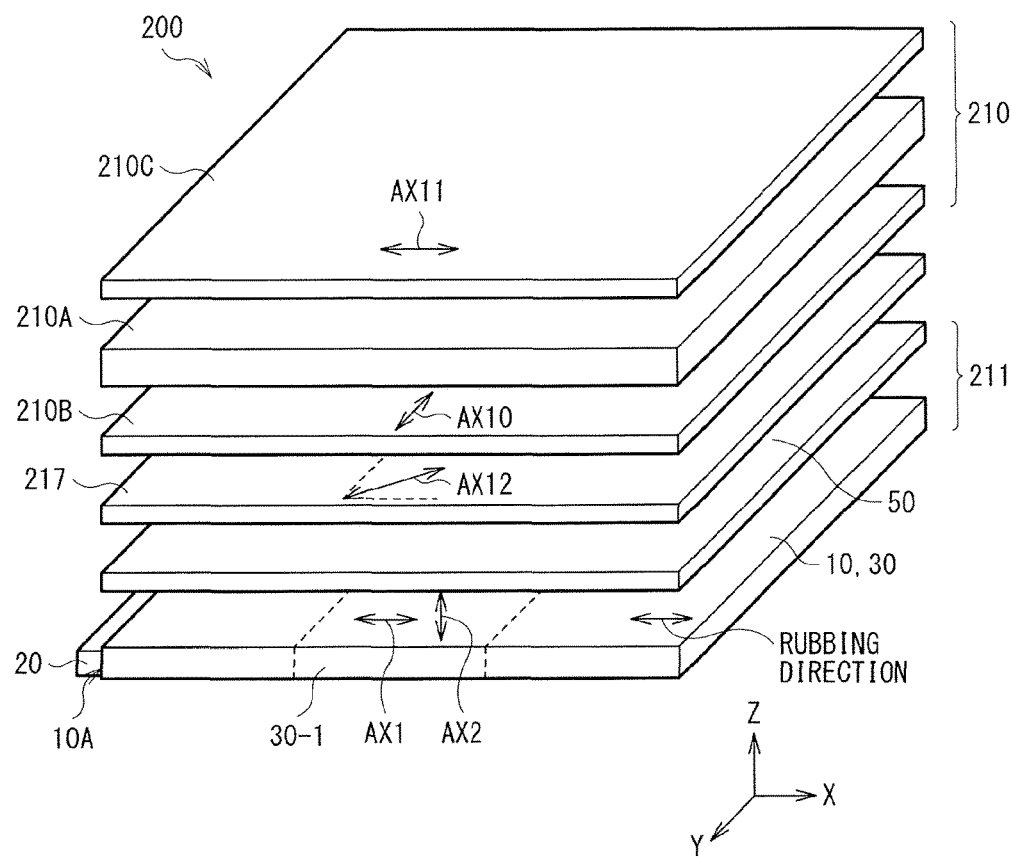

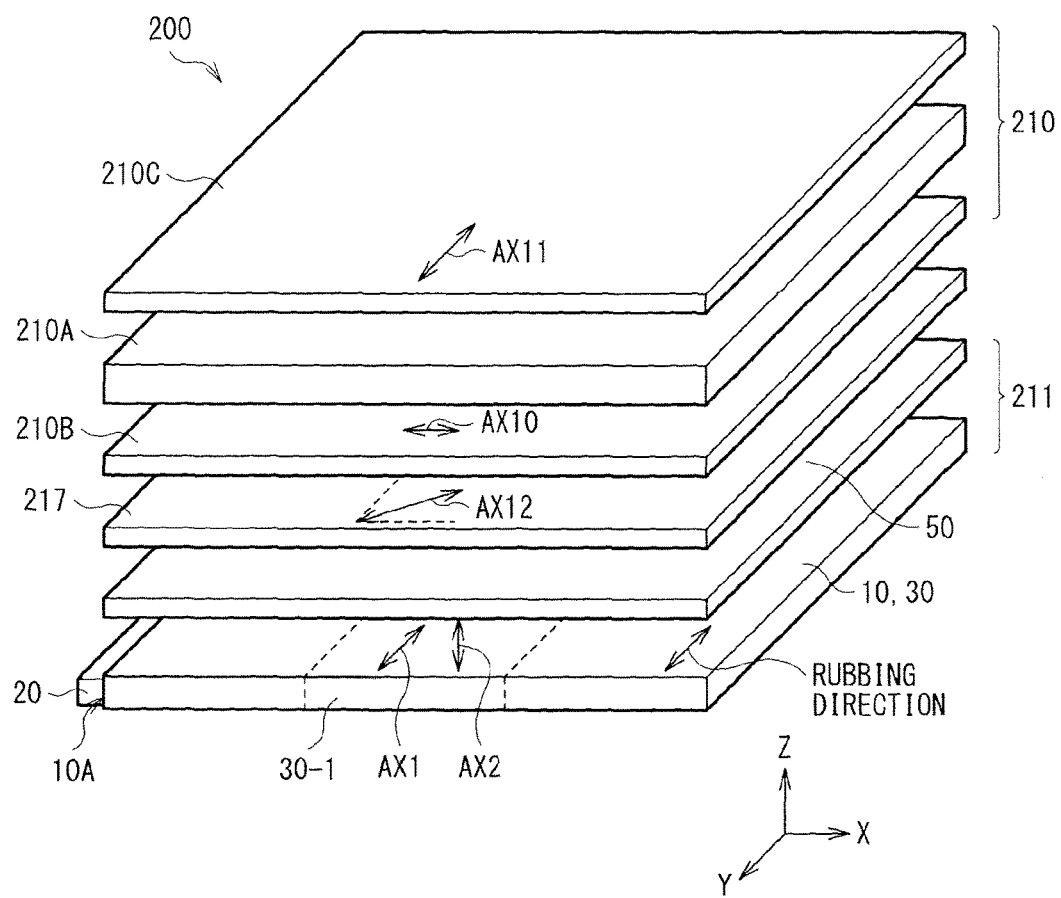
[ FIG. 113 ]

DISPLAY APPARATUS AND ILLUMINATION UNIT

TECHNICAL FIELD

The present technology relates to a display apparatus that is capable of performing two-dimensional display (planar display) and three-dimensional display (stereoscopic display), and to an illumination unit suitably applicable as a backlight of such a display apparatus.

BACKGROUND ART

Some display apparatuses capable of performing three-dimensional display require to wear eyeglasses dedicated therefor, and the others require no eyeglasses dedicated therefor. The latter display apparatuses use a lenticular lens, a parallax barrier, etc. in order to allow a stereoscopic picture to be perceived with naked eyes. Picture information is thus distributed to left and right eyes, and different pictures are thereby viewed between the left and right eyes. As a result, three-dimensional display is achieved.

By the way, in a case where a physical barrier is provided in the display apparatus that is capable of allowing a stereoscopic picture to be perceived with naked eyes, it is necessary to provide a switchable diffuser between the bather and a display panel. Patent Document 1 proposes a way to provide a simple configuration with using such a diffuser.

PRIOR ART DOCUMENT

Patent Document

Patent Document 1: Japanese Unexamined Patent Application Publication No. 2007-519033

SUMMARY OF THE INVENTION

However, in Patent Document 1, a polarization-dependent scatterer is used as the diffuser, and a polarizer is further used for causing polarized light to enter the polarization-dependent scatterer. This has caused an issue that light is absorbed by the polarizer, which results in decrease in display luminance.

Accordingly, it is desirable to provide an illumination unit capable of achieving high luminance and a display apparatus including the illumination unit.

An illumination unit of an embodiment of the present technology is used as an illumination unit that is allowed to output illumination light in a display apparatus provided with a display panel configured to modulate the illumination light based on a picture signal and thereby generate picture light. The illumination unit of an embodiment of the present technology includes an illumination optical system configured to generate the illumination light, and a plurality of lenses configured to reduce a divergence angle of the illumination light. The illumination optical system includes a first substrate and a second substrate arranged to be separated from each other and to be opposed to each other, and a light source configured to apply light onto an end surface of one of the first substrate and the second substrate. The illumination optical system also includes a light modulation layer provided in a gap between the first substrate and the second substrate and configured to exhibit scattering characteristics or transparent characteristics, with respect to the light from the light source, depending on magnitude of an electric field. The illumination optical system also includes an electrode configured to generate an electric filed that generates, in the light modulation layer, a plurality of linear scattering regions or a plurality of first dot-like scattering regions in a three-dimensional display mode, and to generate an electric field that generates, in the light modulation layer, a planar scattering region or a plurality of second dot-like scattering regions in a two-dimensional display mode, the first dot-like scattering regions being arranged side by side in a plurality of lines, and the second dot-like scattering regions being arranged side by side in a matrix. The lenses are arranged side by side in one of a direction in which the linear scattering regions extend, a direction in which a plurality of the first dot-like scattering regions are arranged side by side in a line, and a direction in which a plurality of the second dot-like scattering regions are arranged side by side in a line. The lenses are also arranged side by side in a direction intersecting with one of the direction in which the linear scattering regions extend, the direction in which the plurality of first dot-like scattering regions are arranged side by side in the line, and the direction in which the plurality of second dot-like scattering regions are arranged side by side in the line.

A display apparatus of an embodiment of the present technology includes an illumination unit allowed to output illumination light, and a display panel configured to modulate the illumination light based on a picture signal and thereby generate picture light. The illumination unit mounted on the display apparatus has a configuration similar to the configuration of the illumination unit of the embodiment described above.

In the illumination unit and the display apparatus of embodiments of the present technology, the light modulation layer that exhibits the scattering characteristics or the transparent characteristics, with respect to the light from the light source, depending on magnitude of an electric field is provided in the illumination unit. Accordingly, light that is emitted from the light source and propagates through the first substrate, etc. passes through a region, in the light modulation layer, that exhibits the transparent characteristics in response to control of the electric field, and is reflected totally or at high reflectance at a top surface of the illumination unit. As a result, luminance in a region (hereinafter, simply referred to as "transparent region in light exiting region") corresponding to a region, of the light exiting region of the illumination unit, that exhibits the transparent characteristics is decreased compared to in a case where the entire surface is caused to emit light uniformly. On the other hand, the light that propagates through the first substrate, etc. is scattered in a region, of the light modulation layer, that exhibits the scattering characteristics in response to the control of the electric field, and passes through the top surface of the illumination unit. As a result, luminance in a region (hereinafter, simply referred to as "scattering region in the light exiting region") corresponding to a region, of the light exiting region of the illumination unit, that exhibits the scattering characteristics is increased compared to in the case where the entire surface is caused to emit light uniformly. Moreover, luminance in partial white display (increase in luminance) is increased as the luminance in the transparent region in the light exiting region is decreased. In an embodiment of the present technology, a plurality of linear scattering regions or a plurality of first dot-like scattering regions that are arranged side by side in a plurality of lines are generated in the light modulation layer in the three-dimensional display mode. In an embodiment of the present technology, a planar scattering region or a plurality of second dot-like scattering regions that are arranged side by side in a matrix are generated in the light modulation layer in the two-dimensional display mode. At the time of performing three-dimensional display, the light from the light source is utilized to cause a plurality of linear light rays (or a plurality of linear light rays formed of a plurality of dot-like illumination light rays that are arranged side by side in a line) to exit from the light modulation layer. On the other hand, at the time of performing two-dimensional display, the light from the light source is utilized to cause planar light ray (or a planar light formed of a plurality of dot-like illumination light rays that are arranged side by side in a line) to exit from the light modulation layer. In such a manner, in an embodiment of the present technology, it is possible to perform switching between three-dimensional display and two-dimensional display without using a physical barrier, a polarizer, etc. Moreover, in an embodiment of the present technology, the plurality of lenses configured to reduce the divergence angle of the illumination light is provided in the illumination unit. The lenses are arranged side by side in one of the direction in which the linear scattering regions extend, the direction in which the plurality of first dot-like scattering regions are arranged side by side in the line, and the direction in which the plurality of second dot-like scattering regions are arranged side by side in the line. The lenses are also arranged side by side in the direction intersecting with one of the direction in which the linear scattering regions extend, the direction in which the plurality of first dot-like scattering regions are arranged side by side in the line, and the direction in which the plurality of second dot-like scattering regions are arranged side by side in the line. Accordingly, it is possible to increase an amount of light that enters the display panel at an appropriate viewing angle, compared to in a case where the lenses are not provided.

According to the illumination unit and the display apparatus according to embodiments of the present technology, it is possible to perform switching between three-dimensional display and two-dimensional display without using a physical barrier, a polarizer, etc., and it is also possible to increase amount of light that enters the display panel at an appropriate viewing angle. As a result, it is possible to achieve high luminance in a displayed picture.

BRIEF DESCRIPTION OF THE DRAWINGS

FIG. 1 is a diagram illustrating a cross-sectional configuration example of an illumination unit according to a first embodiment of the present technology.

FIG. 2 is a diagram illustrating a cross-sectional configuration example of a light modulation device illustrated in FIG. 1.

FIG. 3 is a diagram illustrating a planar configuration example of a bottom electrode illustrated in FIG. 2.

FIG. 4A is a diagram schematically illustrating an example of a function of a light modulation layer illustrated in FIG. 2.

FIG. 4B is a diagram illustrating an example of optical characteristics of a bulk and a microparticle illustrated in FIG. 4A.

FIG. 4C is a diagram schematically illustrating a state in which light passes through a light modulation layer illustrated in FIG. 4A.

FIG. 5A is a diagram schematically illustrating another example of the function of the light modulation layer illustrated in FIG. 2.

FIG. 5B is a diagram illustrating an example of optical characteristics of a bulk and a microparticle illustrated in FIG. 5A.

FIG. 5C is a diagram schematically illustrating a state in which light passes through a light modulation layer illustrated in FIG. 5A.

FIG. 6 is a diagram schematically illustrating an example of a function of the illumination unit illustrated in FIG. 1.

FIG. 7 is a diagram illustrating a perspective configuration example of a lens sheet illustrated in FIG. 1.

FIG. 8 is a diagram illustrating another example of the perspective configuration of the lens sheet illustrated in FIG. 1.

FIG. 9A is a diagram illustrating an example of a curved surface shape of a convex portion illustrated in FIGS. 7 and 8.

FIG. 9B is a diagram illustrating another example of the curved surface shape of the convex portion illustrated in FIGS. 7 and 8.

FIG. 10 is a diagram illustrating a cross-sectional configuration example of a lens sheet illustrated in FIG. 7, together with a light guide plate and the light modulation device.

FIG. 11 is a diagram illustrating a cross-sectional configuration example of a lens sheet illustrated in FIG. 8, together with the light guide plate and the light modulation device.

FIG. 12 is a diagram illustrating a first modification of the cross-sectional configuration example of the lens sheet illustrated in FIG. 7, together with the light guide plate and the light modulation device.

FIG. 13 is a diagram illustrating a first modification of the cross-sectional configuration example of the lens sheet illustrated in FIG. 8, together with the light guide plate and the light modulation device.

FIG. 14 is a diagram illustrating a second modification of the cross-sectional configuration example of the lens sheet illustrated in FIG. 7, together with the light guide plate and the light modulation device.

FIG. 15 is a diagram illustrating a second modification of the cross-sectional configuration example of the lens sheet illustrated in FIG. 8, together with the light guide plate and the light modulation device.

FIG. 16 is a diagram illustrating a third modification of the cross-sectional configuration example of the lens sheet illustrated in FIG. 7, together with the light guide plate and the light modulation device.

FIG. 17 is a diagram illustrating a third modification of the cross-sectional configuration example of the lens sheet illustrated in FIG. 8, together with the light guide plate and the light modulation device.

FIG. 18 is a diagram illustrating an example of a positional relationship between the convex portions of the lens sheet illustrated in FIGS. 7 and 8 and partial electrodes of the bottom electrode illustrated in FIG. 3.

FIG. 19 is a diagram illustrating a fourth modification of the cross-sectional configuration example of the lens sheet illustrated in FIG. 7, together with the light guide plate and the light modulation device.

FIG. 20 is a diagram illustrating a fourth modification of the cross-sectional configuration example of the lens sheet illustrated in FIG. 8, together with the light guide plate and the light modulation device.

FIG. 21 is a diagram illustrating a fifth modification of the cross-sectional configuration example of the lens sheet illustrated in FIG. 7, together with the light guide plate and the light modulation device.

FIG. 22 is a diagram illustrating a fifth modification of the cross-sectional configuration example of the lens sheet illustrated in FIG. 8, together with the light guide plate and the light modulation device.

FIG. 23 is a diagram illustrating a sixth modification of the cross-sectional configuration example of the lens sheet illustrated in FIG. 7, together with the light guide plate and the light modulation device.

FIG. 24 is a diagram illustrating a sixth modification of the cross-sectional configuration example of the lens sheet illustrated in FIG. 8, together with the light guide plate and the light modulation device.

FIG. 25 is a diagram illustrating a seventh modification of the cross-sectional configuration example of the lens sheet illustrated in FIG. 7, together with the light guide plate and the light modulation device.

FIG. 26 is a diagram illustrating a seventh modification of the cross-sectional configuration example of the lens sheet illustrated in FIG. 8, together with the light guide plate and the light modulation device.

FIG. 27 is a diagram illustrating a first modification of the bottom electrode illustrated in FIG. 2.

FIG. 28A is a diagram illustrating an example of a positional relationship between the convex portions of the lens sheet illustrated in FIGS. 7 and 8 and partial electrodes of a bottom electrode illustrated in FIG. 27.

FIG. 28B is a diagram illustrating another example of the positional relationship between the convex portions of the lens sheet illustrated in FIGS. 7 and 8 and the partial electrodes of the bottom electrode illustrated in FIG. 27.

FIG. 29 is a diagram illustrating a second modification of the bottom electrode illustrated in FIG. 2.

FIG. 30 is a diagram illustrating an example of a positional relationship between the convex portions of the lens sheet illustrated in FIGS. 7 and 8 and partial electrodes of a bottom electrode illustrated in FIG. 29.

FIG. 31 is a diagram illustrating a third modification of the bottom electrode illustrated in FIG. 2.

FIG. 32 is a diagram illustrating an example of a positional relationship between the convex portions of the lens sheet illustrated in FIGS. 7 and 8 and partial electrodes of a bottom electrode illustrated in FIG. 31.

FIG. 33 is a diagram illustrating a fourth modification of the bottom electrode illustrated in FIG. 2.

FIG. 34A is a diagram illustrating an example of a positional relationship between the convex portions of the lens sheet illustrated in FIGS. 7 and 8 and partial electrodes of a bottom electrode illustrated in FIG. 33.

FIG. 34B is a diagram illustrating another example of the positional relationship between the convex portions of the lens sheet illustrated in FIGS. 7 and 8 and the partial electrodes of the bottom electrode illustrated in FIG. 33.

FIG. 35 is a diagram illustrating a fifth modification of the bottom electrode illustrated in FIG. 2.

FIG. 36 is a diagram illustrating an example of a positional relationship between the convex portions of the lens sheet illustrated in FIGS. 7 and 8 and partial electrodes of a bottom electrode illustrated in FIG. 35.

FIG. 37 is a diagram illustrating a sixth modification of the bottom electrode illustrated in FIG. 2.

FIG. 38 is a diagram illustrating a first modification of the cross-sectional configuration of the light modulation device illustrated in FIG. 1.

FIG. 39 is a diagram illustrating a planar configuration example of a top electrode illustrated in FIG. 38.

FIG. 40 is a diagram illustrating a first modification of the top electrode illustrated in FIG. 38.

FIG. 41 is a diagram illustrating a second modification of the top electrode illustrated in FIG. 38.

FIG. 42 is a diagram illustrating a third modification of the top electrode illustrated in FIG. 38.

FIG. 43 is a diagram illustrating a fourth modification of the top electrode illustrated in FIG. 38.

FIG. 44 is a diagram illustrating a fifth modification of the top electrode illustrated in FIG. 38.

FIG. 45 is a diagram illustrating a second modification of the cross-sectional configuration of the light modulation device illustrated in FIG. 1.

FIG. 46 is a diagram illustrating a planar configuration example of a top electrode illustrated in FIG. 45.

FIG. 47 is a diagram illustrating a planar configuration example of a bottom electrode illustrated in FIG. 45.

FIG. 48 is a diagram illustrating a first modification of a combination of the top electrode and the bottom electrode illustrated in FIG. 45.

FIG. 49 is a diagram illustrating a second modification of the combination of the top electrode and the bottom electrode illustrated in FIG. 45.

FIG. 50 is a diagram illustrating a third modification of the combination of the top electrode and the bottom electrode illustrated in FIG. 45.

FIG. 51 is a diagram illustrating a fourth modification of the combination of the top electrode and the bottom electrode illustrated in FIG. 45.

FIG. 52 is a diagram illustrating a fifth modification of the combination of the top electrode and the bottom electrode illustrated in FIG. 45.

FIG. 53 is a diagram illustrating a sixth modification of the combination of the top electrode and the bottom electrode illustrated in FIG. 45.

FIG. 54 is a diagram illustrating a seventh modification of the combination of the top electrode and the bottom electrode illustrated in FIG. 45.

FIG. 55 is a diagram illustrating an eighth modification of the combination of the top electrode and the bottom electrode illustrated in FIG. 45.

FIG. 56A is a diagram illustrating a modification of the bottom electrode illustrated in FIGS. 2 and 33.

FIG. 56B is a diagram illustrating another modification of the bottom electrode illustrated in FIGS. 2 and 33.

FIG. 57A is a diagram illustrating a modification of the top electrode illustrated in FIGS. 2 and 43.

FIG. 57B is a diagram illustrating another modification of the top electrode illustrated in FIGS. 2 and 43.

FIG. 58 is a diagram illustrating a first modification of the cross-sectional configuration of the illumination unit illustrated in FIG. 1.

FIG. 59 is a diagram illustrating a second modification of the cross-sectional configuration of the illumination unit illustrated in FIG. 1.

FIG. 60 is a diagram illustrating an example of ends of the bottom electrode illustrated in FIGS. 2 and 45 and the top electrode illustrated in FIGS. 38 and 45.

FIG. 61 is a diagram illustrating another example of the ends of the bottom electrode illustrated in FIGS. 2 and 45 and the top electrode illustrated in FIGS. 38 and 45.

FIG. 62 is a diagram illustrating an example of pattern density distribution in the electrode.

FIG. 63 is a diagram illustrating a first modification of the pattern density distribution in the electrode.

FIG. 64 is a diagram illustrating a second modification of the pattern density distribution in the electrode.

FIG. 65 is a diagram illustrating a third modification of the pattern density distribution in the electrode.

FIG. 66 is a diagram illustrating, in a graph, the pattern density distribution in the electrode.

FIG. 67 is a diagram illustrating an example of luminance distribution in a case where the electrode having the pattern density illustrated in FIG. 66 is used.

FIG. 68 is a schematic diagram for describing an example of a function of the light modulation device.

FIG. 69 is a schematic diagram for describing another example of the function of the light modulation device.

FIG. 70 is a schematic diagram for describing still another example of the function of the light modulation device.

FIG. 71A is a perspective view illustrating an example of a configuration of a light source illustrated in FIG. 1.

FIG. 71B is a perspective view illustrating another example of the configuration of the light source illustrated in FIG. 1.

FIG. 71C is a perspective view illustrating still another example of the configuration of the light source illustrated in FIG. 1.

FIG. 72A is a perspective view illustrating an example of a configuration of the light guide plate illustrated in FIG. 1.

FIG. 72B is a perspective view illustrating another example of the configuration of the light guide plate illustrated in FIG. 1.

FIG. 73A is a perspective view illustrating another example of the configuration of the light guide plate illustrated in FIG. 1.

FIG. 73B is a cross-sectional view illustrating an example of a configuration of a light guide plate illustrated in FIG. 73A.

FIG. 74A is a schematic diagram illustrating an example of a function of the light guide plate illustrated in FIGS. 72 and 73.

FIG. 74B is a schematic diagram illustrating another example of the function of the light guide plate illustrated in FIGS. 72 and 73.

FIG. 75 is a diagram illustrating a modification of the bottom electrode and the top electrode.

FIG. 76 is a diagram illustrating a modification of the bottom electrode and the top electrode.

FIG. 77 is a diagram illustrating a modification of the bottom electrode and the top electrode.

FIG. 78 is a diagram illustrating a modification of the bottom electrode and the top electrode.

FIG. 79 is a diagram illustrating, in a graph, pattern density distribution of the electrode.

FIG. 80 is a diagram illustrating an example of luminance distribution in a case where the electrode having the pattern density illustrated in FIG. 79 is used.

FIG. 81 is a diagram illustrating a modification of the bottom electrode.

FIG. 82 is a diagram illustrating a modification of the bottom electrode.

FIG. 83 is a diagram illustrating a modification of the bottom electrode.

FIG. 84 is a diagram illustrating a modification of the bottom electrode.

FIG. 85 is a diagram illustrating a modification of the bottom electrode.

FIG. 86 is a diagram illustrating a modification of the bottom electrode.

FIG. 87 is a diagram illustrating a modification of the bottom electrode.

FIG. 88 is a diagram illustrating a first modification of the cross-sectional configuration of the light modulation device illustrated in FIG. 1.

FIG. 89 is a diagram illustrating a second modification of the cross-sectional configuration of the light modulation device illustrated in FIG. 1.

FIG. 90 is a diagram illustrating a third modification of the cross-sectional configuration of the light modulation device illustrated in FIG. 1.

FIG. 91 is a diagram illustrating a third modification of the cross-sectional configuration of the illumination unit illustrated in FIG. 1.

FIG. 92 is a diagram illustrating an example of a receiving-transmitting system of a television broadcast signal according to a second embodiment of the present technology.

FIG. 93 is a diagram illustrating an example of a functional block of a receiver apparatus illustrated in FIG. 92.

FIG. 94 is a diagram illustrating a cross-sectional configuration example of a display section in the receiver apparatus illustrated in FIG. 92.

FIG. 95 is a perspective view illustrating an example of a relationship between a rubbing direction in the display section and a transmission axis of a polarizing plate illustrated in FIG. 94.

FIG. 96 is a perspective view illustrating another example of the relationship between the rubbing direction in the display section and the transmission axis of the polarizing plate illustrated in FIG. 94.

FIG. 97 is a schematic diagram for describing three-dimensional display in the display section illustrated in FIG. 94.

FIG. 98 is a schematic diagram for describing two-dimensional display in the display section illustrated in FIG. 94.

FIG. 99 is a cross-sectional view illustrating a first modification of the lens sheet.

FIG. 100 is a cross-sectional view illustrating a second modification of the lens sheet.

FIG. 101 is a cross-sectional view illustrating a first modification of the display section illustrated in FIG. 94.

FIG. 102 is a cross-sectional view illustrating a second modification of the display section illustrated in FIG. 94.

FIG. 103 is a diagram illustrating a cross-sectional configuration example of a parallax bather.

FIG. 104 is a schematic diagram illustrating a cross-sectional configuration example of a display section illustrated in FIG 101.

FIG. 105 is a schematic diagram illustrating an example of a relationship between pixels in a display panel and light from a backlight.

FIG. 106A is a schematic diagram illustrating an example of the light from the backlight.

FIG. 106B is a schematic diagram illustrating an example of a relationship between pixels in the display panel and the light from the backlight illustrated in FIG. 106A.

FIG. 107A is a schematic diagram illustrating another example of the light from the backlight.

FIG. 107B is a schematic diagram illustrating an example of a relationship between the pixels in the display panel and light from a backlight illustrated in FIG. 107A.

FIG. 108 is a schematic diagram illustrating an example of time-divisional drive in three-dimensional display.

FIG. 109 is a schematic diagram illustrating an example of the time-divisional drive following that illustrated in FIG. 108.

FIG. 110 is a schematic diagram illustrating an example of the time-divisional drive following that illustrated in FIG. 109.

FIG. 111 is a schematic diagram illustrating an example of the time-divisional drive following that illustrated in FIG. 110.

FIG. 112 is a cross-sectional view illustrating a fifth modification of the display section illustrated in FIG. 94.

FIG. 113 is a cross-sectional view illustrating a sixth modification of the display section illustrated in FIG. 94.

EMBODIMENTS OF THE INVENTION

Some embodiments of the invention are described below in detail with reference to the drawings. Incidentally, the description is provided in the following order.
1. First Embodiment (Illumination Unit)
2. Modifications of First Embodiment (Illumination Unit)
3. Second Embodiment (Receiver Apparatus)
4. Modifications of Second Embodiment (Receiver Apparatus)
5. Examples

[1. First Embodiment]

FIG. 1 illustrates a cross-sectional configuration of an illumination unit 1 according to a first embodiment of the present technology. The illumination unit 1 is applicable as a backlight of a display apparatus, and is allowed to output illumination light. The illumination unit 1 may include, for example, a light guide plate 10, a light source 20, a light modulation device 30, a reflection plate 40, a lens sheet 50, and a drive circuit 60. The light source 20 may be arranged on a side surface of the light guide plate 10. The light modulation device 30 may be arranged inside the light guide plate 10. The reflection plate 40 may be arranged on the back of the light guide plate 10. The lens sheet 50 may be arranged above the light guide plate 10. The drive circuit 60 may drive the light modulation device 30.

It is to be noted that the light guide plate 10 corresponds to a specific example of "first substrate" or "second substrate" in the present technology. The light source 20 corresponds to a specific example of "light source" in the present technology. An optical system configured of the light source 20, the light modulation device 30, and the reflection plate 40 corresponds to a specific example of "illumination optical system" in the present technology.

(Light Guide Plate 10)

The light guide plate 10 guides light from the light source 20 arranged on the side surface of the light guide plate 10 toward a top surface of the light guide plate 10 (specifically, a light exiting surface 1A of the illumination unit 1). The light guide plate 10 may have, for example, a shape corresponding to a subject to be illuminated (for example, a display panel 210 which is described later) that is arranged on the top surface of the light guide plate 10. For example, the light guide plate 10 may have a cuboid shape that is surrounded by a top surface, a bottom surface, and side surfaces. It is to be noted that, out of the side surfaces of the light guide plate 10, the side surface which the light from the light source 20 enters is referred to as a light entering surface 10A below.

The light guide plate 10 may have, for example, a shape having a predetermined pattern on one or both of the top surface and the bottom surface. The light guide plate 10 may have, for example, a function of scattering and uniformizing light entered from the light entering surface 10A. It is to be noted that, in a case where luminance is uniformized by modulating a voltage to be applied to the light modulation device 30, a flat light guide plate that has not been patterned may be used as the light guide plate 10. The light guide plate 10 may be, for example, a transparent substrate that mainly includes a transparent thermoplastic resin such as a polycarbonate resin (PC) or an acrylic resin (polymethylmethacrylate (PMMA)).

(Light Source 20)

The light source 20 is a linear light source, and may be configured, for example, of a hot cathode fluorescent lamp (HCFL), a cold cathode fluorescent lamp (CCFL), a plurality of LEDs (Light Emitting Diodes) arranged in a line, or the like. In a case where the light source 20 is configured of the plurality of LEDs, all of the LEDs may be preferably configured of white LEDs in view of efficiency, reduction in thickness, and uniformity. It is to be noted that, the light source 20 may include a red LED, a green LED, and a blue LED, for example. The light source 20 may be provided only on one side surface of the light guide plate 10 (see FIG. 1), or may be provided on two side surfaces, three side surfaces, or all of the side surfaces of the light guide plate 10.

(Light Modulation Device 30)

In the present embodiment, the light modulation device 30 is closely attached to inside of the light guide plate 10 with no air layer in between. The light modulation device 30 may be adhered to the light guide plate 10 with an adhesive (not illustrated) in between, for example. As illustrated in FIG. 2, the light modulation device 30 may include, for example, a transparent substrate 31, a bottom electrode 32, an alignment film 33, a light modulation layer 34, an alignment film 35, a top electrode 36, and a transparent substrate 37 that are arranged in order from the reflection plate 40. It is to be noted that FIG. 2 illustrates a cross-sectional configuration example of the light modulation device 30. The bottom electrode 32 and the top electrode 36 correspond to a specific example of "electrode" in the present technology. The light modulation layer 34 corresponds to a specific example of "light modulation layer" in the present technology.

The transparent substrates 31 and 37 are arranged to be separated from each other and to be opposed to each other. The transparent substrates 31 and 37 support the light modulation layer 34. Generally, each of the transparent substrates 31 and 37 may be configured of a substrate transparent with respect to visible light such as a glass plate or a plastic film. The top electrode 36 and the bottom electrode 32 are configured to generate an electric field that generates, in the light modulation layer 34, a plurality of dot-like scattering regions that are arranged side by side in a plurality of lines or a plurality of linear scattering regions in a three-dimensional mode. Further, the top electrode 36 and the bottom electrode 32 are configured to generate an electric field that generates, in the light modulation layer 34, a planar scattering region or a plurality of dot-like scattering regions that are arranged side by side in a matrix in a two-dimensional display mode. It is to be noted that the linear scattering region, the dot-like scattering region, and the planar scattering region are described in detail when description of the light modulation layer 34 is provided.

The top electrode 36 is provided on a surface, of the transparent substrate 37, that is opposed to the transparent substrate 31. The top electrode 36 may be configured, for example, of one sheet-like electrode (continuous film) that is formed over the entire inside of the surface. On the other hand, the bottom electrode 32 is provided on a surface, of the transparent substrate 31, that is opposed to the transparent substrate 37. As illustrated in FIGS. 2 and 3, the bottom electrode 32 may be configured, for example, of a plurality of partial electrodes 32A. It is to be noted that FIG. 3 illustrates a planar configuration example of the bottom electrode 32.

As illustrated in FIG. 3, each of the partial electrodes 32A may have a block shape, and the partial electrodes 32A may be arranged in a matrix, for example. The partial electrodes 32A may be arranged side by side in a direction parallel to the light entering surface 10A, and may be also arranged side by side in a direction orthogonal to the light entering surface 10A, for example. When a plurality of partial electrodes 32A that are arranged side by side in a line in the direction parallel to the light entering surface 10A, out of the two arrangement directions of the partial electrodes 32A, are considered one linear electrode 32D, an arrangement direction (direction orthogonal to the light entering surface 10A) of the linear electrode 32D corresponds to a parallax direction at the time of performing three-dimensional display.

The bottom electrode 32 is configured to generate an electric field that generates, with respect to the light modulation layer 34, a plurality of lines of linear scattering regions (or a plurality of dot-like scattering regions that are arranged side by side in a line), when three-dimensional display is performed in the display apparatus (in the three-dimensional display mode). A plurality of specific linear electrodes 32D (hereinafter, referred to as "linear electrodes 32B") out of the linear electrodes 32D are configured to generate an electric field that generates, in the light modulation layer 34, a plurality of dot-like scattering regions that are arranged side by side in a line or a linear scattering region in the three-dimensional display mode. In other words, in the three-dimensional display mode, only part of the partial electrodes 32A are used in order to generate a plurality of lines of linear scattering regions (or a plurality of dot-like scattering regions that are arranged side by side in a line). The linear electrodes 32B are arranged at a pitch P1 (a pitch same as a pitch P2 of the pixels or a pitch similar thereto) that corresponds to the pitch P2 (see FIG. 97) of the pixels at the time when three-dimensional display is performed in the display apparatus.

A plurality of linear electrodes 32D (hereinafter, referred to as "linear electrodes 32C") that are electrodes excluding the linear electrodes 32B from the linear electrodes 32D are configured to generate, together with the linear electrodes 32B, an electric field that generates, with respect to the light modulation layer 34, a planar scattering region or a plurality of dot-like scattering regions that are arranged side by side in a matrix when two-dimensional display is performed in the display apparatus (in the two-dimensional display mode). In other words, in the two-dimensional display mode, all of the partial electrodes 32A are used in order to generate the planar scattering region or the plurality of dot-like scattering regions that are arranged side by side in a matrix with respect to the light modulation layer 34. Whether illumination light generated in response to drive of the linear electrodes 32B is seen as linear light or dot-like light depends on a size of a pitch P3 of a plurality of partial electrodes 32A included in the linear electrode 32D.

The scattering region inside the light modulation layer 34 is to be a light emitting region when light propagates inside the scattering region as described later. Accordingly, the linear electrodes 32B are used to generate a plurality of dot-like illumination light rays that are arranged side by side in a line or a linear illumination light ray in the three-dimensional display mode. Further, all of the linear electrodes 32D are used to generate a planar illumination light ray or a plurality of dot-like illumination light rats that are arranged in a matrix in the two-dimensional display mode.

The linear electrodes 32B and the linear electrodes 32C are arranged regularly in the direction orthogonal to the light entering surface 10A. As illustrated in FIGS. 2 and 3, for example, a plurality of sets of linear electrode groups may be arranged in the direction orthogonal to the light entering surface 10A where one set is configured of one linear electrode 32B and two linear electrodes 32C. A width of the linear electrode 32B may be, for example, smaller than a width of the pixel in the display apparatus. It is to be noted that the linear electrode group may not always configured of one linear electrode 32B and two linear electrodes 32C, and may be configured of one linear electrode 32B and three linear electrodes 32C, for example, which is not illustrated.

The bottom electrode 32 and the top electrode 36 may be each configured of an optically-transmissive conductive film (or a transparent conductive film). The optically-transmissive conductive film (or the transparent conductive film) may be configured, for example, of ITO. It is to be noted that the bottom electrode 32 and the top electrode 36 may be each configured of indium zinc oxide (IZO), metal nanowire, carbon nanotube, graphene, etc.

When viewing the bottom electrode 32 and the top electrode 36 from a direction of a normal to the light modulation device 30, a portion, of the light modulation device 30, that corresponds to a place where the bottom electrode 32 and the top electrode 36 are opposed to each other configures a light modulation cell 30-1 (see FIG. 2). It is to be noted that each light modulation cell 30-1 corresponds to a specific example of "dot-like scattering region" in the present technology. Also, a cell configured of a plurality of light modulation cells 30-1 that are arranged side by side in a line corresponds to a specific example of "linear scattering region" or "a plurality of dot-like scattering regions that are arranged side by side in a line" in the present technology. A cell configured of all light modulation cells 30-1 corresponds to a specific example of "planar scattering region" or "a plurality of dot-like scattering regions that are arranged side by side in a matrix" in the present technology.

The light modulation cell 30-1 corresponds to a portion, of the light modulation device 30, that corresponds to a place where the bottom electrode 32 and the top electrode 36 are opposed to each other. When three-dimensional display is performed in the display apparatus, a light modulation cell 30a (see FIG. 2) that includes the linear electrode 32B out of the light modulation cells 30-1 is used to generate a linear illumination light ray or a plurality of dot-like illumination light rays that are arranged side by side in a line. When two-dimensional display is performed in the display apparatus, a light modulation cell 30b (see FIG. 2) that includes the linear electrode 32C out of the light modulation cells 30-1 is used to generate a planar illumination light ray, together with the light modulation cells 30a. In other words, when two-dimensional display is performed in the display apparatus, all of the light modulation cells 30-1 are used to generate a plurality of dot-like illumination light rays that are arranged in a matrix or the planar illumination light ray.

The respective modulation cells 30-1 are allowed to be driven separately and independently by applying a predetermined voltage to the partial electrodes 32A and the top electrode 36. Each of the respective light modulation cells 30-1 exhibits transparent characteristics or scattering characteristics with respect to light from the light source 20, depending on magnitude of a value of a voltage to be applied to the partial electrode 32A and the top electrode 36. It is to be noted that the transparent characteristics and the scattering characteristics are described in detail when description of the light modulation layer 34 is provided.

Each of the alignment films 33 and 35 may align liquid crystal or monomers used for the light modulation layer 34, for example. Examples of kinds of the alignment film may include a vertical alignment film and a horizontal alignment film. However, the horizontal alignment film is used for each of the alignment films 33 and 35 in the present embodiment. Examples of the horizontal alignment film may include an alignment film that is formed by performing a rubbing process on polyimide, polyamide imide, polyvinyl alcohol, etc. and an alignment film provided with a groove shape by transferring, etching, etc. Examples of the horizontal alignment film may further include an alignment film formed by obliquely depositing an inorganic material such as silicon oxide, a diamond-like carbon alignment film formed by ion beam irradiation, and an alignment film formed with an electrode pattern slit. In a case where a plastic film is used for each of the transparent substrates 31 and 37, a firing temperature after applying the alignment films 33 and 35 onto surfaces of the transparent substrates 31 and 37 may be preferably as low as possible in a manufacturing process. For this reason, polyamide imide that is allowed to be formed at a temperature of 100° C. or lower may be preferably used for each of the alignment films 33 and 35.

Moreover, in either of the vertical alignment film and the horizontal alignment film, it is enough that a function of aligning liquid crystal and monomers is provided, and reliability based on repeated application of voltages which is required in a usual liquid crystal display, etc. are not necessary, because reliability based on voltage application after forming a device is determined by an interface of polymerized monomers and liquid crystal. Further, even without the alignment film, it may be possible to align the liquid crystal, the monomers, etc. used for the light modulation layer 34, for example, by applying an electric field, a magnetic field, etc. between the bottom electrode 32 and the top electrode 36. In other words, it is possible to fix an alignment state of the liquid crystal, the monomers, etc. in a voltage-applied state by applying ultraviolet rays while applying an electric field, a magnetic field, etc. between the bottom electrode 32 and the top electrode 36. In a case where a voltage is used for forming the alignment film, electrodes may be formed separately for alignment and driving, or dual-frequency liquid crystal having a sign of dielectric constant anisotropy that is inverted depending on frequency may be used as a liquid crystal material. Alternatively, in a case where a magnetic field is used for forming the alignment film, a material that has large magnetic susceptibility anisotropy may be preferably used as the alignment film. For example, a material that has a large number of benzene rings may be preferably used.

The light modulation layer 34 is provided in a gap between the transparent substrate 31 and the transparent substrate 37. The light modulation layer 34 exhibits scattering characteristics or transparent characteristics with respect to light from the light source 20, depending on magnitude of an electric field. The light modulation layer 34 exhibits the transparent characteristics with respect to the light from the light source 20 when the electric field is relatively small, and the light modulation layer 34 exhibits scattering characteristics with respect to the light from the light source 20 when the electric field is relatively large. As illustrated in FIG. 2, the light modulation layer 34 may be configured, for example, of a composite layer that includes a bulk 34A and a plurality of microparticulate microparticles 34B that are dispersed in the bulk 34A. The bulk 34A and the microparticles 34B have optical anisotropy.

FIG. 4A schematically illustrates an example of an alignment state inside the microparticles 34B at the time when no voltage is applied between the bottom electrode 32 and the top electrode 36. It is to be noted that illustration of an alignment state inside the bulk 34A is omitted in FIG. 4A. FIG. 4B illustrates an example of a refractive index ellipsoid that shows refractive index anisotropy of the bulk 34A and the microparticles 34B at the time when no voltage is applied between the bottom electrode 32 and the top electrode 36. The refractive index ellipsoid illustrates, using a tensor ellipsoid, a refractive index of linear polarized light that has entered from various directions. It is possible to geometrically know the refractive index by viewing a cross-section of the ellipsoid from a direction from which light enters. FIG. 4C schematically illustrates an example of a state in which light L1 that travels in a front direction and light L2 that travels in an oblique direction pass through the light modulation layer 34 at the time when no voltage is applied between the bottom electrode 32 and the top electrode 36.

FIG. 5A schematically illustrates an example of the alignment state inside the microparticles 34B at the time when a voltage is applied between the bottom electrode 32 and the top electrode 36. It is to be noted that illustration of an alignment state inside the bulk 34A is omitted in FIG. 5A. FIG. 5B illustrates an example of a refractive index ellipsoid that shows the refractive index anisotropy of the bulk 34A and the microparticles 34B at the time when a voltage is applied between the bottom electrode 32 and the top electrode 36. FIG. 5C schematically illustrates an example of a state in which the light L1 that travels in the front direction and the light L2 that travels in the oblique direction are scattered in the light modulation layer 34 at the time when a voltage is applied between the bottom electrode 32 and the top electrode 36.

As illustrated in FIGS. 4A and 4B, the bulk 34A and the microparticle 34B may have a configuration in which a direction of an optical axis AX1 of the bulk 34A and a direction of an optical axis AX2 of the microparticle 34B coincide with (are parallel to) each other when no voltage is applied between the bottom electrode 32 and the top electrode 36, for example. It is to be noted that the optical axes AX1 and AX2 each refer to a line parallel to a traveling direction of a light ray having a refractive index that has one value irrespective of polarization direction. Further, the directions of the optical axis AX1 and the optical axis AX2 do not necessarily coincide with each other. The direction of the optical axis AX1 and the direction of the optical axis AX2 may be different for some extent because of a manufacturing error, etc., for example.

Moreover, the microparticle 34B may have a configuration in which the optical axis AX2 becomes parallel to the light entering surface 10A of the light guide plate 10 when no voltage is applied between the bottom electrode 32 and the top electrode 36, for example. The microparticle 34B may further have a configuration in which the optical axis AX2 intersects with the surfaces of the transparent substrates 31 and 37 at a slight angle θ1 when no voltage is applied between the bottom electrode 32 and the top electrode 36, for example (see FIG. 4B). Incidentally, the angle θ1 is described in detail when description of a material configuring the microparticle 34B is provided.

On the other hand, the bulk 34A may have a configuration in which the optical axis AX1 of the bulk 34A is constant irrespective of whether or not a voltage is applied between the bottom electrode 32 and the top electrode 36, for example. Specifically, as illustrated in FIGS. 4A, 4B, 5A, and 5B, the bulk 34A may have a configuration in which the optical axis AX1 of the bulk 34A is parallel to the light entering surface 10A of the light guide plate 10 and intersects with the surfaces of the transparent substrates 31 and 37 at the predetermined angle θ1, for example. In other words, the optical axis AX1 of the bulk 34A is parallel to the optical axis AX2 of the microparticle 34B when no voltage is applied between the bottom electrode 32 and the top electrode 36.

It is to be noted that the optical axis AX2 is not necessarily parallel to the light entering surface 10A and does not necessarily intersect with the surfaces of the transparent substrates 31 and 37 at the angle θ1. The optical axis AX2 may intersect with the surfaces of the transparent substrates 31 and 37 at an angle slightly different from the angle θ1 because of a manufacturing error, etc., for example. Moreover, the optical axes AX1 and AX2 are not necessarily parallel to the light entering surface 10A. The optical axes AX1 and AX2 may intersect with the light entering surface 10A at a small angle because of a manufacturing error, etc., for example.

Here, an ordinary refractive index of the bulk 34A and an ordinary refractive index of the microparticle 34B may be preferably equal to each other, and an extraordinary refractive index of the bulk 34A and an extraordinary refractive index of the microparticle 34B may be preferably equal to each other. In this case, as illustrated in FIG. 4A, little refractive index difference is caused in all directions including the front direction and the oblique direction, and high transparent characteristics are achieved when no voltage is applied between the bottom electrode 32 and the top electrode 36, for example. Accordingly, as illustrated in FIG. 4C, the light L1 traveling in the front direction and the light L2 traveling in the oblique direction may not be scattered inside the light modulation layer 34 and may pass through the light modulation layer 34, for example. As a result, as illustrated in FIGS. 6A and 6B, the light L (light from the oblique direction) from the light source 20 may be totally reflected by an interface (a bottom surface of the transparent substrate 31 and a top surface of the light guide plate 10) of a transparent region (transmission region 30A) in the light modulation layer 34, and luminance (luminance in black display) in the transmission region 30A may be decreased, compared to that in a case where the entire surface is caused to emit light uniformly (a dashed-dotted line illustrated in FIG. 6B). It is to be noted that a profile of front luminance illustrated in FIG. 6B is obtained by providing a diffusion sheet (not illustrated) on the light guide plate 10 and measuring the front luminance through the diffusion sheet.

It is to be noted that the top surface (light exiting surface 10B in FIG. 6) of the light guide plate 10 that is one of the interfaces of the transmission region 30A may be preferably in contact with a material having a refractive index that is lower than a refractive index of the top surface of the light guide plate 10. A typical example of such a low refractive index material may be air. Alternatively, in a case where the top surface (light exiting surface 10B in FIG. 6) of the light guide plate 10 is adhered to the lens sheet 50, the low refractive index material to be in contact with the top surface of the light guide plate 10 may be a gluing agent or an adhesive.

As illustrated in FIGS. 5A and 5B, the bulk 34A and the microparticle 34B may have a configuration in which the directions of the optical axis AX1 and the optical axis AX2 are different from each other (intersect with each other or are almost orthogonal to each other) when a voltage is applied between the bottom electrode 32 and the top electrode 36, for example. Moreover, the microparticle 34B may have a configuration in which the optical axis AX2 of the microparticle 34B is parallel to the light entering surface 10A of the light guide plate 10 and intersects with the surfaces of the transparent substrates 31 and 37 at an angle θ2 (for example, 90°) that is larger than the angle θ1 when a voltage is applied between the bottom electrode 32 and the top electrode 36, for example. It is to be noted that the angle θ2 is described in detail when description is provided of the material configuring the microparticle 34B.

Accordingly, when a voltage is applied between the bottom electrode 32 and the top electrode 36, a refractive index difference is increased in all directions including the front direction and the oblique direction, and high scattering characteristics are achieved, in the light modulation layer 34. Accordingly, as illustrated in FIG. 5C, the light L1 traveling in the front direction and the light L2 traveling in the oblique direction may be scattered inside the light modulation layer 34, for example. As a result, as illustrated in FIG. 6A, the light L (light from the oblique direction) from the light source 20 may pass through an interface (an interface between air and the transparent substrate 31 or the light guide plate 10) of a scattering region 30B, and light that has passed through to the reflection plate 40 side may be reflected by the reflection plate 40 and may pass through the light modulation device 30, for example. Accordingly, luminance in the scattering region 30B becomes extremely higher compared to that in the case where the entire surface is caused to emit light uniformly (the dashed-dotted line illustrated in FIG. 6B). Further, luminance in partial white display (increase in luminance) is increased as the luminance in the transmission region 30A is decreased.

It is to be noted that the ordinary refractive indices of the bulk 34A and the microparticle 34B may be different in some extent because of a manufacturing error, etc., for example. The difference therebetween may be preferably 0.1 or smaller, and may be more preferably 0.05 or smaller, for example. The extraordinary refractive indices of the bulk 34A and the microparticle 34B may be also different in some extent because of a manufacturing error, etc., for example. The difference therebetween may be preferably 0.1 or smaller, and may be more preferably 0.05 or smaller, for example.

Moreover, a refractive index difference ($\Delta nP$=extraordinary refractive index neP–ordinary refractive index noP) of the bulk 34A, a refractive index difference ($\Delta nL$=extraordinary refractive index neL–ordinary refractive index noL) of the microparticle 34B, etc. may be preferably as large as possible. Such refractive index differences may be preferably 0.05 or larger, more preferably 0.1 or larger, and still more preferably 0.15 or larger. One reason for this is because, in a case where the refractive index differences of the bulk 34A and the microparticle 34B are large, scattering performance of the light modulation layer 34 is increased, and the light modulation layer 34 therefore becomes out of a light guide condition easily, which allows light from the light guide plate 10 to be easily extracted.

Moreover, the bulk 34A and the microparticle 34B are different from each other in response speed with respect to an electric field. The bulk 34A may have a streaky structure, a porous structure, or a rod-like structure that has response speed slower than response speed of the microparticle 34B, for example. The bulk 34A may be formed, for example, of a polymer material that is obtained by polymerizing low-molecular monomers. The bulk 34A may be formed, for example, by polymerizing, with the use of one or both of heat and light, materials (for example, monomers) that are aligned along the alignment direction of the microparticle 34B or the alignment directions of the alignment films 33 and 35 and has alignment characteristics and polymerization characteristics.

The streaky structure, the porous structure, or the rod-like structure of the bulk 34A may have a major axis in a direction that is parallel to the light entering surface 10A of the light guide plate 10 and intersects with the surfaces of the transparent substrates 31 and 37 at the slight angle θ1, for example. In a case where the bulk 34A has the streaky structure, an average streaky composition size in a minor-axis direction may be preferably from 0.1 μm to 10 μm both inclusive, and may be more preferably in a range from 0.2 μm to 2.0 μm both inclusive, in view of increase in scattering characteristics of guided light. In a case where the average streaky composition size in the minor-axis direction is from 0.1 μm to 10 μm both inclusive, the scattering performance inside the light modulation device 30 becomes about the same in a visible region from 380 nm to 780 nm. For this reason, it does not happen that only light having a specific wavelength component is increased or decreased in a plane, which achieves valance in the visible region in the plane. In a case where the average streaky composition size in the minor-axis direction is smaller than 0.1 μm or is over 10 μm, the scattering performance of the light modulation device 30 is low irrespective of wavelength, which makes it more difficult for the light modulation device 30 to serve as a light modulation device.

Moreover, in view of decrease in wavelength dependency of scattering, the average streaky composition size in the minor-axis direction may be preferably in a range from 0.5 μm to 5 μm both inclusive, and more preferably in a range from 1 μm to 3 μm. In such a case, wavelength dependency of scattering in the bulk 34A is suppressed when the light emitted from the light source 20 repeatedly passes through the bulk 34A inside the light modulation device 30 in a process that the light emitted from the light source 20 propagates inside the light guide plate 10. The size of the streaky composition is allowed to be observed with the use of a polarization microscope, a confocal microscope, an electron microscope, or the like.

On the other hand, the microparticle 34B may mainly include a liquid crystal material, and may have response speed that is sufficiently faster than the response speed of the bulk 34A, for example. The liquid crystal material (liquid crystal molecule) included inside the microparticle 34B may be, for example, a rod-like molecule. A liquid crystal molecule that has positive dielectric constant anisotropy (so-called positive liquid crystal) may be preferably used as the liquid crystal molecule included inside the microparticle 34B.

Here, the major-axis direction of the liquid crystal molecule is parallel to the optical axis AX1 inside the microparticle 34B when no voltage is applied between the bottom electrode 32 and the top electrode 36. At this time, the major-axis of the liquid crystal molecule inside the microparticle 34B is parallel to the light entering surface 10A of the light guide plate 10 and intersects with the surfaces of the transparent substrates 31 and 37 at the slight angle θ1. In other words, the liquid crystal molecule inside the microparticle 34B is aligned to be tilted at the angle θ1 in a plane parallel to the light entering surface 10A of the light guide plate 10 when no voltage is applied between the bottom electrode 32 and the top electrode 36. The angle θ1 is referred to as a pre-tilt angle, and may be preferably in a range from 0.1° to 30° both inclusive, for example. The angle θ1 may be more preferably in a range from 0.5° to 10° both inclusive, and still more preferably in a range from 0.7° to 2° both inclusive. When the angle θ1 is increased, efficiency in scattering tends to be decreased for a reason described later. Also, when the angle θ1 is made excessively small, variations are caused in an azimuth at which liquid crystal rises upon voltage application. For example, liquid crystal may rise at an azimuth in a 180-degree opposite direction (reverse tilt). This prevents effective utilization of the refractive index difference between the microparticle 34B and the bulk 34A. Accordingly, scattering efficiency is decreased, and luminance tends to be decreased.

Moreover, when a voltage is applied between the bottom electrode 32 and the top electrode 36, the major-axis direction of the liquid crystal molecule intersects with (or is orthogonal to) the optical axis AX1 inside the microparticle 34B. At this time, the major axis of the liquid crystal molecule inside the microparticle 34B is parallel to the light entering surface 10A of the light guide plate 10 and intersects with the surfaces of the transparent substrates 31 and 37 at the angle θ2 (for example, 90°) that is larger than the angle θ1. In other words, the liquid crystal molecule inside the microparticle 34B is aligned to be tilted at the angle θ2 in the plane parallel to the light entering surface 10A of the light guide plate 10 or to rise straightly at the angle θ2 (=90°) when a voltage is applied between the bottom electrode 32 and the top electrode 36.

As the above-described monomer having alignment characteristics and polymerization characteristics, any material may be used as long as the material optically has anisotropy and is capable of forming a composite with liquid crystal; however, a ultraviolet-curable low-molecular monomer may be preferably used in the present embodiment. Because a direction of optical anisotropy of liquid crystal may preferably coincide with a direction of optical anisotropy of a material (polymer material) formed by polymerizing low-molecular monomers in a state where no voltage is applied, the liquid crystal and the low-molecular monomers may be preferably aligned in the same direction before performing ultraviolet curing. In a case where the liquid crystal is used as the microparticle 34B, when the liquid crystal is a rod-like molecule, the monomer material to be used may preferably have a rod-like shape. Accordingly, a material that has both polymerization characteristics and liquid crystal characteristics may be preferably used as the monomer material. For example, the material may preferably have one or more functional groups selected from the group consisting of an acrylate group, a methacrylate group, an acryloyloxy group, a methacryloyloxy group, a vinylether group, and an epoxy group, as a polymerizable functional group. These functional groups are allowed to be polymerized by applying ultraviolet rays, infrared rays, or electron rays, by heating, etc. A liquid crystal material having a multi-functional group may be added in order to suppress decrease in alignment degree at the time of applying ultraviolet rays. In a case where the bulk 34A has the above-described streaky structure, a bi-functional liquid crystalline monomer may be preferably used as a raw material of the bulk 34A. Also, a mono-functional monomer may be added to the raw material of the bulk 34A in order to adjust temperature at which liquid crystal characteristics are exhibited, or a tri-or-more-functional monomer may be added thereto in order to improve crosslink density.

(Reflection Plate 40)

The reflection plate 40 causes light that has leaked from the back of the light guide plate 10 through the light modulation device 30 to return toward the light guide plate 10. The reflection plate 40 may have, for example, functions such as reflection, diffusion, and scattering. This allows efficient utilization of light emitted from the light source 20, and also contributes to improvement in front luminance. The reflection plate 40 may be configured, for example, of foamed PET (polyethylene terephthalate), a silver-deposited film, a multi-layered reflection film, white PET, or the like. In a case where the reflection plate 40 is provided with a function of regular reflection (specular reflection), the reflection plate 40 may be preferably configured, for example, of the silver-deposited film, the multi-layered reflection film, an aluminum-deposited film, or the like. Further, the reflection plate 40 may have a shape for reflecting light in a particular direction.

(Lens Sheet 50)

The lens sheet 50 reduces a divergence angle of light (illumination light) that exits from the top surface of the light guide plate 10. As illustrated in FIG. 1, the lens sheet 50 may be arranged above the light guide plate 10 so that a gap G is formed between a light entering surface (bottom surface) of the lens sheet 50 and the light exiting surface (top surface) of the light guide plate 10. The gap G is a layer filled with a material that has a refractive index smaller than a refractive index of the light exiting surface (top surface) of the light guide plate 10, and may be an air layer, for example. It is to be noted that the gap G may not be necessarily an air layer. For example, the gap G may be a layer filled with a gluing agent or an adhesive that is configured of the material that has a refractive index smaller than a refractive index of the light exiting surface (top surface) of the light guide plate 10.

As illustrated in FIG. 7, the lens sheet 50 may have a concave-convex surface in which a plurality of convex portions 50A are arranged in a matrix in a plane, for example. The convex portion 50A corresponds to a specific example of "lens" in the present technology. As illustrated in FIG. 7, the concave-convex surface may be arranged on the light exiting side of the lens sheet 50, for example. However, as illustrated in FIG. 8, the concave-convex surface may be arranged on the light entering side (on the light modulation layer 34 side) of the lens sheet 50. Light having a shallower angle out of the light exited from the light guide plate 10 is allowed to rise vertically in the case where the concave-convex surface is arranged on the light entering side of the lens sheet 50.

In the lens sheet 50, a surface opposite from the concave-convex surface may be a flat surface as illustrated in FIGS. 7 and 8, for example. In this case, the flat surface of the lens sheet 50 may be adhered directly onto a display panel (or a polarizing plate) with the use of a gluing agent or an adhesive. Moreover, in a case where the convex portions 50A are formed of a UV-curable resin or the like, the concave portions 50A may be formed directly on the display panel (or the polarizing plate). The lens sheet 50 may be arranged so that the above-described flat surface is parallel or almost parallel to the top surface of the light guide plate 10, for example.

The convex portions 50A are arranged side by side in a direction parallel to an extending direction of the linear electrode 32D, and are also arranged side by side in a direction intersecting with the extending direction of the linear electrode 32D. It is to be noted that, when the light modulation cell 30a is in a scattering state, the light modulation cell 30a serves as a dot-like scattering region. Accordingly, in this case, the convex portions 50A are arranged side by side in a direction parallel to an extending direction of the linear scattering region or an arrangement direction of the dot-like scattering regions that are arranged side by side in a line, and are also arranged side by side in a direction intersecting with the extending direction of the linear scattering region or the arrangement direction of the dot-like scattering regions that are arranged side by side in a line.

The convex portion 50A may include a curved surface. In a case where the convex portion 50A is arranged on the light exiting side of the lens sheet 50, a light exiting surface of the convex portion 50A may be configured only of a curved surface, or may be configured of a composite surface of a curved surface and a planar surface or a polyangular surface. Alternatively, in a case where the convex portion 50A is arranged on the light entering side of the lens sheet 50, the light entering surface of the convex portion 50A may be configured only of a curved surface, or may be configured of a composite surface of a curved surface and a planar surface or a polyangular surface. The convex portion 50A has a convex shape that protrudes on the light exiting side of the lens sheet 50 in the case where the convex portion 50A is arranged on the light exiting side of the lens sheet 50. Alternatively, the convex portion 50A has a convex shape that protrudes on the light entering side of the lens sheet 50 in the case where the convex portion 50A is arranged on the light entering side of the lens sheet 50. The convex portion 50A is arranged so that an apex position of the convex portion 50A is to be opposed to the bottom electrode 32 (or the light modulation cell 30a). It is to be noted that the light modulation cell 30a is a dot-like scattering region when the light modulation cell 30a is in a scattering state. Accordingly, at this time, the convex portion 50A is arranged so that the apex position of the convex portion 50A is opposed to the linear scattering region or to the dot-like scattering regions that are arranged side by side in a line. The respective convex portions 50A may be preferably arranged so that each of the convex portions 50A corresponds to one of the dot-like scattering regions in a one-to-one relationship.

The convex portion 50A may preferably has rotational symmetry having center at an apex of the convex portion 50A. In a case where the convex portion 50A has a shape that is a square when viewed from the Z-axis direction, the convex portion 50A may preferably have four-fold rotational symmetry having center at the apex of the convex portion 50A. Alternatively, in a case where the convex portion 50A has a shape that is a rectangle, a rhomboid, or a parallelogram when viewed from the Z-axis direction, the convex portion 50A may preferably have two-fold rotational symmetry having center at the apex of the convex portion 50A.

The curved surface of the convex portion 50A may have, for example, a stereoscopic shape in which a cross-section perpendicular to the Y-axis in the drawing or a cross-section perpendicular to the X-axis in the drawing has a cylindrical shape illustrated in FIG. 9A or 9B. In the case where the cross-section (the cross-section perpendicular to the Y-axis in the drawing or the cross-section perpendicular to the X-axis in the drawing) of the convex portion 50A has a cylindrical shape, the curved surface of the convex section 50A may have a true spherical shape or an aspherical shape, or may have an ellipsoidal spherical shape, a paraboloidal shape, or a hyperboloidal shape, for example, which is not illustrated. Alternatively, in the case where the cross-section (the cross-section perpendicular to the Y-axis in the drawing or the cross-section perpendicular to the X-axis in the drawing) of the convex portion 50A has a cylindrical shape, a first cross-section (the cross-section perpendicular to the Y-axis in the drawing) of the convex portion 50A or a second cross-section (the cross-section perpendicular to the X-axis in the drawing) of the convex portion 50A may have a true circle shape, an ellipsoid shape, a parabolic shape, or a hyperbolic shape.

It is to be noted that, in FIGS. 7 and 8, illustration is made as if two ridge lines intersecting with each other are present on the curved surface of the convex portion 50A; however, the ridge lines are provided for convenience in order to express the shape of the convex portion 50A. FIGS. 7 and 8 therefore do not mean that such ridge lines are necessarily present on the curved surface of the convex portion 50A. For example, the entire curved surface of the convex portion 50A may be configured only of a smooth curved surface.

In a case where the curved surface of the convex portion 50A has an aspherical shape, a focal length of the convex portion 50A is allowed to be longer. Accordingly, it is possible to allow a distance between the light modulation cell 30a and the convex portion 50A to be longer as the focal length of the convex portion 50A becomes longer, which increases freedom in design of thicknesses of the light guide plate 10, the transparent substrate 37, etc.

The first cross-section (the cross-section perpendicular to the Y-axis in the drawing) of the convex portion 50A and the second cross-section (the cross-section perpendicular to the X-axis in the drawing) of the convex portion 50A may have shapes different from each other. In this case, the curved surface of the convex portion 50A may be that expressed by an anamorphic aspherical surface expression in Expression 1, for example. It is to be noted that x=0 and y=0 corresponds to the apex of the convex portion 50A. Rx is a curvature radius, of the convex portion 50A, in a direction orthogonal to the extending direction of the linear electrode 32D. Ry is a curvature radius, of the convex portion 50A, in a direction parallel to the extending direction of the linear electrode 32D. kx is a conic constant in the X-axis direction. ky is a conic constant in the Y-axis direction.

$$Z = \frac{C_x x^2 + C_y y^2}{1 + \sqrt{1 - (1+k_x)C_x^2 x^2 - (1+k_y)C_y^2 y^2}}$$ [Epression 1]

$$C_x = \frac{1}{R_x}$$

$$C_y = \frac{1}{R_y}$$

In a case where the ridge line of the first cross-section of the convex portion 50A has a true circle shape, the curved surface of the convex portion 50A corresponds to a shape in a case where kx=0 is established in Expression 1. Alternatively, in a case where the ridge line of the first cross-section of the convex portion 50A has an ellipsoid shape, the curved surface of the convex portion 50A corresponds to a shape in a case where −1<kx<0 is established in Expression 1. Alternatively, in a case where the ridge line of the first cross-section of the convex portion 50A has a parabolic shape, the curved surface of the convex portion 50A corresponds to a shape in a case where kx=−1 is established in Expression 1. Alternatively, in a case where the ridge line of the first cross-section of the convex portion 50A has a hyperbolic shape, the curved surface of the convex portion 50A corresponds to a shape in a case where kx<−1 is established in Expression 1. It is to be noted that, in order to maintain a long distance between the convex portion 50A and the light modulation cell 30a and to achieve improvement in front luminance and suppression of decrease in contrast, −40<kx<0 may be preferably established, and −30<kx<−4 may be more preferably established.

In a case where the ridge line of the second cross-section of the convex portion 50A has a true circle shape, the curved surface of the convex portion 50A corresponds to a shape in a case where ky=0 is established in Expression 1. Alternatively, in a case where the ridge line of the second cross-section of the convex portion 50A has an ellipsoid shape, the curved surface of the convex portion 50A corresponds to a shape in a case where −1<ky<0 is established in Expression 1. Alternatively, in a case where the ridge line of the second cross-section of the convex portion 50A has a parabolic shape, the curved surface of the convex portion 50A corresponds to a shape in a case where ky=−1 is established in Expression 1. Alternatively, in a case where the ridge line of the second cross-section of the convex portion 50A has a hyperbolic shape, the curved surface of the convex portion 50A corresponds to a shape in a case where ky<−1 is established in Expression 1. It is to be noted that, in order to maintain a long distance between the convex portion 50A and the light modulation cell 30a and to achieve improvement in front luminance and suppression of decrease in contrast, −40<ky<0 may be preferably established, and −30<ky<−4 may be more preferably established.

FIGS. 10 to 17 each illustrate an example of a cross-sectional configuration of the lens sheet 50 together with the light guide plate 10 and the light modulation device 30. FIGS. 10 to 17 each illustrate the cross-sectional configuration example in an XZ plane. FIGS. 10 to 17 each illustrate, as an example, a case where the ridge line of the first cross-section of the convex portion 50A has a true circle shape. However, description below is also applicable to a case where the ridge line of the first cross-section of the convex portion 50A has a shape other than the true circle shape.

In the concave-convex surface of the lens sheet 50, the pitch P2 in a direction intersecting with the extending direction of the linear electrode 32D may be preferably P1/n (n=1, 2, . . . ) in view of improvement in front luminance. It is to be noted that, in a case where widths of the respective convex portions 50A are equal to one another, the pitch P2 of the concave-convex surface is equal to the width of the convex portion 50A. In a case where the widths of the respective convex portions 50A are cyclically different, the pitch P2 of the concave-convex surface is equal to a cycle of the cyclic change in the widths of the respective convex portions 50A.

Here, the pitch P2 of the concave-convex surface may be preferably P1/n (n=1, 2, . . . , or N) in view of further increase in front luminance where the number N of perspectives are set to be the number of pictures viewed in a three-dimensional manner including reverse vision at the time of performing three-dimensional display. Further, the pitch P2 of the concave-convex surface may be more preferably P1/n (n=1, 2, . . . , m, N) where m is a divisor of the number N of perspectives. Moreover, in view of eliminating decrease in contrast caused by provision of the lens sheet 50 or of causing the decrease to be as small as possible, the pitch P2 of the concave-convex surface may be preferably P1/n (n=M, N), and more preferably P1/N where M is the maximum divisor (excluding N) of the number N of perspectives.

As illustrated in FIGS. 10, 11, 12, and 13, the pitch P2 of the concave-convex surface may be P1, for example. It is to be noted that the widths of the respective convex portions 50A may not be necessarily equal to one another. As illustrated in FIGS. 14 and 15, for example, the convex portion 50A having a larger width and the convex portion 50A having a smaller width may be arranged alternately. In this case, the convex portion 50A having a larger width may be preferably arranged at a position that is opposed to the light modulation cell 30a. It is to be noted that, in the case where the convex portion 50A having a larger width and the convex portion 50A having a smaller width are arranged alternately, the pitch P2 of the concave-convex surface may not be necessarily P1, and may be P1/n (n=2, . . . ).

Moreover, in a case where the partial electrode group is configured of one linear electrode 32B and three linear electrodes 32C (in a case where the number N of perspectives at the time of performing three-dimensional display is 4), the pitch P2 of the concave-convex surface may be, for example, P1/2 as illustrated in FIGS. 12 and 13, or may be, for example, P1/4 as illustrated in FIGS. 16 and 17. It is to be noted that, in the case where P2=P1/N is established, the respective convex portions 50A may be preferably arranged so that each of the convex portions 50A corresponds to one of the partial electrodes 32A in a one-to-one relationship as illustrated in FIG. 18, for example.

A radius (the curvature radius Rx in a parallax direction at the time of performing three-dimensional display) of the convex portion 50A may be preferably P1/N×0.6<R<P1/N×1.4 where P1 is the pitch of the light modulation cell 30a (a part that can be a linear scattering region), and N is the number of perspectives at the time of performing three-dimensional display. Moreover, the radius of the convex portion 50A may be more preferably P1/N×0.8<R<P1/N×1.2.

The convex portion 50A is arranged so that the middle of the convex portion 50A in the width direction is opposed to the light modulation cell 30a (a part that can be a scattering region). The convex portion 50A may be preferably arranged so that the middle of the convex portion 50A in the width direction is opposed to the middle of the light modulation cell 30a in the width direction. Moreover, a distance Lz between the convex portion 50A and the light modulation cell 30a may be preferably 0<Lz<Rx/(n2(n1−1))×1.4 where Rx is the curvature radius (the curvature radius in the parallax direction at the time of performing three-dimensional display) of the convex portion 50A, n1 is a refractive index of the convex portion 50A, and n2 is a refractive index between the convex portion 50A and the light modulation cell 30a. Further, the distance Lz between the convex portion 50A and the light modulation cell 30a may be preferably Rx/(n2(n1−1))×0.7<Lz<R/(n2(n1−1))×1.2. In such a case, luminance in the front direction is increased compared to that in a case where the distance Lz between the convex portion 50A and the light modulation cell 30a is out of the above-described range.

The lens sheet 50 may be preferably configured of a material having an isotropic refractive index. The light exited from the top surface of the light guide plate 10 is polarized light that has a polarization axis in a direction parallel to the optical axis AX1 of the bulk 34A having low responsiveness to an electric field. Accordingly, for example, in a case where light emitted from the illumination unit 1 may be preferably polarized light in view of improvement in luminance of the display panel, the light exited from the top surface of the light guide plate 10 may be utilized as the emission light from the illumination unit 1 as it is without disturbing polarization. However, when the lens sheet 50 has a large phase difference, a polarization component of the light emitted from the illumination unit 1 is disturbed by the lens sheet 50. Accordingly, the lens sheet 50 may be preferably configured of the material having an isotropic refractive index in view of not disturbing the polarization component of the light exited from the top surface of the light guide plate 10.

FIGS. 19 to 26 each illustrate another example of the cross-sectional configuration of the lens sheet 50, together with the light guide plate 10 and the light modulation device 30. FIGS. 19 to 26 each illustrate the cross-sectional configuration example in a YZ plane. FIGS. 19 to 26 each illustrate, as an example, a case where the cross-section, of the convex portion 50A, that is perpendicular to the X axis in the drawing has a true circle shape. However, description below is also applicable to a case where the cross-section, of the convex portion 50A, that is perpendicular to the X axis in the drawing has a shape other than the true circle shape.

A pitch P4 in a direction perpendicular to the parallax direction of the concave-convex surface of the lens sheet 50 at the time of performing three-dimensional display may be preferably P3×n (n=1, 2, . . . ) with respect to the pitch P3 of the partial electrodes 32B in view of improvement in front luminance. It is to be noted that, in a case where the widths of the respective convex portions 50A are equal to one another, the pitch P4 of the concave-convex surface is equal to the width of the convex portion 50A. In a case where the widths of the respective convex portions 50A are cyclically different, the pitch P4 of the concave-convex surface is equal to a cycle of the cyclic change in the widths of the respective convex portions 50A.

Here, the pitch P4 of the concave-convex surface may be preferably P3×n (n=1, 2, . . . , or N) in view of further increase in front luminance where the number N of perspectives are set to be the number of pictures viewed in a three-dimensional manner including reverse vision at the time of performing three-dimensional display. Further, the pitch P4 of the concave-convex surface may be more preferably P3×n (n=1, 2, . . . , m, N) where m is the divisor of the number N of perspectives. Moreover, in view of eliminating decrease in contrast caused by provision of the lens sheet 50 or of causing the decrease in contrast to be as small as possible, the pitch P4 of the concave-convex surface may be more preferably P3.

As illustrated in FIGS. 19 and 20, the pitch P4 of the concave-convex surface may be P3×N, for example. It is to be noted that the widths of the respective convex portions 50A may not be necessarily equal to one another. As illustrated in FIGS. 21 and 22, for example, the convex portion 50A having a larger width and the convex portion 50A having a smaller width may be arranged alternately. It is to be noted that, in the case where the convex portion 50A having a larger width and the convex portion 50A having a smaller width are arranged alternately, the pitch P4 of the concave-convex surface may not be necessarily P3×N, and may be P3×n (n=2, . . . ).

Moreover, in a case where the partial electrode group is configured of one partial electrode 32B and three partial electrodes 32C (in a case where the number N of perspectives at the time of performing three-dimensional display is 4), the pitch P4 of the concave-convex surface may be, for example, P3×2 as illustrated in FIGS. 23 and 24, or may be, for example, P3 as illustrated in FIGS. 25 and 26. It is to be noted that, in the case where P4=P3 is established, the convex portions 50A arranged in a matrix may be preferably arranged at a position that is opposed to one of the partial electrodes 32A as illustrated in FIG. 18, for example.

The curvature radius Ry in a direction perpendicular to the parallax direction of the convex portion 50A at the time of performing three-dimensional display may be preferably P3×0.6<Ry<P3×1.4, and may be more preferably P3×0.8<Ry<P3×1.2.

The convex portion 50A is arranged so that the middle of the convex portion 50A in the width direction is opposed to the light modulation cell 30a (a part that can be a linear scattering region). The convex portion 50A may be preferably arranged so that the middle of the convex portion 50A in the width direction is opposed to the middle of the light modulation cell 30a in the width direction. Moreover, the distance Lz between the convex portion 50A and the light modulation cell 30a may be preferably $0<Lz<Ry/(n2(n1-1))\times 1.4$ where Ry is the curvature radius in the direction perpendicular to the parallax direction of the convex portion 50A at the time of performing three-dimensional display, n1 is the refractive index of the convex portion 50A, and n2 is the refractive index between the convex portion 50A and the light modulation cell 30a. Further, the distance Lz between the convex portion 50A and the light modulation cell 30a may be preferably $R/(n2(n1-1))\times 0.7<Lz<Ry/(n2(n1-1))\times 1.2$. In such a case, luminance in the front direction is increased compared to that in a case where the distance Lz between the convex portion 50A and the light modulation cell 30a is positioned at a place farther than the above-described range.

(Drive Circuit 60)

The drive circuit 60 may control magnitude of a voltage to be applied to a pair of electrodes (the partial electrode 32A and the top electrode 36) of each of the light modulation cells 30-1 so that the optical axis AX2 of the microparticle 34B is parallel or almost parallel to the optical axis AX1 of the bulk 34A in one light modulation cell 30-1, and the optical axis AX2 of the microparticle 34B intersects with or is orthogonal to the optical axis AX1 of the bulk 34A in another light modulation cell 30-2, for example. In other words, the drive circuit 60 is configured to be capable of causing the directions of the optical axes AX1 and AX2 of the bulk 34A and the microparticle 34B to coincide with (or almost coincide with) each other or to be different from (or to be orthogonal to) each other by controlling an electric field.

The drive circuit 60 causes a plurality of dot-like illumination light rats that are arranged side by side in a line or a plurality of linear illumination light rays to be outputted from the light modulation device 30 when a signal designating three-dimensional display is inputted as a control signal 20A (that is, in a three-dimensional display mode). Specifically, the drive circuit 60 applies a voltage causing the light modulation layer 34 to exhibit scattering characteristics to a plurality of specific partial electrodes 32B out of the partial electrodes 32A, and applies a voltage causing the light modulation layer 34 to exhibit transparent characteristics to a plurality of partial electrodes 32C that are electrodes excluding the partial electrodes 32B from the partial electrodes 32A. In other words, the drive circuit 60 controls the magnitude of the voltage to be applied to the pair of electrodes (the partial electrode 32A and the top electrode 36) of each of the light modulation cells 30-1 so that the optical axis AX2 of the microparticle 34B intersects with the optical axis AX1 of the bulk 34A in each of the light modulation cells 30a inside the light modulation device 30, and the optical axis AX2 of the microparticle 34B is parallel to the optical axis AX1 of the bulk 34A in the light modulation cell 30b inside the light modulation device 30. Thus, the drive circuit 60 generates the scattering region 30B in the light modulation cell 30a including the partial electrode 32B and generates the transmission region 30A in the light modulation cell 30b including the partial electrode 32C, and thereby causes the linear illumination light ray or the dot-like illumination light rays that are arranged side by side in a line to be outputted from the light modulation device 30.

Moreover, the drive circuit 60 causes a planar illumination light ray or a plurality of dot-like illumination light rays that are arranged side by side in a matrix to be outputted from the light modulation device 30 when a signal designating two-dimensional display is inputted as the control signal 20A (that is, in the two-dimensional display mode). Specifically, the drive circuit 60 applies a voltage causing the light modulation layer 34 to exhibit scattering characteristics to each of the partial electrodes 32A. In other words, the drive circuit 60 controls the magnitude of the voltage to be applied to the pair of electrodes (the partial electrode 32A and the top electrode 36) of each of the light modulation cells 30-1 so that the optical axis AX2 of the microparticle 34B intersects with or is orthogonal to (or almost orthogonal to) the optical axis AX1 of the bulk 34A in all of the light modulation cells 30-1 included in the light modulation device 30. Thus, the drive circuit 60 generates the scattering region 30B in each of the light modulation cells 30-1, and thereby causes the planar illumination light or the dot-like illumination lights that are arranged side by side in a matrix to be outputted from the light modulation device 30.

Next, functions and effects of the illumination unit 1 of the present embodiment are described.

In the illumination unit 1 of the present embodiment, at the time of performing three-dimensional display, a voltage is applied to the pair of electrodes (the partial electrode 32A and the top electrode 36) of each of the light modulation cells 30-1 so that the optical axis AX2 of the microparticle 34B intersects with or is orthogonal to the optical axis AX1 of the bulk 34A in each of the light modulation cells 30a, and the optical axis AX2 of the microparticle 34B is parallel or almost parallel to the optical axis AX1 of the bulk 34A in each of the light modulation cells 30b. Accordingly, each of the light modulation cells 30a becomes the scattering region 30B and each of the light modulation cells 30b becomes the transmission region 30A in the light modulation device 30. As a result, light that has been emitted from the light source 20 and has entered inside the light guide plate 10 passes through the transmission region 30A in the light modulation device 30 and is scattered in the scattering region 30B in the light modulation device 30 (FIG. 6A). Out of this scattered light, light that has passed through the bottom surface of the scattering region 30B is reflected by the reflection plate 40 to be returned again to the light guide plate 10, and then is caused to exit from the top surface of the illumination unit 1. Moreover, out of the scattered light, light that has traveled toward the top surface of the scattering region 30B passes through the light guide plate 10, and is caused to exit from the top surface of the illumination unit 1. Thus, little light is caused to exit from the top surface of the transmission region 30A and light is caused to exit from the top surface of the scattering region 30B at the time of performing three-dimensional display. As illustrated in FIGS. 6A and 6B, a linear illumination light ray or a plurality of dot-like illumination light rays that are arranged side by side in a line may be outputted in the front direction, for example.

Moreover, in the illumination unit 1 of the present embodiment, at the time of performing two-dimensional display, a voltage may be applied to the pair of electrodes (the partial electrode 32A and the top electrode 36) of each of the light modulation cells 30-1 so that the optical axis AX2 of the microparticle 34B intersects with or is orthogonal to the optical axis AX1 of the bulk 34A in each of the light modulation cells 30-1, for example. Accordingly, light that has been emitted from the light source 20 and has entered inside the light guide plate 10 is scattered in the scattering region 30B that is formed in the entire light modulation device 30. Out of this scattered light, light that has passed through the bottom surface of the scattering region 30B is reflected by the reflection plate 40 to be returned again to the light guide plate 10, and then is caused to exit from the top surface of the illumination unit 1. Moreover, out of the scattered light, light that has traveled toward the top surface of the scattering region 30B passes through the light guide plate 10, and then is caused to exit from the top surface of the illumination unit 1. Thus, at the time of performing two-dimensional display, light may be caused to exit from the entire top surface of the light modulation device 30, and a planar illumination light ray or a plurality of dot-like illumination light rays that are arranged side by side in a matrix may be outputted in the front direction, for example.

Moreover, in the illumination unit 1 of the present embodiment, the lens sheet 50 that reduces the divergence angle of illumination light is provided. This makes it possible to increase luminance in the front direction, compared to a case where no lens sheet 50 is provided. As a result, for example, in a case where the illumination unit 1 is used as a backlight of a display apparatus, it is possible to increase an amount of light that enters a display panel in the display apparatus at an angle from 0° to an appropriate viewing angle (for example, 15°), which achieves high luminance in the displayed picture.

Moreover, in the illumination unit 1 of the present embodiment, in a case where the partial electrodes 32A and the convex portions 50A are both arranged in a matrix, and the respective convex portions 50A are arranged so that each of the convex portions 50A corresponds to one of the partial electrodes 32A (or one of the dot-like scattering regions) in a one-to-one relationship, it is possible to reduce the divergence angle of the illumination light in the two arrangement directions (the X direction and the Y direction) of the convex portions 50A at the time of performing three-dimensional display. As a result, high luminance is achieved in a three-dimensional display picture. Similarly, it is possible to reduce the divergence angle of the illumination light also in the two arrangement directions (the X direction and the Y direction) of the convex portions 50A at the time of performing two-dimensional display. In particular, when P2=P1/N (where N is the number of perspectives at the time of performing three-dimensional display) and P4=P3 are established, there is provided a configuration in which one of the convex portions 50A is opposed to all of the dot-like scattering regions. This makes it possible to achieve highest luminance in a two-dimensional display picture.

Next, other effects of the illumination unit 1 of the present embodiment are described.

Generally, PDLC is formed by mixing a liquid crystal material and an isotropic low-molecular material and causing phase separation by application of ultraviolet rays, drying of a solvent, etc. Also, PDLC is generally configured of a composite layer in which fine particles of the liquid crystal material are dispersed in a polymer material. When no voltage is applied, the liquid crystal material in the composite layer is aligned in a random direction, and therefore exhibits scattering characteristics. However, when a voltage is applied, the liquid crystal material is aligned in an electric field direction, and therefore exhibits high transparent characteristics in a front direction (a direction of a normal to PDLC) in a case where an ordinary reflective index of the liquid crystal material and a refractive index of the polymer material are equal to each other. However, in this liquid crystal material, a difference between an extraordinary refractive index of the liquid crystal material and the refractive index of the polymer material is remarkable in an oblique direction, and scattering characteristics are therefore exhibited in the oblique direction even if transparent characteristics are exhibited in the front direction.

Usually, a light modulation device using PDLC often has a structure in which PDLC is sandwiched between two glass plates each having a surface provided with a transparent conductive film. In a case where light obliquely enters a light modulation device having the above-descried structure from the air, the light that has entered from the oblique direction is refracted due to a refractive index difference between the air and the glass plate, and therefore enters the PDLC at a smaller angle. Accordingly, large scattering is not caused in such a light modulation device. For example, in a case where light enters the light modulation device from the air at an angle of 80°, an entering angle of the light with respect to the PDLC is reduced to about 40° due to refraction at a glass interface.

However, in an edge light scheme using a light guide plate, light enters through the light guide plate, and the light therefore crosses inside the PDLC at a large angle of about 80°. Accordingly, the difference between the extraordinary refractive index of the liquid crystal material and the refractive index of the polymer material is large, and further, the light therefore crosses inside the PDLC at a larger angle, which causes an optical path to be scattered to be longer. For example, in a case where fine particles of a liquid crystal material having an ordinary refractive index of 1.5 and an extraordinary refractive index of 1.65 are dispersed in a polymer material having a refractive index of 1.5, there is no refractive index difference in the front direction (the direction of the normal to the PDLC) but the refractive index difference in the oblique direction is larger. This prevents scattering characteristics in the oblique direction from being smaller, and therefore causes viewing angle characteristics to be degraded. Moreover, in a case where an optical film such as a diffusion film is provided on the light guide plate, obliquely-leaked light is diffused also in the front direction by the diffusion film or the like, which causes increase in light leakage in the front direction and therefore causes decrease in modulation ratio in the front direction.

On the other hand, in the present embodiment, the bulk 34A and the microparticle 34B each mainly include an optically-anisotropic material, which reduces scattering characteristics in the oblique direction. Accordingly, it is possible to improve transparent characteristics. For example, in a region in which the bulk 34A and the microparticle 34B mainly include optically-anisotropic materials that have ordinary refractive indices equal to each other and extraordinary refractive indices equal to each other, and no voltage is applied between the bottom electrode 32 and the top electrode 36, the directions of these optical axes coincide or almost coincide with each other. Accordingly, the refractive index difference is reduced or eliminated in all directions including the front direction (the direction of the normal to the light modulation device 30) and the oblique direction, which achieves high transparent characteristics. As a result, it is possible to reduce or almost eliminate leakage of light in a range having a large viewing angle, and to therefore improve viewing angle characteristics.

For example, when liquid crystal having an ordinary refractive index of 1.5 and an extraordinary refractive index of 1.65 and liquid crystalline monomers having an ordinary refractive index of 1.5 and an extraordinary refractive index of 1.65 are mixed, and the liquid crystalline monomers are polymerized in a state in which the liquid crystal and the liquid crystalline monomers are aligned by an alignment film or an electric field, the optical axis of the liquid crystal and the optical axis of a polymer formed by polymerization of the liquid crystalline monomers coincide each other.

Thus, it is possible to cause refractive indices to coincide one another in all directions. In such a case, it is therefore possible to achieve a state having high transparent characteristics, and to further improve viewing angle characteristics.

Moreover, in the present embodiment, as illustrated in FIGS. 8A and 8B, luminance (luminance in black display) in the transmission region 30A may be decreased compared to that in the case where the entire surface is caused to emit light uniformly (the dashed-dotted line in FIG. 8B), for example. On the other hand, luminance in the scattering region 30B is extremely increased compared to that in a case where the entire surface is caused to emit light uniformly (the dashed-dotted line in FIG. 8B). Further, luminance in partial white display (increase in luminance) is increased as the luminance in the transmission region 30A is decreased.

By the way, increase in luminance is a technology to increase luminance in a case where white display is partially performed compared to that in a case where white display is performed in the entire surface. This technology is often used in CRT, PDP, etc., generally. However, in a liquid crystal display, an entire backlight is caused to emit light uniformly irrespective of an image, and it is therefore not possible to partially increase luminance. In a case where the backlight is configured of a LED backlight in which a plurality of LEDs are arranged two-dimensionally, it is indeed possible to partially turn off the LEDs. However, in such a case, there is no diffusion light from a dark region in which the LEDs are turned off, and luminance is therefore decreased compared to that in a case where all of the LEDs are turned on. It is also possible to increase luminance by increasing a current to be applied to part of the LEDs that are turned on. However, in such a case, a large current flows therethrough in an extremely short time, which leaves an issue in view of load in circuits, reliability, etc.

On the other hand, in the present embodiment, the bulk 34A and the microparticle 34B mainly include the optically-anisotropic materials. Accordingly, scattering characteristics in the oblique direction is suppressed, and less light is leaked from the light guide plate in a dark state. For this reason, light is guided from a portion having a partial dark state to a portion having a partial bright state. It is therefore possible to achieve increase in luminance without increasing electric power to be supplied to the illumination unit 1.

Moreover, in the present embodiment, the optical axis AX2 of the microparticle 34B is parallel to the light entering surface 10A of the light guide plate 10 and intersects with the surfaces of the transparent substrates 31 and 37 at the slight angle θ1 in a region where no voltage is applied between the bottom electrode 32 and the top electrode 36. In other words, the liquid crystal molecule included inside the microparticle 34B is aligned to be tilted at the angle θ1 in a plane parallel to the light entering surface 10A (in a state provided with the pre-tilt angle). For this reason, when a voltage is applied between the bottom electrode 32 and the top electrode 36, the liquid crystal material included inside the microparticle 34B does not rise at a random azimuth and rises in the plane parallel to the light entering surface 10A. At this time, the optical axes AX1 and AX2 of the bulk 34A and the microparticle 34B intersect with or are orthogonal to each other in the plane parallel to the light entering surface 10A. In this case, in the light that has entered from the light entering surface 10A of the light guide plate 10, light that oscillates perpendicularly to the transparent substrate 31 is influenced by a difference between the extraordinary refractive index of the microparticle 34B and the ordinary refractive index of the bulk 34A. At this time, the difference between the extraordinary refractive index of the microparticle 34B and the ordinary refractive index of the bulk 34A is large, which causes scattering efficiency of the light that oscillates perpendicularly to the transparent substrate 31 to be increased. On the other hand, light that oscillates parallel to the transparent substrate 31 is influenced by a difference between the ordinary refractive index of the microparticle 34B and the extraordinary refractive index of the bulk 34A. At this time, the difference between the ordinary refractive index of the microparticle 34B and the extraordinary refractive index of the bulk 34A is also large, which causes scattering efficiency of the light that oscillates parallel to the transparent substrate 31 to be increased. Accordingly, light that propagates through a region in which a voltage is applied between the bottom electrode 32 and the top electrode 36 includes a lot of components in the oblique direction. For example, in a case where an acrylic light guide plate is used as the light guide plate 10, light in a region in which a voltage is applied between the bottom electrode 32 and the top electrode 36 propagates at an angle of 41.8° or larger. As a result, the refractive index difference is increased in all directions including the oblique direction, and high scattering characteristics are therefore achieved. This makes it possible to improve display luminance. Also, it is possible to further improve display luminance due to the above-described effect of increase in luminance.

By the way, for example, in a case where the optical axes AX1 and AX2 of the bulk 34A and the microparticle 34B are arranged perpendicularly to the light entering surface 10A of the light guide plate 10 when no voltage is applied, and the liquid crystal material included inside the microparticle 34B is caused to rise in a plane perpendicular to the light entering surface 10A when a voltage is applied between the bottom electrode 32 and the top electrode 36, light that oscillates perpendicularly to the transparent substrate 31 is influenced by the difference between the extraordinary refractive index of the microparticle 34B and the ordinary refractive index of the bulk 34A similarly to in the above-described case, but light that oscillates in a direction parallel to the transparent substrate 31 is influenced by the difference between the ordinary refractive index of the microparticle 34B and the ordinary refractive index of the bulk 34A. Here, there is little or no difference between the ordinary refractive index of the microparticle 34B and the ordinary refractive index of the bulk 34A. For this reason, in the light that has entered from the light entering surface 10A, the light that oscillates perpendicularly to the transparent substrate 31 is influenced by a large refractive index similarly to in the above-described case, but the light that oscillates in the direction parallel to the transparent substrate 31 is influenced little or is not influenced at all by the refractive index difference. As a result, scattering efficiency of the light that oscillates perpendicularly to the transparent substrate 31 is increased, but scattering efficiency of the light that oscillates parallel to the transparent substrate 31 is low or zero. Accordingly, in the case where the optical axes AX1 and AX2 are arranged perpendicularly to the light entering surface 10A, scattering efficiency is decreased compared to that in a case where the optical axes AX1 and AX2 are arranged parallel to the light entering surface 10A. This causes luminance that is allowed to be extracted from the light guide plate 10 to be lower than that in the light modulation device 30 of the present embodiment.

As described above, it is possible to improve display luminance while reducing or almost eliminating leakage of light in a range having a large viewing angle in the present embodiment. As a result, it is possible to increase the modulation ratio in the front direction.

[2. Modification of First Embodiment]

[Modification 1]

In the above-described embodiment, description is provided, as an example, of the case where each of the linear electrodes 32D extend in the direction parallel to the light entering surface 10A. However, as illustrated in FIG. 27, for example, each of the linear electrodes 32D may extend in a direction obliquely intersecting with the light entering surface 10A while the partial electrodes 32A have a layout same as that in the above-described embodiment. At this time, in a case where P2=P1/N and P4=P3 are established, as illustrated in FIG. 28A, the respective convex portions 50A may be preferably arranged so that each of the convex portions 50A corresponds to one of the partial electrodes 32A in a one-to-one relationship, and may be more preferably so that each of the convex portions 50A is opposed to one of the partial electrodes 32A, for example. It is to be noted that each of the convex portions 50A has a rectangular shape in FIG 20A; however, as illustrated in FIG. 20B, each of the convex portions 50A may have a parallelogram shape or a rhomboid shape, for example.

Alternatively, as illustrated in FIG. 29, for example, each of the linear electrodes 32D may extend in a direction orthogonal to the light entering surface 10A while the partial electrodes 32A have a layout same as that in the above-described embodiment. At this time, in a case where P2=P1/N and P4=P3 are established, as illustrated in FIG. 30, the respective convex portions 50A may be preferably arranged so that each of the convex portions 50A corresponds to one of the partial electrodes 32A in a one-to-one relationship, and may be more preferably so that each of the convex portions 50A is opposed to one of the partial electrodes 32A, for example.

In the present modification, the extending direction of each of the linear electrodes 32D may preferably extend in a direction intersecting with the arrangement direction of pixels in the display panel 210 described later (see FIG. 94 described later). In such a case, it is possible to reduce a difference between resolution in a direction parallel to a normal to the light entering surface 10A and resolution in a direction parallel to the light entering surface 10A at the time of performing three-dimensional display.

[Modification 2]

Moreover, in the above-described embodiment, each of the partial electrodes 32A has a block shape. However, each of the partial electrodes 32A may have a strip-like shape. At this time, as illustrated in FIG. 31, for example, each of the partial electrodes 32A may extend in the direction parallel to the light entering surface 10A, and further, the partial electrodes 32A may be arranged side by side in the direction orthogonal to the light entering surface 10A. At this time, as illustrated in FIG. 32, the convex portions 50A may be preferably arranged so that a plurality of convex portions 50A that are arranged side by side in a line correspond to one of the partial electrodes 32A in a one-to-one relationship, for example.

Moreover, as illustrated in FIG. 33, for example, each of the partial electrodes 32A may extend in a direction obliquely intersecting with the light entering surface 10A, and further, the partial electrodes 32A may be arranged side by side in a direction orthogonal to the extending direction of the partial electrodes 32A. At this time, as illustrated in FIG. 34A, the convex portions 50A may be preferably arranged so that a plurality of convex portions 50A that are arranged side by side in a line correspond to one of the partial electrodes 32A in a one-to-one relationship, for example. It is to be noted that each of the convex portions 50A has a rectangular shape in FIG. 34A; however, as illustrated in FIG. 34B, each of the convex portions 50A may have a parallelogram shape or a rhomboid shape, for example.

Alternatively, as illustrated in FIG. 35, each of the partial electrodes 32A may extend in the direction orthogonal to the light entering surface 10A, and further, the partial electrodes 32A may be arranged side by side in the direction parallel to the light entering surface 10A, for example. At this time, as illustrated in FIG 36, the convex portions 50A may be preferably arranged so that a plurality of convex portions 50A that are arranged side by side in a line correspond to one of the partial electrodes 32A in a one-to-one relationship, for example.

[Modification 3]

Moreover, in the embodiment and Modifications 1 and 2 described above, the width of the partial electrode 32A (or the linear electrode 32D) may be smaller. For example, in the case where the linear electrode group is configured of one linear electrode 32B and three linear electrodes 32C (in the case where the number N of perspectives at the time of performing three-dimensional display is 4), the width of the partial electrode 32A (or the linear electrode 32D) may be P1/20 (=P1×(1/4)×(1/5)) or smaller. In such a case, a light emission line width (a width of the scattering region) in the illumination unit 1 is reduced. As a result, in a case where the illumination unit 1 is used as a backlight of a display apparatus, it is possible to cause double images formed in the front direction of the display apparatus to be less likely to be seen at the time of performing three-dimensional display.

[Modification 4]

Moreover, in the embodiment and Modifications 1 to 3 described above, as illustrated in FIG. 37, the linear electrode 32C having a width larger than the width of the linear electrode 32B may be provided between adjacent linear electrodes 32B, for example.

[Modification 5]

Moreover, in the embodiment and Modification 1 to 4 described above, the top electrode 36 is configured of a sheet-like electrode (continuous film) formed in the entire surface, and the bottom electrode 32 is configured of the plurality of partial electrodes 32A. However, as illustrated in FIG. 38, the top electrode 36 may be configured of a plurality of partial electrodes 36A, and the bottom electrode 32 may be configured of a sheet-like electrode (continuous film) formed in the entire surface, for example. In this case, each of the partial electrodes 36A may have a configuration similar to the configuration of each of the partial electrodes 32A.

As illustrated in FIG. 39, each of the partial electrodes 36A may have a block shape, and the partial electrodes 36A may be arranged in a matrix, for example. The partial electrodes 36A may be arranged side by side in the direction parallel to the light entering surface 10A, and may be also arranged side by side in the direction orthogonal to the light entering surface 10A, for example. When a plurality of partial electrodes 36A that are arranged side by side in a line in the direction parallel to the light entering surface 10A out of the two arrangement directions of the partial electrodes 36A are considered to be one linear electrode 36D, an arrangement direction (the direction orthogonal to the light entering surface 10A) of the respective linear electrodes 36D corresponds to the parallax direction at the time of performing three-dimensional display.

The top electrode 36 is configured to generate an electric field that generates, with respect to the light modulation layer 34, a plurality of lines of linear scattering regions (or a plurality of dot-like scattering regions that are arranged side by side in a line) when three-dimensional display is performed in the display apparatus (in the three-dimensional display mode). A plurality of specific linear electrodes 36D (hereinafter, referred to as "linear electrodes 36B") out of the linear electrodes 36D are configured to generate an electric field that generates, in the light modulation layer 34, a linear scattering region or a plurality of dot-like scattering regions that are arranged side by side in a line in the three-dimensional display mode. In other words, in the three-dimensional display mode, only part of the partial electrodes 36A are used in order to generate the plurality of lines of linear scattering regions (or the plurality of dot-like scattering regions that are arranged side by side in a line with respect to the light modulation layer 34). The linear electrodes 36B are arranged at the pitch P1 (a pitch same as or similar to the pitch P2 of the pixels) corresponding to the pitch P2 (see FIG. 97) of the pixels at the time when three-dimensional display is performed in the display apparatus.

A plurality of linear electrodes 36D (hereinafter, referred to as "linear electrodes 36C") that are electrodes excluding the linear electrodes 36B from the linear electrodes 36D are configured to generate together with the linear electrodes 36B an electric field that generates, with respect to the light modulation layer 34, a planar scattering region or a plurality of dot-like scattering regions that are arranged side by side in a matrix when two-dimensional display is performed in the display apparatus (in the two-dimensional display mode). In other words, in the two-dimensional display mode, all of the partial electrodes 36A are used in order to generate, with respect to the light modulation layer 34, the planar scattering region or the plurality of dot-like scattering regions that are arranged side by side in a matrix. Whether illumination light generated in response to drive of the linear electrodes 36B is seen as linear light or dot-like light depends on a size of a pitch P3 of a plurality of partial electrodes 36A included in the linear electrode 36D.

The scattering region inside the light modulation layer 34 is to be a light emitting region when light propagates inside the scattering region as described later. Accordingly, the linear electrodes 36B are used to generate a linear illumination light ray or a plurality of dot-like illumination light rays that are arranged side by side in a line in the three-dimensional display mode. Further, all of the linear electrodes 36D are used to generate planar illumination light or a plurality of dot-like illumination lights that are arranged side by side in a matrix in the two-dimensional display mode.

The linear electrodes 36B and the linear electrodes 36C are arranged regularly in the direction orthogonal to the light entering surface 10A. As illustrated in FIG. 39, for example, a plurality of sets of linear electrode groups may be arranged in the direction orthogonal to the light entering surface 10A where one set is configured of one linear electrode 36B and two linear electrodes 36C. A width of the linear electrode 36B may be, for example, smaller than a width of the pixel in the display apparatus. It is to be noted that the linear electrode group may not always configured of one linear electrode 36B and two linear electrodes 36C, and may be configured of one linear electrode 36B and three linear electrodes 36C, for example, which is not illustrated.

[Modification 6]

In Modification 5 described above, description is provided, as an example, of the case where each of the linear electrodes 36D extend in the direction parallel to the light entering surface 10A. However, as illustrated in FIG. 40, for example, each of the linear electrodes 36D may extend in a direction obliquely intersecting with the light entering surface 10A while the partial electrodes 36A have a layout same as that in Modification 5 described above. At this time, in a case where P2=P1/N is established, the respective convex portions 50A may be preferably arranged so that each of the convex portions 50A corresponds to one of the partial electrodes 32A in a one-to-one relationship, and may be more preferably so that each of the convex portions 50A is opposed to one of the partial electrodes 32A, for example. It is to be noted that each of the convex portions 50A may have a rectangular shape, or may have a parallelogram shape or a rhomboid shape.

Alternatively, as illustrated in FIG 41, for example, each of the linear electrodes 36D may extend in a direction orthogonal to the light entering surface 10A while the partial electrodes 36A have a layout same as that in the above-described embodiment. At this time, in a case where P2=P1/N is established, the respective convex portions 50A may be preferably arranged so that each of the convex portions 50A corresponds to one of the partial electrodes 32A in a one-to-one relationship, and may be more preferably so that each of the convex portions 50A is opposed to one of the partial electrodes 32A.

In the present modification, the extending direction of each of the linear electrodes 36D may preferably extend in a direction intersecting with the arrangement direction of pixels in the display panel 210 described later (see FIG. 96 described later). In such a case, it is possible to reduce a difference between resolution in the direction parallel to the normal to the light entering surface 10A and resolution in the direction parallel to the light entering surface 10A at the time of performing three-dimensional display.

[Modification 7]

Moreover, in Modifications 5 and 6 described above, each of the partial electrodes 36A has a block shape. However, each of the partial electrodes 36A may have a strip-like shape. At this time, as illustrated in FIG. 42, for example, each of the partial electrodes 36A may extend in the direction parallel to the light entering surface 10A, and further, the partial electrodes 36A may be arranged side by side in the direction orthogonal to the light entering surface 10A. At this time, the convex portions 50A may be preferably arranged so that a plurality of convex portions 50A that are arranged side by side in a line correspond to one of the partial electrodes 32A in a one-to-one relationship, for example.

Moreover, as illustrated in FIG. 43, for example, each of the partial electrodes 36A may extend in a direction obliquely intersecting with the light entering surface 10A, and further, the partial electrodes 36A may be arranged side by side in a direction orthogonal to the extending direction of the partial electrodes 36A. At this time, the convex portions 50A may be preferably arranged so that a plurality of convex portions 50A that are arranged side by side in a line correspond to one of the partial electrodes 36A in a one-to-one relationship. It is to be noted that each of the convex portions 50A may have a rectangular shape, or may have a parallelogram shape or a rhomboid shape.

Alternatively, as illustrated in FIG. 44, each of the partial electrodes 36A may extend in the direction orthogonal to the light entering surface 10A, and further, the partial electrodes 36A may be arranged side by side in the direction parallel to the light entering surface 10A, for example. At this time, the convex portions 50A may be preferably arranged so that a plurality of convex portions 50A that are arranged side by side in a line correspond to one of the partial electrodes 36A in a one-to-one relationship.

[Modification 8]

Moreover, in Modifications 5 to 7 described above, the width of the partial electrode 36A (or the linear electrode 36D) may be smaller. For example, in the case where the linear electrode group is configured of one linear electrode 36B and three linear electrodes 36C (in the case where the number N of perspectives at the time of performing three-dimensional display is 4), the width of the partial electrode 36A (or the linear electrode 36D) may be P1/20 (=P1×(1/4)×(1/5)) or smaller. In such a case, a light emission line width (a width of the scattering region) in the illumination unit 1 is reduced. As a result, in a case where the illumination unit 1 is used as a backlight of a display apparatus, it is possible to cause double images formed in the front direction of the display apparatus to be less likely to be seen at the time of performing three-dimensional display.

[Modification 9]

Moreover, in Modifications 5 to 8 described above, the linear electrode 36C having a width larger than the width of the linear electrode 36B may be provided between adjacent linear electrodes 36B.

[Modification 10]

Moreover, in the embodiment and Modifications 1 to 9 described above, one of the bottom electrode 32 and the top electrode 36 is configured of a plurality of partial electrodes. However, both of the bottom electrode 32 and the top electrode 36 may be configured of a plurality of partial electrodes. As illustrated in FIG. 45, the bottom electrode 32 may be configured of a plurality of strip-like partial electrodes 32A, and the top electrode 36 may be configured of a plurality of strip-like partial electrodes 36A, for example. At this time, as illustrated in FIG. 45, the partial electrodes 32A and the partial electrodes 36A may be preferably opposed to each other, for example. Moreover, the bottom electrode 32 may be configured of a plurality of linear electrodes 32B and 32C, and the top electrode 36 may be configured of a plurality of partial electrodes 36A that are not partially driven but driven together at the time of performing three-dimensional display as illustrated in FIG. 46. Moreover, the top electrode 36 may be configured of a plurality of linear electrodes 36B and 36C, and the bottom electrode 32 may be configured of a plurality of partial electrodes 32A that are not partially driven but driven together at the time of performing three-dimensional display as illustrated in FIG. 47.

In the present modification, the bottom electrode 32 and the top electrode 36 are not formed in places that do not contribute to light emission. Accordingly, it is possible to reduce light absorption by the bottom electrode 32 and the top electrode 36, compared to that in the case where the bottom electrode 32 and the top electrode 36 are formed in the entire surface.

Moreover, as illustrated in FIGS. 48 to 51, for example, the bottom electrode 32 may be configured of a plurality of strip-like partial electrodes 32A, and the top electrode 36 may be configured of a plurality of partial electrodes 36A that extend in a direction orthogonal to the extending direction of the bottom electrode 32. In such a case, a portion, of the light modulation layer 34, in which the partial electrode 32A and the partial electrode 36A intersect with each other (a portion in which the partial electrode 32A and the partial electrode 36A are opposed to each other) serves as the light modulation cell 30-1.

At this time, as illustrated in FIGS. 48 and 49, for example, each of the partial electrodes 32A may extend in the direction parallel to the light entering surface 10A, and further, the partial electrodes 32A may be arranged side by side in the direction orthogonal to the light entering surface 10A. Moreover, as illustrated in FIGS. 48 and 49, for example, each of the partial electrodes 36A may extend in the direction orthogonal to the light entering surface 10A, and further, the partial electrodes 36A may be arranged side by side in the direction parallel to the light entering surface 10A.

Alternatively, as illustrated in FIGS. 50 and 51, for example, each of the partial electrodes 32A may extend in the direction orthogonal to the light entering surface 10A, and further, the partial electrodes 32A may be arranged side by side in the direction parallel to the light entering surface 10A. Moreover, as illustrated in FIGS. 50 and 51, for example, each of the partial electrodes 36A may extend in the direction parallel to the light entering surface 10A, and further, the partial electrodes 36A may be arranged side by side in the direction orthogonal to the light entering surface 10A.

In FIGS. 48 to 51, either of the respective partial electrodes 32A or the respective partial electrodes 36A serves as electrodes that are partially driven at the time of performing three-dimensional display.

It is to be noted that, as illustrated in FIGS. 52 to 55, for example, the bottom electrode 32 may be configured of a plurality of strip-like partial electrodes 32A, and the top electrode 36 may be configured of a plurality of partial electrodes 36A that extend in a direction obliquely intersecting with the extending direction of the bottom electrode 32.

At this time, as illustrated in FIGS. 52 and 53, for example, each of the partial electrodes 32A may extend in the direction parallel to the light entering surface 10A, and further, the partial electrodes 32A may be arranged side by side in the direction orthogonal to the light entering surface 10A. Moreover, as illustrated in FIGS. 52 and 53, for example, each of the partial electrodes 36A may extend in the direction obliquely intersecting with the light entering surface 10A, and further, the partial electrodes 36A may be arranged side by side in the direction orthogonal to the extending direction of the partial electrodes 36A.

Alternatively, as illustrated in FIGS. 54 and 55, for example, each of the partial electrodes 32A may extend in the direction obliquely intersecting with the light entering surface 10A, and further, the partial electrodes 32A may be arranged side by side in the direction orthogonal to the extending direction of the partial electrodes 32A. Moreover, as illustrated in FIGS. 54 and 55, for example, each of the partial electrodes 36A may extend in the direction parallel to the light entering surface 10A, and further, the partial electrodes 36A may be arranged side by side in the direction orthogonal to the light entering surface 10A.

In FIGS. 52 to 55, either of the respective partial electrodes 32A or the respective partial electrodes 36A serves as electrodes that are partially driven at the time of performing three-dimensional display.

[Modification 11]

In Modifications 2 to 10 described above, the respective partial electrodes 32A included in the linear electrode 32D may be formed separately from one another. Alternatively, as illustrated in FIGS. 56A and 56B, the respective partial electrodes 32A included in the linear electrode 32D may be linked to each other with a thin line in between, for example. In a case where the respective partial electrodes 32A included in the linear electrode 32D are linked to each other with the thin line in between, the linear electrode 32D is configured of a so-called step-like electrode. In the present modification, the illumination unit 1 is configured to emit a linear illumination light ray or a plurality of dot-like illumination light rays that are arranged side by side in a line (substantially, a linear illumination light ray) in correspondence with each of the linear electrodes 32D.

Moreover, in Modifications 2 to 10 described above, the respective partial electrodes 36A included in the linear electrode 36D may be formed separately from one another. Alternatively, as illustrated in FIGS. 57A and 57B, the respective partial electrodes 36A included in the linear electrode 36D may be linked to each other with a thin line in between, for example. In a case where the respective partial electrodes 36A included in the linear electrode 36D are linked to each other with the thin line in between, the linear electrode 36D is configured of a so-called step-like electrode. In the present modification, the illumination unit 1 is configured to emit a linear illumination light ray or a plurality of dot-like illumination light rays that are arranged side by side in a line (substantially, a linear illumination light ray) in correspondence with each of the linear electrodes 36D.

[Modification 12]

In the embodiment and Modifications 1 to 11 described above, the light modulation device 30 is closely attached and joined to the inside of the light guide plate 10 with no air layer in between. However, as illustrated in FIG. 58, the light modulation device 30 may be closely attached and joined to the top surface of the light guide plate 10 with no air layer in between, for example. Alternatively, as illustrated in FIG. 59, the light modulation device 30 may be closely attached and joined to the back (bottom surface) of the light guide plate 10, for example.

[Modification 13]

In the embodiment and Modifications 1 to 12 described above, side portions of the bottom electrode 32 and the top electrode 36 are linear; however, the side portions thereof may be non-linear. For example, in each of the partial electrodes 36B and 36C, a side portion, of the partial electrode 36B, that is adjacent to the partial electrode 36C may have a concave-convex shape. Similarly, in each of the partial electrodes 36B and 36C, a side portion, of the partial electrode 36C, that is adjacent to the partial electrode 36B may have a concave-convex shape. Moreover, for example, in each of the partial electrodes 32B and 32C, a side portion, of the partial electrode 32B, that is adjacent to the partial electrode 32C may have a concave-convex shape. Similarly, in each of the partial electrodes 32B and 32C, a side portion, of the partial electrode 32C, that is adjacent to the partial electrode 32B may have a concave-convex shape.

As illustrated in FIGS. 60A to 60E, the concave-convex shape formed in each of the partial electrodes 32B, 32C, 36B, and 36C may have a zigzag shape, a wave shape, a lamp shape, a trapezoid shape, or a random shape, for example. It is to be noted that, in FIGS. 60A to 60E, 36B (32B) refers to 36B or 32B, and other symbols also refer to similar things.

The concave-convex shape of each of the partial electrodes 36B is configured of a plurality of convex portions 36-1 that are arranged along the side portion, and the concave-convex shape of each of the partial electrodes 36C is configured of a plurality of convex portions 36-2 that are arranged along the side portion. As illustrated in FIGS. 60A to 60E, the convex portions 36-1 and the convex portions 36-2 may be arranged alternately, for example. Similarly, the concave-convex shape of each of the partial electrodes 32B is configured of a plurality of convex portions 32-1 that are arranged along the side portion, and the concave-convex shape of each of the partial electrodes 32C is configured of a plurality of convex portions 32-2 that are arranged along the side portion. As illustrated in FIGS. 60A to 60E, the convex portions 32-1 and the convex portions 32-2 may be arranged alternately, for example.

A width of a gap (slit portion) between the side portion formed with the concave-convex shape of each of the partial electrodes 36B and the side portion formed with the concave-convex shape of each of the partial electrodes 36C is equal to or smaller than a predetermined size. Similarly, a width of a gap (slit portion) between the side portion formed with the concave-convex shape of each of the partial electrodes 32B and the side portion formed with the concave-convex shape of each of the partial electrodes 32C is equal to or smaller than a predetermined size. As illustrated in FIGS. 60A to 60E, a tip 36-3 of each of the convex portions 36-1 may be arranged outside a concave portion 36-4 that is formed between two adjacent convex portions 36-2, for example. Similarly, as illustrated in FIGS. 60A to 60E, a tip 32-3 of each of the convex portions 32D may be arranged outside a concave portion 32-4 that is formed between two adjacent convex portions 32-3, for example.

It is to be noted that, as illustrated in FIGS. 61A to 61E, the tip 36-3 of each of the convex portions 36-1 may be arranged in the concave portion 36-4, for example. Similarly, as illustrated in FIGS. 61A to 61E, the tip 32-3 of each of the convex portions 32-1 may be arranged in the concave portion 32-4, for example. In the layouts illustrated in FIGS. 61A to 61EE, it is possible to further reduce the width of the slit portion, compared to that in the layouts illustrated in FIGS. 60A to 60E.

By providing concavities and convexities at the side portion of the electrode, it is possible to make vague an edge of a luminance profile of a linear illumination light ray. However, in a case it is preferable not to make the edge of the luminance profile of the linear illumination light ray vague very much, the width of the slit portion may be preferably as small as possible. On the other hand, in a case where it is preferable to positively make the edge of the luminance profile of the linear illumination light ray vague, the width of the slit portion may be preferably not excessively small. In a case where the edge of the luminance profile of the linear illumination light ray is made vague, it may be possible to prevent sudden switching of displayed picture when a viewer (not illustrated) moves, for example.

It is to be noted that, in each of the partial electrodes 36B and each of the partial electrodes 36C, the concave-convex shape may not be necessarily provided in both of adjacent side portions, and the concave-convex shape may be provided only in either of the side portions. Similarly, in each of the partial electrodes 32B and each of the partial electrodes 32C, the concave-convex shape may not be necessarily provided in both of adjacent side portions, and the concave-convex shape may be provided only in either of the side portions.

[Modification 14]

In the embodiment and Modifications 1 to 13 described above, inside of the bottom electrode 32 and the top electrode 36 is not patterned. However, the inside of one or both of the bottom electrode 32 and the top electrode 36 may be patterned. In this case, pattern density of the patterned electrode out of the bottom electrode 32 and the top electrode 36 may be different depending on a distance from the light source 20.

In a case where the bottom electrode 32 or the top electrode 36 is configured of a planar electrode, as illustrated in FIGS. 62 and 63, a plurality of openings H may be provided in the bottom electrode 32 or the top electrode 36, and density of the openings H may be different depending on a distance from the light source 20 (the light entering surface 10A) in the entire top electrode 36 or the entire bottom electrode 32, for example. It is to be noted that both of the bottom electrode 32 and the top electrode 36 may be configured of planar electrodes each having a plurality of openings H, and the density of the openings H may be different depending on the distance from the light source 20 in both of the bottom electrode 32 and the top electrode 36. A shape of the opening H may be, for example, a circle shape as illustrated in FIGS. 62 and 63. It is to be noted that the shape of the opening H may be other shape, and may be an ellipsoid shape or a polygon shape, for example. In an example illustrated in FIG. 62, a radius r of the opening H is constant (r=a1) irrespective of the distance from the light source 20, and the number of the openings H per unit area is reduced as the distance from the light source 20 is farther. Moreover, in an example illustrated in FIG. 63, the number of the openings H per unit area is constant irrespective of the distance from the light source 20, and the radius r of the opening H is decreased as the distance from the light source 20 is farther. It is to be noted that FIG. 63 illustrates, as an example, a case where the radius r in the vicinity of the light source 20 is a2, and the radius r at a position farthest from the light source 20 is a3 (<a2). Accordingly, in both of the examples illustrated in FIGS. 62 and 63, the density of the openings H (occupation rate of the openings H per unit area) is sparser (smaller) as the distance from the light source 20 is farther. In other words, pattern density in the top electrode 36 or the bottom electrode 32 (occupation rate per unit area of a portion other than the openings H in the top electrode 36 and the bottom electrode 32) is denser (larger) as the distance from the light source 20 is farther.

In a case where the bottom electrode 32 or the top electrode 36 is configured of a plurality of partial electrodes, as illustrated in FIGS. 64 and 65, a plurality of openings H may be provided in the partial electrodes 32A or 36A, and density of the openings H may be different depending on a distance from the light source 20 (the light entering surface 10A) in each of the partial electrodes 32A or 36A, for example. In each of the partial electrodes 32A or 36A, the density of the openings H may be different depending on the distance from the light source 20, or may be constant irrespective of the distance from the light source 20. It is to be noted that both of the partial electrodes 32A and 36A may have a plurality of openings H, and the density of the openings H may be different depending on the distance from the light source 20 in each of the partial electrodes 32A and 36A in both of the partial electrodes 32A and 36A. The shape of the opening H may be other shape, and may be an ellipsoid shape or a polygon shape, for example. In an example illustrated in FIG. 64, the radius r of the opening H is constant (r=a1) irrespective of the distance from the light source 20, and the number of the openings H per unit area is reduced as the distance from the light source 20 is farther. Moreover, in an example illustrated in FIG. 65, the number of the openings H per unit area is constant irrespective of the distance from the light source 20, and the radius r of the opening H is decreased as the distance from the light source 20 is farther. It is to be noted that FIG. 65 illustrates, as an example, a case where the radius r in the vicinity of the light source 20 is a2, and the radius r at a position farthest from the light source 20 is a3 (<a2). Accordingly, in both of the examples illustrated in FIGS. 64 and 65, the density of the openings H (occupation rate of the openings H per unit area) is sparser (smaller) as the distance from the light source 20 is farther. In other words, pattern density in the partial electrodes 32A and 36A (occupation rate per unit area of a portion other than the openings H in the partial electrodes 32A and 36A) is denser (larger) as the distance from the light source 20 is farther.

In the present modification, inside of one or both of the bottom electrode 32 and the top electrode 36 are patterned. Further, pattern density of the patterned electrode out of the bottom electrode 32 and the top electrode 36 may be different depending on a distance from the light source 20 in the entire electrode. Accordingly, density distribution of the transmission regions 30A and the scattering regions 30B in the light exiting region is allowed to be desirable distribution. This makes it possible to suppress the luminance in a region, of the light exiting region of the illumination unit 1, on the light source 20 side to be lower than that in a case where no light modulation device 30 is provided, and to cause luminance in a region, of the light exiting region of the illumination unit 1, that is farther from the light source 20 to be higher than that in the case where no light modulation device 30 is provided. As a result, in-plane luminance may be made uniform, for example, not only in a case where the entire light exiting region of the illumination unit 1 is caused to be in a dark state, but, for example, also in a case where the entire light exiting region of the illumination unit 1 is caused to be in a bright state. Accordingly, for example, when white display is performed in a region closer to the light source 20 and in a region farther from the light source 20, it is possible to cause white luminance to be equal in both of the regions. Moreover, for example, when black display is performed in a region closer to the light source 20 than the region in which white display is performed and in a region farther from the light source 20 than the region in which white display is performed, it is possible to cause black luminance to be equal in these regions. Accordingly, in the present modification, it is possible to increase the modulation ratio while causing the in-plane luminance to be uniform.

Moreover, in the present modification, a design example and a calculation example of the patterning density distribution are described. For example, one of the bottom electrode 32 and the top electrode 36 may have patterning density distribution as illustrated by A in FIG. 66. It is to be noted that B in FIG. 66 illustrates pattern density distribution in a case where patterning depending on the distance from the light source 20 is not performed on either of the bottom electrode 32 or the top electrode 36.

In a case where one of the bottom electrode 32 and the top electrode 36 has the patterning density distribution as illustrated by A in FIG. 66, it is possible to cause in-plane luminance of the illumination unit 1 to be uniform as illustrated by A in FIG. 67. It is to be noted that B in FIG. 67 illustrates in-plane luminance distribution in a case where patterning depending on the distance from the light source 20 is not performed on either of the bottom electrode 32 or the top electrode 36.

[Modification 15]

In the embodiment and Modifications 1 to 14 described above, the same voltage may be applied from the drive circuit 60 to each of the partial electrodes 32A irrespective of the distance from the light source 20, or a voltage depending on the distance from the light source 20 may be applied from the drive circuit 60 to each of the partial electrodes 32A. Similarly, in each of the embodiment and the modifications thereof described above, the same voltage may be applied from the drive circuit 60 to each of the partial electrodes 36A irrespective of the distance from the light source 20, or a voltage depending on the distance from the light source 20 may be applied from the drive circuit 60 to each of the partial electrodes 36A.

As described above, in the case where a voltage depending on the distance from the light source 20 is applied to each of the partial electrodes 32A or each of the partial electrodes 36A, when illumination light that causes only part of the top surface of the illumination unit 1 to have white luminance is outputted, it is possible to reduce possibility of causing a difference in magnitude of the white luminance between a case where a portion to have the white luminance is close to the light source 20 and a case where the portion to have the white luminance is far from the light source 20.

[Modification 16]

In the embodiment and Modifications 1 to 15 described above, each of the partial electrodes 32A may be further configured of a plurality of fine electrodes, for example. Similarly, each of the partial electrodes 36A may be further configured of a plurality of fine electrodes.

[Modification 17]

In the embodiment and Modifications 1 to 16 described above, the drive circuit 60 may apply a voltage to the bottom electrode 32 and the top electrode 36 so that the scattering region 30B is scanned in the direction orthogonal to the light entering surface 10A. For example, as illustrated in FIGS. 68, 69, and 70 in order, the scattering region 30B is allowed to be shifted in the direction orthogonal to the light entering surface 10A by voltage application by the drive circuit 60 to the bottom electrode 32 and the top electrode 36.

Here, in a case where the illumination unit 1 is used as a backlight of a display panel (not illustrated), the drive circuit 60 may preferably cause a scanning direction of the scattering region 30B to be a direction same as a scanning direction of pixels in the display panel, and cause scanning of the scattering region 30B to be performed in synchronization with scanning of the pixels in the display panel. In such a case, it is possible to achieve display having high luminance and improved moving picture responsiveness (blur).

Moreover, the drive circuit 60 may be configured to adjust a light amount of the light source 20 taking into consideration the distance from the light source 20, a picture signal inputted from the outside, etc. while sequentially driving the scattering regions 30B. At this time, the drive circuit 60 may preferably cause the scanning direction of the scattering region 30 to be a direction same as the scanning direction of pixels in the display panel, and cause scanning of the scattering region 30B to be performed in synchronization with scanning of the pixels in the display panel. In such a case, it is possible to achieve display at low consumed power and with improved moving picture responsiveness (blur).

[Modification 18]

In the embodiment and Modifications 1 to 17 described above, as illustrated in FIG. 71A, the light source 20 may be configured of a linear light source 21 and a reflection mirror 22, for example. The linear light source 21 may be configured, for example, of a HCFL or a CCFL. The reflection mirror 22 reflects, toward the light entering surface 10A, light, out of light emitted from the linear light source 21, that travels in a direction not directly entering the light entering surface 10A. As illustrated in FIG. 71B or 71C, the light source 20 may be configured of a plurality of dot-like light sources 23 that are arranged in a line, for example. Each of the dot-like light sources 23 is configured to emit light toward the light entering surface 10A. Each of the dot-like light sources 23 may be configured, for example, of a light emitting device that has a light emitting spot in a surface opposed to the light entering surface 10A. Examples of such a light emitting device may include an LED or a laser diode (LD). In view of efficiency, reduction in thickness, and uniformity, each of the dot-like light sources 23 may be preferably a white LED. It is to be noted that the dot-like light sources 23 included in the light source 20 may include, for example, a red LED, a green LED, and a blue LED.

As illustrated in FIGS. 71B and 71C, the dot-like light sources 23 may be provided on a common substrate 24 on the basis of two or more dot-like light sources 23, for example. In this case, a light source block 25 is configured of one substrate 24 and a plurality of dot-like light sources 23 provided on the substrate 24. The substrate 24 may be, for example, a circuit substrate formed with a wiring that electrically connects the dot-like light sources 23 to the drive circuit 60, and the respective dot-like light sources 23 are mounted on this circuit substrate. The respective dot-like light sources 23 provided on the common substrate 24 (the respective dot-like light sources 23 in the light source block 25) are configured to be driven collectively (not independently) by the drive circuit 60, and may be connected to one another in parallel or in series, for example, which is not illustrated. Alternatively, the respective dot-like light sources 23 provided on the different substrates 24 (the respective dot-like light sources 23 in the respective light source block 25) may be configured to be driven independently by the drive circuit 60. At this time, as illustrated in FIG. 71C, the dot-like light sources 23 provided on different substrates 24 (the dot-like light sources 23 in the respective light blocks 25) may be connected to different current paths, for example.

As illustrated in FIGS. 71A to 71C, the light source 20 may be provided only on one side surface of the light guide plate 10. Alternatively, although not illustrated, the light sources 20 may be provided on two or three side surfaces or all side surfaces of the light guide plate 10. Further, in a case where the light sources 20 are provided on three side surfaces or all side surfaces, only the light sources 20 provided on two side surfaces opposed to each other may be turned on only when performing partial lighting, and all of the light sources 20 may be turned on when performing entire-surface lighting.

[Modification 19]

In the embodiment and Modifications 1 to 18 described above, as illustrated in FIG. 72A, the light guide plate 10 may include a plurality of strip-like convex portions 11 on the top surface thereof, for example. It is to be noted that, as illustrated in FIG. 72B, the light guide plate 10 may include the strip-like convex portions 11 on the bottom surface thereof, for example. Alternatively, although not illustrated, the light guide plate 10 may include the strip-like convex portions 11 inside the light guide plate 10, for example. Further, inside of the light guide plate 10 may be hollow or may be filled densely.

Each of the convex portions 11 extends in the direction parallel to the normal to the light entering surface 10A. As illustrated in FIGS. 72A and 72B, each of the convex portions 11 may be formed continuously from one side surface of the light guide plate 10 to another side surface that is opposed thereto, for example. A cross-section of each of the convex portions 11 in an arrangement direction thereof may have a rectangle shape, a trapezoid shape, or a triangle shape, for example. In a case where the cross-section of each of the convex portions 11 in the arrangement direction thereof has a rectangle shape, straight traveling characteristics of light is extremely high, which is suitable for a large backlight. In a case where the cross-section of each of the convex portions 11 in the arrangement direction thereof has a trapezoid shape, it is easy to process a mold that is used when each of the convex portions 11 is formed by injection molding, fusion extrusion molding, thermal pressing molding, or the like, and mold releasing characteristics at the time of molding are favorable. Accordingly, it is possible to improve yield and molding speed by reduction in defect.

A flat surface may be provided or no flat surface may be provided between adjacent convex portions 11. Heights of the respective convex portions 11 may be uniform in a plane, or may be non-uniform in the plane. As illustrated in FIGS. 73A and 73B, in a case where one side surface of the light guide plate 10 serves as the light entering surface 10A, the heights of the respective convex portions 11 may be relatively low on the light entering surface 10A side, but may be relatively high on a side surface side that is opposed to the light entering surface 10A, for example. Alternatively, in a case where a pair of opposed side surfaces out of the side surfaces of the light guide plate 10 serve as the light entering surfaces 10A, the heights of the respective convex portions 11 may be relatively low in the both light entering surfaces 10A and the vicinities thereof, and may be relatively high in other portions, for example. The heights of the respective convex portions 11 in the light entering surfaces 10A and the vicinities thereof may be zero, or substantially zero. As illustrated in FIGS. 73A and 73B, the heights of the respective convex portions 11 may be increased from the light entering surface 10A side in a direction farther from the light entering surface 10A, for example. At this time, the heights of the respective convex portions 11 may be constant in mid-course from the light entering surface 10A side toward the side surface side opposed to the light entering surface 10A. It is to be noted that a plurality of convex portions 11 having non-uniform heights as illustrated in FIG. 73A may be provided in a place other than the top surface of the light guide plate 10, and may be provided on the bottom surface of the light guide plate 10 or inside the light guide plate 10, for example.

By varying the heights of the convex portions 11 (in other words, depths of grooves formed between the convex portions 11) as described above, it is possible to vary the straight traveling characteristics of light. For example, in a case where the respective convex portions 11 are provided on the light entering surface 10A and also in the vicinity thereof as illustrated in FIGS. 72A and 72B, when one of the light source blocks 25 is turned on, the light L1 outputted from that light source block 25 does not expand much in a lateral direction (width direction) and propagates inside the light guide plate 10 as illustrated in FIG. 74A, for example. In this case, a dark portion may be caused between the dot-like light sources 23 in the vicinity of the light entering surface 10A. In such a case, image quality may be degraded. Accordingly, in such a case, the heights of the respective convex portions 11 may be preferably caused to be relatively low or to be zero in the light entering surface 10A and the vicinity thereof as illustrated in FIGS. 73A and 73B, for example. This may make it possible to cause the light L1 outputted from the light source block 23 to be expanded in the lateral direction (width direction) at a divergence angle of the dot-like light source 23 in the light entering surface 10A and the vicinity thereof and to propagate at an almost constant width in a region away from the light entering surface 10A as illustrated in FIG. 74B, for example.

[Modification 20]

In Modification 19 described above, as illustrated in FIG. 71B or 71C, the light source 20 may be configured of a plurality of light source blocks 25 that are arranged in a line, for example. In this case, when a gap between two adjacent light source blocks 25 is large, density of the openings H per unit area may be relatively larger in a place closer to the light source blocks 25 and may be relatively smaller in a place away from the light source blocks 25 in the direction parallel to the light entering surface 10A. As illustrated in FIGS. 75 and 77, the number of the openings H (having a constant radius) per unit area may be relatively larger in the place closer to the light source blocks 25 and may be relatively smaller in the place away from the light source blocks 25 in the direction parallel to the light entering surface 10A, for example. Moreover, as illustrated in FIGS. 76 and 78, the radii of the openings H may be relatively larger in the place closer to the light source blocks 25 and may be relatively smaller in the place away from the light source blocks 25 in the direction parallel to the light entering surface 10A, for example. In such a case, it is possible to suppress luminance in the place closer to the light source blocks 25 in the direction parallel to the light entering surface 10A compared to that in a case where no opening H is provided. It is also possible to increase luminance in the place away from the light source blocks 21 in the direction parallel to the light entering surface 10A, compared to that in the case where no opening H is provided. As a result, for example, in a case where the entire light exiting region of the illumination unit 1 is caused to be in a bright state, it may be possible to cause in-plane luminance to be uniform. For example, in a case where the patterning density in a place 2 mm away from the light entering surface 10A has distribution as illustrated by A in FIG. 91, it may be possible to cause the in-plane luminance to be uniform in the direction parallel to the light entering surface 10A as illustrated by A in FIG. 80. On the other hand, for example, in a case where the patterning density in the place 2 mm away from the light entering surface 10A has flat distribution as illustrated by B in FIG. 79, the in-plane luminance is largely varied in the direction parallel to the light entering surface 10A as illustrated by B in FIG. 80. It is to be noted that, in the present modification, in a case where the dot-like light source 23 is used instead of the light source block 25, the density of the openings H per unit area may be relatively larger in a place closer to the dot-like light source 23 and may be relatively smaller in a place away from the dot-like light source 23 in the direction parallel to the light entering surface 10A. It is possible to cause the in-plane luminance to be uniform in the direction parallel to the light entering surface 10A also in such a case.

[Modification 21]

In the embodiment and Modifications 1 to 20 described above, in a case where the respective linear electrodes 32D extend in one direction in the plane (the direction parallel to the light entering surface 10A), widths W1 of the linear electrodes 32B and widths W3 of the linear electrodes 32C may be different depending on the distance from the light source 20. As illustrated in FIG. 81, the widths W1 of the linear electrodes 32B and the widths W3 of the linear electrodes 32C may be relatively smaller in a place closer to the light source 20 and may be relatively larger in a place away from the light source 20, for example. In such a case, for example, in a case where the entire light exiting region of the illumination unit 1 is caused to be in a bright state, it may be possible to cause the in-plane luminance to be uniform. Moreover, for example, when white display is performed in a region closer to the light source 20 and in a region farther from the light source 20 in the direction orthogonal to the light entering surface 10A, it may be possible to cause white luminance in both of the regions to be equal to each other. It is to be noted that FIG. 81 illustrates, as an example, a case where the widths W1 and W3 (widths in the X-axis direction) of the linear electrodes 32B and 32C are different depending on the distance from the light source 20. Although not illustrated, in the respective linear electrode groups, widths in the Y-axis direction of the linear electrodes 32B and 32C may be different depending on the distance from the light source 20, and both of the widths in the X-axis direction and the widths in the Y-axis direction of the linear electrodes 32B and 32C may be different depending on the distance from the light source 20.

It is to be noted that, as illustrated in FIG. 82, the partial electrodes 32A that extend in one direction (the direction parallel to the light entering surface 10A) in the plane may be provided instead of the linear electrodes 32D. In such a case, for example, when the entire light exiting region of the illumination unit 1 is caused to be in a bright state, it may be possible to cause the in-plane luminance to be uniform. Moreover, for example, when white display is performed in a region closer to the light source 20 and in a region farther from the light source 20 in the direction orthogonal to the light entering surface 10A, it may be possible to cause white luminance in both of the regions to be equal to each other.

Alternatively, as illustrated in FIG. 83, the respective linear electrodes 32D may extend in the direction obliquely intersecting with the light entering surface 10A. It is possible to achieve an effect similar to that described above also in such a case. Here, the extending direction of the respective linear electrodes 32D may preferably extend in a direction intersecting with the arrangement direction of the pixels in the display panel 210 described later (see FIG. 96 described later). In such a case, it is possible to reduce a difference between resolution in a direction parallel to the normal to the light entering surface 10A and resolution in a direction parallel to the light entering surface 10A at the time of performing three-dimensional display. It is to be noted that FIG. 83 illustrates, as an example, a case where the linear electrode groups are not divided on the pitch P1 basis but are continuous in the direction orthogonal to the light entering surface 10A. It is to be noted that, as illustrated in FIG. 84, the linear electrode groups may be divided on the pitch P1 basis in the direction orthogonal to the light entering surface 10A. It is to be noted that FIGS. 83 and 84 each illustrate, as an example, a case where the widths W1 and W3 (widths in the X-axis direction) of the linear electrodes 32B and 32C are different depending on the distance from the light source 20 in the respective linear electrode groups. Although not illustrated, in the respective linear electrode groups, the widths in the Y-axis direction of the linear electrodes 32B and 32C may be different depending on the distance from the light source 20, or both of the widths in the X-axis direction and the widths in the Y-axis direction of the linear electrodes 32B and 32C may be different depending on the distance from the light source 20.

Alternatively, as illustrated in FIG. 85, the partial electrodes 32A that extend in the direction obliquely intersecting with the light entering surface 10A may be provided instead of the linear electrodes 32D. It is possible to achieve an effect similar to that described above also in such a case. It is to be noted that, FIG. 85 illustrates, as an example, a case where the linear electrode groups are not divided on the pitch P1 basis and extend continuously in the direction orthogonal to the light entering surface 10A. However, although not illustrated, the linear electrode groups may be divided on the pitch P1 basis. Moreover, FIG. 85 illustrates, as an example, a case in which the widths W1 and W3 of the linear electrodes 32B and 32C are different depending on the distance from the light source 20 in the respective linear electrode groups.

Alternatively, as illustrated in FIG. 86, the respective linear electrodes 32D may extend in the direction orthogonal to the light entering surface 10A. It is possible to achieve an effect similar to that described above also in such a case. It is to be noted that FIG. 86 illustrates, as an example, a case where the linear electrode groups are not divided in the direction orthogonal to the light entering surface 10A. However, although not illustrated, the linear electrode groups may be divided on a predetermined length basis. Moreover, FIG. 86 illustrates, as an example, a case where the widths W1 and W3 (widths in the Y-axis direction) of the linear electrodes 32B and 32C are different depending on the distance from the light source 20 in the respective linear electrode groups. It is to be noted that, although not illustrated, in the respective linear electrode groups, the widths in the X-axis direction of the linear electrodes 32B and 32C may be different depending on the distance from the light source 20, or both of the widths in the X-axis direction and the widths in the Y-axis direction of the linear electrodes 32B and 32C may be different depending on the distance from the light source 20.

Moreover, as illustrated in FIG. 87, the partial electrodes 32A that extend in the direction orthogonal to the light entering surface 10A may be provided instead of the linear electrodes 32D. It is possible to achieve an effect similar to that described above also in such a case. It is to be noted that, FIG. 87 illustrates, as an example, a case where the partial electrodes 32A are not divided in the direction orthogonal to the light entering surface 10A. However, although not illustrated, the partial electrodes 32A may be divided on a predetermined length basis. It is to be noted that, although not illustrated, in the respective linear electrode groups, the widths in the X-axis direction of the linear electrodes 32B and 32C may be different depending on the distance from the light source 20, or both of the widths in the X-axis direction and the widths in the Y-axis direction of the linear electrodes 32B and 32C may be different depending on the distance from the light source 20.

[Modification 22]

Moreover, in the embodiment and Modifications 1 to 21 described above, one or both of the transparent substrate 31 and the transparent substrate 37 may be formed integrally with the light guide plate 10. For example, in each of the embodiment, the first modification, and the second modification described above, in a case where the transparent substrate 37 is in contact with the light guide plate 10, the transparent substrate 37 may be formed integrally with the light guide plate 10 as illustrated in FIG. 88, for example. At this time, the transparent substrate 37 corresponds to a specific example of "first substrate" or "second substrate" in the present technology. Alternatively, in the embodiment and Modifications 1 to 21 described above, for example, in a case where the transparent substrate 31 is in contact with the light guide plate 10, the transparent substrate 31 may be formed integrally with the light guide plate 10 as illustrated in FIG. 89, for example. At this time, the transparent substrate 31 corresponds to a specific example of "first substrate" or "second substrate" in the present technology. Alternatively, in the embodiment and Modifications 1 to 21 described above, for example, in a case where both of the transparent substrates 31 and 37 are in contact with the light guide plate 10, the transparent substrates 31 and 37 may be formed integrally with the light guide plate 10 as illustrated in FIG. 90, for example. At this time, the transparent substrate 31 or the transparent substrate 37 corresponds to a specific example of "first substrate" or "second substrate" in the present technology.

[Modification 23]

Moreover, in each of the embodiment and Modifications 1 to 22 described above, a light reflection suppression layer may be provided instead of the reflection plate 40. The light reflection suppression layer may be a base having a top surface coated with a low reflectance material, or may be a base having a top surface coated with a material that absorbs light, for example. For example, as illustrated in FIG. 91, a light reflection suppression layer 90 may be provided instead of the reflection plate 40. The light reflection suppression layer 90 may be a base having a top surface coated with a low reflectance material, or may be a base having a top surface coated with a material that absorbs light, for example. By thus providing the light reflection suppression layer 90, it is possible to suppress a ratio to be low at which light reflected by the reflection plate 40 passes through the transmission region 30A and enters the display panel 210 in the case where the reflection plate 40 is provided. As a result, it is possible to increase contrast.

[Modification 24]

Moreover, in each of the embodiment and Modifications 1 to 23 described above, a horizontal alignment film is used as each of the alignment films 33 and 35. However, a vertical alignment film may be used. However, in such a case, a liquid crystal molecule (so-called negative liquid crystal) having negative dielectric constant anisotropy may be preferably used as the liquid crystal molecule included inside the microparticle 34B.

[Modification 25]

Moreover, in the embodiment and Modifications 1 to 24 described above, thicknesses of the transparent members (the transparent substrate 37 and the light guide plate 10) that are arranged on the light exiting surface 1A side in a relationship with the light modulation layer 34 may be reduced. In such a case, a light condensing rate is decreased, and a light emission line width (a width of the scattering region) in the illumination unit 1 is therefore reduced. As a result, in a case where the illumination unit 1 is used as a backlight of a display apparatus, it is possible to cause double images formed in the front direction of the display apparatus to be less likely to be seen at the time of performing three-dimensional display. Moreover, due to decrease in light condensing rate, the viewing angle in the parallax direction at the time of performing three-dimensional display is not reduced much by the lens sheet 50, and therefore has a sufficient size for practical use.

[3. Second Embodiment]

Description is provided of a receiving-transmitting system of a television broadcast signal that is provided with the illumination unit 1 according to any of the embodiment and Modifications 1 to 25 described above.

FIG. 92 is a block diagram illustrating a configuration example of a receiving-transmitting system of a television broadcast signal 100A according to a second embodiment of the present technology. The receiving-transmitting system may include, for example, a transmitter apparatus 100 and a receiver apparatus 200. The transmitter apparatus 100 may transmit a television broadcast signal via a wire (for example, cable television, etc.) or in a wireless manner (for example, a terrestrial digital wave, a satellite wave, etc.). The receiver apparatus 200 may receive the television broadcast signal from the transmitter apparatus 100 via a wire or in a wireless manner as described above. It is to be noted that the receiver apparatus 200 corresponds to a specific example of "display apparatus" in the present technology.

The television broadcast signal 100A includes picture data for two-dimensional display (planar display) or picture data for three-dimensional display (stereoscopic display). Here, the picture data for two-dimensional display refers to two-dimensional picture data having no perspective information. Further, the picture data for three-dimensional display refers to two-dimensional picture data having perspective information, and the picture data for three-dimensional display includes a plurality of pieces of two-dimensional picture data that have perspectives different from one another. The transmitter apparatus 100 may be, for example, a television broadcast signal transmitting apparatus provided in a broadcast station, a server on the Internet, etc.

(Functional Blocks of Receiver Apparatus 200)

FIG. 93 is a block diagram illustrating a configuration example of the receiver apparatus 200. The receiver apparatus 200 may be, for example, a television that is connectable to a wire or is connectable in a wireless manner described above. The receiver apparatus 200 may include, for example, an antenna terminal 201, a digital tuner 202, a demultiplexer 203, an arithmetic circuit 204, and a memory 205. The receiver apparatus 200 may also include, for example, a decoder 206, a picture signal processing circuit 207, a graphic generation circuit 208, a panel drive circuit 209, a display panel 210, a backlight 211, an audio signal processing circuit 212, an audio amplifier circuit 213, and a speaker 214. The receiver apparatus 200 may further include, for example, a remote control receiving circuit 215 and a remote control transmitter 216.

It is to be noted that the backlight 211 corresponds to the illumination unit 1 according to each of the embodiment and Modifications 1 to 25 described above. Further, the display panel 210 corresponds to a specific example of "display panel" in the present technology, and the backlight 211 corresponds to a specific example of "illumination unit" in the present technology.

The antenna terminal 201 is a terminal that inputs the television broadcast signal that has been received by a receiving antenna (not illustrated). The digital tuner 202 may be configured, for example, to process the television broadcast signal inputted to the antenna terminal 201, and to output a predetermined transport stream in correspondence with a channel selected by a user. The demultiplexer 203 may be configured, for example, to extract a partial TS (Transport Stream) in correspondence with the channel selected by the user out of the transport stream obtained by the digital tuner 202.

The arithmetic circuit 204 controls an operation of each section in the receiver apparatus 200. The arithmetic circuit 204 may be configured, for example, to store the partial TS obtained by the demultiplexer 203 in the memory 205, or to transmit the partial TS read from the memory 205 to the decoder 206. Further, the arithmetic circuit 204 may be configured, for example, to transmit a control signal 204A that designates two-dimensional display or three-dimensional display to the picture signal processing circuit 207 and the backlight 211. The arithmetic circuit 204 may be configured to set the above-described control signal 204A, for example, based on setting information stored in the memory 205, predetermined information included in the partial TS, or setting information inputted from the remote control receiving circuit 215.

The memory 205 may perform storage of the setting information and data management of the receiver apparatus 200, for example. The memory 205 may be capable, for example, of storing the partial TS obtained by the demultiplexer 203, the setting information such as a display method, etc.

The decoder 206 may be configured, for example, to obtain picture data by performing a decode process on a picture PES (Packetized Elementary Stream) packet included in the partial TS obtained by the demultiplexer 203. The decoder 206 may be also configured, for example, to obtain audio data by performing a decode process on an audio PES packet included in the partial TS obtained by the demultiplexer 203. Here, the picture data refers to picture data for two-dimensional display or picture data for three-dimensional display.

The picture signal processing circuit 207 and the graphic generation circuit 208 may be configured, for example, to perform a multiple image process, a superimposing process of graphic data, etc. on the picture data obtained by the decoder 206, on an as-necessary basis.

In a case where a signal designating three-dimensional display is inputted as the control signal 204A from the arithmetic circuit 204 and when the picture data inputted from the decoder 206 is the picture data for three-dimensional display, the picture signal processing circuit 207 may create one piece of two-dimensional picture data with the use of a plurality of pieces of two-dimensional picture data that have different perspectives and are included in the picture data for three-dimensional display inputted from the decoder 206, and may select the created two-dimensional picture data as picture data to be outputted to the graphic generation circuit 208. For example, in a case where two pieces of two-dimensional picture data having different perspectives are included in the picture data for three-dimensional display, the picture signal processing circuit 207 may perform, for each row, a process of arranging the two pieces of two-dimensional picture data alternately in the horizontal direction, and create one piece of picture data in which the two pieces of two-dimensional picture data are arranged alternately in the horizontal direction. Similarly, for example, in a case where four pieces of two-dimensional picture data having different perspectives are included in the picture data for three-dimensional display, the picture signal processing circuit 207 may perform, for each row, a process of arranging the four pieces of two-dimensional picture data cyclically one by one in the horizontal direction, and create one piece of picture data in which the four pieces of two-dimensional picture data are arranged cyclically one by one in the horizontal direction.

In a case where a signal designating two-dimensional display is inputted as the control signal 204A from the arithmetic circuit 204 and when the picture data inputted from the decoder 206 is the picture data for three-dimensional display, the picture signal processing circuit 207 may select, as picture data to be outputted to the graphic generation circuit 208, one of a plurality of pieces of two-dimensional picture data that have different perspectives and are included in the picture data for three-dimensional display inputted from the decoder 206, for example. In a case where a signal designating two-dimensional display is inputted as the control signal 204A from the arithmetic circuit 204 and when the picture data inputted from the decoder 206 is the picture data for two-dimensional display, the picture signal processing circuit 207 may select, as picture data to be outputted to the graphic generation circuit 208, the picture data for two-dimensional display inputted from the decoder 206, for example.

The graphic generation circuit 208 may be configured, for example, to generate a UI (User Interface) screen that is used at the time of performing screen display. The panel drive circuit 209 may be configured, for example, to drive the display panel 210 based on the picture data outputted from the graphic generation circuit 208.

A configuration of the display panel 210 is described later in detail. The audio signal processing circuit 212 may be configured, for example, to perform a process such as D-A conversion on audio data obtained by the decoder 206. The audio amplifier circuit 213 may be configured, for example, to amplify an audio signal outputted from the audio signal processing circuit 212 and to supply the amplified audio signal to the speaker 214.

The remote control receiving circuit 215 may be configured, for example, to receive a remote control signal transmitted from the remote control transmitter 216 and to supply the received remote control signal to the arithmetic circuit 204. The arithmetic circuit 204 may be configured, for example, to control each section in the receiver apparatus 200 based on the remote control signal.

(Cross-Sectional Configuration of Receiver Apparatus 200)

FIG. 94 illustrates an example of a cross-sectional configuration of a display section in the receiver apparatus 200. It is to be noted that illustration in FIG. 94 is schematic and may not be necessarily the same as actual dimensions, shapes, etc. The receiver apparatus 200 may include the display panel 210 and the backlight 211 that is arranged on the back of the display panel 210.

The display panel 210 generates picture light by modulating illumination light from the backlight 211 based on the picture signal. The display panel 210 includes a plurality of pixels that are arranged two-dimensionally, and displays a picture in response to drive of the respective pixels or specific pixels. The display panel 210 may be, for example, a transmission-type liquid crystal display panel (LCD (Liquid Crystal Display)) in which the respective pixels or specific pixels are driven in response to the picture signal, and may have a structure in which a liquid crystal layer is sandwiched by a pair of transparent substrates. Although not illustrated, the display panel 210 may include, for example, a polarizing plate, a transparent substrate, a pixel electrode, an alignment film, a liquid crystal layer, an alignment film, a common electrode, a color filter, a transparent substrate, and a polarizing plate in order from the backlight 211 side. It is to be noted that a laminate configured of the transparent substrate, the pixel electrode, the alignment film, the liquid crystal layer, the alignment film, the common electrode, the color filter, and the transparent substrate corresponds to a liquid crystal panel 210A illustrated in FIG. 95, in the display panel 210. Moreover, the polarizing plate on the backlight 211 side corresponds to a polarizing plate 210B illustrated in FIG. 95, and the polarizing plate on an opposite side from the backlight 211 corresponds to a polarizing plate 210C illustrated in FIG. 95.

The transparent substrate may be configured of a substrate that is transparent with respect to visible light, for example, a plate glass. It is to be noted that the transparent substrate on the backlight 211 side is formed with an active drive circuit that includes a TFT (Thin Film Transistor), wirings, etc. that are electrically connected to the pixel electrodes, which is not illustrated. The pixel electrode and the common electrode may each be configured, for example, of indium tin oxide (ITO). The pixel electrodes are arranged two-dimensionally on the transparent substrate, and serve as electrodes for the respective pixels. On the other hand, the common electrode is formed on a surface on the color filter, and serves as a common electrode that is opposed to the respective pixel electrodes. The alignment film may be configured, for example, of a polymer material such as polyimide, and performs an alignment process on liquid crystal.

The liquid crystal layer may be configured, for example, of liquid crystal of a VA (Vertical Alignment) mode, a TN (Twisted Nematic) mode, or an STN (Super Twisted Nematic) mode. The liquid crystal layer may have a function of varying direction of a polarization axis of light emitted from the backlight 211 for each of the pixels in response to a voltage applied from a drive circuit (not illustrated). It is to be noted that, by varying the alignment of the liquid crystal in multiple stages, a direction of a transmission axis in each of the pixels is adjusted in multiple stages. The color filter may include color filters that perform color separation into three primary colors of red (R), green (G), and blue (B) or into four colors of R, B, and white (W) and are arranged in correspondence with the arrangement of the pixel electrodes.

The polarizing plate is a kind of an optical shutter, and allows only light (polarized light) having a constant oscillation direction to pass therethrough. It is to be noted that the polarizing plate may be an absorption-type polarizer that absorbs light (polarized light) having an oscillation direction other than the transmission axis. However, the polarizing plate may be preferably a reflection-type polarizer that reflects such light toward the backlight 211 in view of improvement in luminance. The two polarizing plates are arranged so that polarization axes thereof are different from each other by 90°. Thus, light emitted from the backlight 211 is transmitted through the liquid crystal layer, or is blocked thereby.

By the way, in the present embodiment, when no voltage is applied, the optical axis AX1 of the bulk 34A and the optical axis AX2 of the microparticle 34B may preferably have components of the optical axes in the same direction mainly, and may be preferably aligned in rubbing directions of the alignment films 33 and 35 as illustrated in FIG. 95, for example. Moreover, when no voltage is applied, the optical axes AX1 and AX2 may preferably have components of optical axes in a direction parallel to a transmission axis AX10 of the polarizing plate 210B on the backlight 211 side mainly as illustrated in FIG. 95, for example. The transmission axis AX10 may be preferably aligned in the rubbing directions of the alignment films 33 and 35 as illustrated in FIG. 95, for example.

Moreover, when a voltage is applied, the optical axis AX1 may be preferably aligned in a direction same as or almost same as that at the time of no voltage application. When a voltage is applied, the optical axis AX1 mainly has a component of an optical axis in a direction parallel to the transmission axis AX10 of the polarizing plate 210B. As illustrated in FIG. 96, the optical axis AX1 may be preferably aligned in the direction parallel to the transmission axis AX10, for example. When a voltage is applied, the optical axis AX1 may be preferably aligned in a direction intersecting with or orthogonal to (or almost orthogonal to) an optical axis AX5 of the light source 20, and further may be preferably parallel or almost parallel to the transparent substrate 31.

On the other hand, the optical axis AX2 may be preferably displaced in a predetermined direction under an influence of an electric field generated by a voltage applied to the bottom electrode 32 and the top electrode 36 when a voltage is applied. When a voltage is applied, the optical axis AX2 may preferably intersect with or may be preferably orthogonal to (or almost orthogonal to) the transparent substrate 31 as illustrated in FIGS. 2 and 96, for example. In other words, the optical axis AX2 may be preferably displaced in a direction in which an angle formed by the optical axis AX2 and the normal to the transparent substrate 31 becomes smaller in response to the application of a voltage to the bottom electrode 32 and the top electrode 36. At this time, the optical axis AX2 may preferably intersect with or may be preferably orthogonal to (or almost orthogonal to) the optical axis AX1, and may preferably intersect with or may be preferably orthogonal to (or almost orthogonal to) the transparent substrate 31.

The backlight 211 corresponds to the illumination unit 1 according to each of the embodiment and the modifications thereof described above. Accordingly, the backlight 211 includes the lens sheet 50 above the light guide plate 10.

Next, description is provided of functions and effects of the receiver apparatus 200 of the present embodiment.

In the receiver apparatus 200 of the present embodiment, the illumination unit 1 or the illumination unit 2 according to the embodiment and the modifications thereof described above as the backlight 211. Accordingly, a plurality of linear illumination light rays are outputted in the front direction from a predetermined region in the light emitting surface of the backlight 211 at the time of performing three-dimensional display. This causes each of the linear illumination light rays outputted in the front direction to enter a back surface of the display panel 210.

Here, when the two-dimensional picture data for three-dimensional display is generated by the picture signal processing circuit 207 so that a pixel line of the pixels 210D for three-dimension is provided for each pixel arrangement (specifically, pixel lines of the number equal to the number of the perspectives) corresponding to each of the light modulation cell 30a (a part that can be a linear scattering region), the respective linear illumination light rays may enter, at almost the same angles, pixels (for example, 210-1, 210-2, 210-3, or 210-4 in FIG. 97) at common positions in the respective pixels 210D for three-dimension. As a result, from each of the pixels at the common positions in the respective pixels 210D for three-dimension, picture light that is modulated by the pixel is outputted at a predetermined angle. At this time, a viewer sees pictures having different parallaxes with one's right and left eyes, and therefore recognizes that a three-dimensional picture (stereoscopic picture) is displayed on the display panel 210.

Moreover, in the receiver apparatus 200 of the present embodiment, light is emitted from the entire light emitting surface of the backlight 211 and planar illumination light is outputted in the front direction at the time of performing two-dimensional display. Accordingly, the planar illumination light outputted in the front direction enters the back surface of the display panel 210.

Here, when the two-dimensional picture data for two-dimensional display is generated by the picture signal processing circuit 207 in correspondence with respective pixels 210E, for example, as illustrated in FIG 98, planar illumination light enters each of the pixels 210E at all angles and picture light modulated by each of the pixels 210E is outputted from each of the pixels 210E. At this time, the viewer sees the same picture with one's both eyes, and therefore recognizes that a two-dimensional picture (planar picture) is displayed on the display panel 210.

By the way, in the present embodiment, the lens sheet 50 is provided above the light guide plate 10 in the backlight 211. Accordingly, it is possible to increase luminance in the front direction, compared to that in a case where no lens sheet 50 is provided. As a result, it is possible to increase a light amount of light that enters the display panel 210 at an angle from 0° to an appropriate viewing angle (for example, 15°). Accordingly, it is possible to achieve high luminance in displayed picture.

[4. Modifications of Second Embodiment]
[Modification 1]

In the second embodiment described above, the lens sheet 50 may be fixed onto the polarizing plate 210B with the use of a gluing agent or an adhesive. At this time, as illustrated in FIG. 99, the flat surface of the lens sheet 50 may be preferably fixed onto the polarizing plate 210B with a fixing layer 212 made of a gluing agent or an adhesive in between, for example. Moreover, in a case where the convex portions 50A are formed by solidifying an energy-curable resin such as a UV-curable resin, the convex portions 50A may be formed directly on the surface of the polarizing plate 210B as illustrated in FIG. 100, for example.

[Modification 2]

In the second embodiment and the modification thereof described above, as illustrated in FIGS. 101 and 102, a parallax bather 80 may be provided on the light exiting side of the backlight 211, for example. As illustrated in FIG. 101, the parallax bather 80 may be preferably provided on the lens sheet 50. In this case, it is possible to reduce the divergence angle of light outputted from the backlight 211. This increases an amount of light that enters a light transmission portion of the parallax bather 80, and therefore achieves high luminance. In a case where the parallax bather 80 is provided on the lens sheet 50, the lens sheet 50 may be fixed onto a polarizing plate 81 of the parallax barrier 80 with the use of a gluing agent or an adhesive. Moreover, the convex portions 50A of the lens sheet 50 may be formed directly on the surface of the polarizing plate 81 of the parallax bather 80.

It is to be noted that, in some cases, the parallax barrier 80 may be provided between the lens sheet 50 and the light guide plate 10 as illustrated in FIG. 102, or may be provided between the light guide plate 10 and the convex portions 50A that are formed directly on the surface of the polarizing plate 210B, which is not illustrated.

When three-dimensional display is performed, the parallax bather 80 limits a light output region of the backlight 211 to regions opposed to the partial electrodes 36B or regions corresponding thereto, and blocks noise light that may be outputted from a region (for example, an end of the transmission region 30A) that is adjacent to the scattering region 30B. Also, when two-dimensional display is performed, the parallax bather 80 expands the light output region of the backlight 211 to a region opposed to a region in which the bottom electrode 32 is opposed to the top electrode 36 or to a region corresponding thereto, and causes light outputted from the light modulation device 30 to pass therethrough.

As illustrated in FIG. 103, the parallax barrier 80 may include, for example, the polarizing plate 81, a transparent substrate 82, a transparent electrode 83, an alignment film 84, a liquid crystal layer 85, an alignment film 86, a transparent electrode 87, a transparent substrate 88, and a polarizing plate 89 in order from the light guide plate 10 side.

The transparent substrates 82 and 88 may be each configured of a substrate that is transparent with respect to visible light, for example, a plate glass. It is to be noted that the transparent substrate on the light guide plate 10 side may be formed with an active drive circuit that includes a TFT, wirings, etc. that are electrically connected to the transparent electrode 83, which is not illustrated, for example. The transparent electrodes 83 and 87 may each be configured, for example, of ITO. As illustrated in FIG. 103, the transparent electrode 83 may be configured, for example, of a plurality of partial electrodes 83A. The partial electrodes 83A are formed on the transparent substrate 82.

The partial electrodes 83A have strip-like shapes that extend in one direction in a plane (in the direction parallel to the light entering surface 10A). A width of a plurality of specific partial electrodes 83B out of the partial electrodes 83A is smaller than a width of a plurality of partial electrodes 83C that are electrodes excluding the partial electrodes 83B from the partial electrodes 83A. The partial electrodes 83B are used to transmit or block linear illumination light when three-dimensional display is performed in the receiver apparatus 200. The partial electrodes 83B are arranged at a pitch P6 (a pitch same as or similar to the pixel pitch P2) that corresponds to the pixel pitch P2 (see FIG. 97) at the time of performing three-dimensional display in the receiver apparatus 200. The partial electrodes 83B and the partial electrodes 83C are arranged alternately in the arrangement direction (the direction orthogonal to the light entering surface 10A). It is to be noted that all of the partial electrodes 83A are used in order to generate planar illumination light when two-dimensional display is performed in the receiver apparatus 200.

The transparent electrode 87 is formed on a surface on the transparent substrate 88, and serves as a common electrode that is opposed to the respective partial electrodes 83A. The alignment films 84 and 86 may be each configured, for example, of a polymer material such as polyimide, and may perform an alignment process on liquid crystal. The liquid crystal layer 85 may be configured of liquid crystal of a VA mode, a TN mode, or an STN mode, and may have a function of varying the direction of the polarization axis of light from the light guide plate 10 side on the basis of a portion opposed to the partial electrode 73A in response to a voltage applied from the drive circuit 60, for example. The polarizing plates 81 and 89 are each a kind of an optical shutter, and allows only light (polarized light) having a constant oscillation direction to pass therethrough. It is to be noted that the polarizing plates 81 and 89 may be each an absorption-type polarizer that absorbs light (polarized light) having an oscillation direction other than the transmission axis. However, the polarizing plates 81 and 89 may be each a reflection-type polarizer that reflects such light toward the light guide plate 10. The polarizing plates 81 and 89 may be arranged so that polarization axes thereof are different from each other by 90°, or are parallel to each other. Thus, light from the light guide plate 10 side is transmitted through the liquid crystal layer 85, or is blocked thereby.

FIG. 104 illustrates an example of a cross-sectional configuration of the backlight 211 in which the parallax bather 80 is arranged on the illumination unit 1. In FIG. 104, the pitch P2 of the lens sheet is P1/4, and the pitch P6 is equal to P1. The convex portion 50A is arranged so that an apex of the convex portion 50A is at a position that is opposed to the light modulation cell 30a (or the light modulation cell 30b). The convex portion 50A may be preferably arranged so that the apex of the convex portion 50A is at a position that is opposed to middle of the light modulation cell 30a (or the light modulation cell 30*b*) in the width direction. Moreover, in the parallax bather 80, a light transmission portion 83B that is present between adjacent partial electrodes 83A is arranged at a position that allows the middle of the light transmission portion 83B in the width direction to be opposed to the light modulation cell 30*a* (or the light modulation cell 30*b*). The light transmission portion 83B may be preferably arranged so that middle of the light transmission section 83B in the width direction is at a position that is opposed to the middle of the light modulation cell 30*a* (or the light modulation cell 30*b*) in the width direction. Moreover, the convex portion 50A may be preferably arranged so that a focal point of the convex portion 50A is at positions of the light modulation cell 30*a* (or the light modulation cell 30*b*) and the light transmission portion 83B. In such a case, light that has exited the light modulation cell 30*a* (or the light modulation cell 30*b*) is collected onto the light transmission portion 83B by the convex portion 50A. Accordingly, it is possible to increase luminance while using the parallax bather 80.

When a signal designating three-dimensional display is inputted as the control signal 204A, the drive circuit 60 causes the parallax bather 80 to serve as a slit-like light transmission section. Specifically, the drive circuit 60 applies a voltage, that causes the parallax bather 80 to exhibit transmission characteristics, to a plurality of specific partial electrodes 83B out of the partial electrodes 73A, and applies a voltage, that causes the parallax barrier 80 to exhibit light blocking characteristics, to a plurality of partial electrodes 83C that are electrodes excluding the partial electrodes 83B from the partial electrodes 83A.

Moreover, when a signal designating two-dimensional display is inputted as the control signal 204A, the drive circuit 60 causes the parallax bather 80 as a whole to serve as a light transmission section. Specifically, the drive circuit 60 is configured to apply, to the respective partial electrodes 83A, a voltage that causes the parallax bather 80 to exhibit transmission characteristics.

In the present modification, the parallax barrier 80 is provided on the light exiting side of the backlight 211. Accordingly, it is possible to block noise light that may be outputted from a region adjacent to the scattering region 30B when a plurality of linear illumination light rays are outputted from the light modulation device 30. Thus, it is possible to reduce light that enters each of the pixels 210-1, 210-2, 210-3, or 210-4 (see FIG. 96) at an angle different from an angle at which each of the linear illumination light rays enters when three-dimensional display is performed. As a result, it is possible to achieve a clear three-dimensional picture.

[Modification 3]

In the second embodiment and the modifications thereof described above, when three-dimensional display is performed, as illustrated by a thick frame in FIG. 105A, four pixels 210-1 to 210-4 in the display panel 210 may be driven as one pixel 210D for three-dimension, for example. At this time, as illustrated in FIG. 105B, the backlight 211 may form each of the scattering regions 30B for each of the pixels 210D for three-dimension, and may allow light of the backlight to enter the respective pixels 210-1 to 210-4 at entering angles different from one another. Thus, the respective strip-like illumination light rays enter the pixels (for example, 210-1, 210-2, 210-3, or 210-4 in FIG. 97) at the common positions in the respective pixels 210D for three-dimension at almost the same angles. As a result, from each of the pixels at the common positions in the respective pixels 210D for three-dimension, picture light modulated by that pixel is outputted at a predetermined angle. At this time, a viewer may see picture light from a pixel 210*a* illustrated in FIG. 105C with one's right eye, and may see picture light from a pixel 201*a* illustrated in FIG. 105D with one's left eye, at the same time, for example. In other words, the viewer sees pictures having parallaxes different from each other with one's right and left eyes. As a result, the viewer recognizes that a three-dimensional picture (stereoscopic picture) is displayed on the display panel 210.

Here, comparing the pixel pitch Px in the lateral direction to the pixel pitch Py in the vertical direction, the pixel pitch Py in the vertical direction is several times larger than the pixel pitch Px in the lateral direction. For this reason, the viewer sees a picture that has a large difference in pixel pitch between the vertical direction and the lateral direction. At this time, the viewer may feel degradation in picture quality in some cases.

Accordingly, for example, as illustrated in FIG. 106A, the respective scattering regions 30B may be arranged to be shifted in left-right direction (the Y-axis direction) by a width of the pixel 210*a* in a relationship with other adjacent scattering regions 30B. In such a case, as illustrated in FIG. 106B, the pixel pitch Px in the lateral direction is allowed to be closer to the pixel pitch Py in the vertical direction compared to those in FIGS. 105C and 105D. As a result, it is possible to suppress degradation in picture quality.

It is to be noted that, as illustrated in FIG. 107A, the respective scattering regions 30B may be arranged in an oblique stripe shape. As illustrated in FIG. 107B, also in such a case, the pixel pitch Px in the lateral direction is allowed to be closer to the pixel pitch Py in the vertical direction compared to those in FIGS. 105C and 105D. As a result, it is possible to suppress degradation in picture quality. Incidentally, in a case of a display panel having a panel size of 3.5 inches and the number of pixels of 800×480×3 (RGB), a tilt angle of each of the scattering regions 30B is 71.57° in a case of four parallaxes.

[Modification 4]

Moreover, in the second embodiment and the modifications thereof described above, a drive circuit (not illustrated) that drives the display panel 210 may drive the display panel 210 in a time-divisional manner. In this case, a drive circuit 50 switches a place from which strip-like illumination light from the backlight 211 is outputted in synchronization with sequential switching of display on the display panel 210 on a one-pixel-row basis in pixel rows of the number equal to the number of parallaxes in a predetermined cycle. To give an example, in a case where the number of perspectives is 4, as illustrated in FIGS. 108, 109, 110, and 111 in order, the drive circuit 50 switches the place from which strip-like illumination light from the backlight 211 is outputted in synchronization with sequential switching of display on the display panel 210 on a one-pixel-row basis in four pixel rows in one frame period (1/60 second). At this time, the drive circuit (not illustrated) that drives the display panel 210 applies voltages in correspondence with the picture signal to the respective pixels so that the display on the display panel 210 is sequentially switched on a one-pixel-row basis in pixel rows of the number equal to the number of parallaxes in one frame period (1/60 second). By thus performing the switching operation at high speed, a viewer is caused to perceive pixels of the number four times the number of pixels that are emitting light at a moment, which increase substantial resolution.

It is to be noted that, in the case of performing such drive, as illustrated in FIG. 16 or 17, P2=P1/N may be preferably established where N is the number of perspectives. At this time, the convex portions 50A arranged on a matrix are always arranged at positions that are opposed to the strip-like illumination light rays also in a case where the place from which the strip-like illumination light is outputted is switched. Accordingly, it is possible to improve front luminance.

[Modification 5]

Moreover, in the second embodiment and the modifications thereof described above, for example, as illustrated in FIGS. 112 and 113, the optical axis AX1 of the backlight 211 and the transmission axis AX10 of the polarizing plate 210B may be aligned in a direction in which the optical axis AX1 and the transmission axis AX10 are orthogonal to or intersect with each other. However, in such a case, the transmitter apparatus 100 may preferably include a half-wave plate 217 between the backlight 211 and the polarizing plate 210B. The half-wave plate 217 has an optical axis AX12 that is aligned in a direction parallel to a bisector of an angle formed by the optical axis AX1 and the transmission axis AX10. In this case, the half-wave plate 217 causes a polarization direction of polarized light emitted from the backlight 211 to rotate in a direction parallel to the transmission axis AX10. As a result, it is possible to increase utilization efficiency of light.

It is to be noted that, at this time, the lens sheet 50 may be attached to the half-wave plate 217 with the use of a gluing agent or an adhesive. For example, the flat surface of the lens sheet 50 may be preferably fixed to the half-wave plate 217 with a fixing layer in between. The fixing layer may be made of a gluing agent or an adhesive. Alternatively, in a case where the convex portions 50A are formed by solidifying an energy-curable resin such as a UV-curable resin, for example, the convex portions 50A may be formed directly on the surface of the half-wave plate 217.

[5. Examples]

Next, Examples of the illumination unit 1 according to each of the embodiments described above are described in comparison to comparative examples. Configurations of Examples 1 to 7 and Comparative examples 1 and 2 are summarized in Table 1 below.

TABLE 1

| | | Lens | | | | | |
|---|---|---|---|---|---|---|---|
| | Shape | Concave-convex | Pitch Px (μm) | Curvature radius Rx (μm) | Aspherical surface characteristics | Pitch Py (μm) | Curvature radius Ry (μm) | Aspherical surface characteristics |
| Example 1 | Curved surface | Convex downward | 60 | 30 | −10 | 100 | 177 | 0 |
| Example 2 | Curved surface | Convex downward | 60 | 30 | −10 | 100 | 100 | 0 |
| Example 3 | Curved surface | Convex downward | 60 | 30 | −10 | 100 | 100 | −10 |
| Example 4 | Curved surface | Convex downward | 60 | 30 | −10 | 100 | 60 | 0 |
| Example 5 | Curved surface | Convex downward | 60 | 30 | −10 | 100 | 60 | −3 |
| Example 6 | Curved surface | Convex downward | 60 | 100 | −10 | 100 | 60 | −3 |
| Comparative example 1 | No lens | — | — | — | — | — | — | — |
| Example 7 | Curved surface | Convex downward | 60 | 30 | −10 | 100 | 177 | 0 |
| Comparative example 2 | No lens | — | — | — | — | — | — | — |

| | Electrode | | | Distance between lens and light emission section (μm) | Front luminance (Ratios in Examples 1-6 compared to Comparative example 1) (Ratio in Example 7 compared to Comparative example 2) | | Line width in 3D parallax direction at the time of 3D display (μm) |
|---|---|---|---|---|---|---|---|
| | Arrangement | Width Wx (μm) | Width Wy (μm) | | 3D | 2D | |
| Example 1 | Dot-like | 33 | 50 | 100 | 156% | 169% | 57 |
| Example 2 | Dot-like | 33 | 50 | 100 | 175% | 187% | 57 |
| Example 3 | Dot-like | 33 | 50 | 100 | 163% | 175% | 57 |
| Example 4 | Dot-like | 33 | 50 | 100 | 166% | 179% | 57 |
| Example 5 | Dot-like | 33 | 50 | 100 | 182% | 196% | 57 |
| Example 6 | Dot-like | 33 | 50 | 100 | 176% | 187% | 45 |
| Comparative example 1 | Dot-like | 33 | 50 | — | 100% | 100% | 39 |
| Example 7 | Linear | 33 | — | 100 | 140% | 151% | 57 |
| Comparative example 2 | Linear | 33 | — | — | 100% | 100% | 39 |

In Example 1, a dot-like ITO film array having a width Wx in an X-axis direction of 33 µm, a pitch Px in the X-axis direction of 60 µm, a width Wy in a Y-axis direction of 50 µm, and a pitch Py in the Y-axis direction of 100 µm was arranged on a glass substrate (having a thickness of 700 µm) having a size of 50 mm×72 mm. Here, the X-axis direction is a direction orthogonal to the light entering surface 10A, and is a parallax direction at the time of performing 3D display. The Y-axis direction is a direction parallel to the light entering surface 10A. Because Example 1 has four parallaxes, one out of four pixels is turned on at the time of performing 3D display in an arrangement in the X-axis direction in which arrangement is made at Px of 60 µm where a pitch of the 3D-display electrodes (linear electrodes 32B) is 240 µm. Moreover, a planar ITO film was formed on another glass substrate (having a thickness of 100 µm) different from the glass substrate mentioned above, and the two glass substrates were attached to each other so that a cell gap was 4 µm. The light guide plate 10 including the light modulation device 30 was thus configured.

Moreover, in Example 1, the reflection plate 40 was arranged on the bottom side of the light guide plate 10 with an air interface in between, and the lens sheet 50 was arranged on the top side of the light guide plate 10 with an air interface in between. As the reflection plate 40, a reflection sheet that exhibited retroreflection characteristics was arranged. The lens sheet 50 had a three-dimensional curved surface shape that was convex on the light guide plate 10 side (convex downward). The lens sheet 50 was arranged to be opposed to the above-described dot-like ITO film array at the pitch Px in the X-axis direction of 60 µm and at the pitch Py in the Y-axis direction of 100 µm. At this time, a distance between the lens and the light emission section was equal to the thickness 100 µm of the glass substrate on the top side. In Examples 1 to 6, evaluation was performed on shapes having designs as shown in Table 1 based on the anamorphic aspherical surface expression in Numerical expression 1. In Comparative example 1, a configuration same as the configuration in Example 1 was employed except for that no lens sheet 50 was provided on the top side of the light guide plate 10.

In Examples 1 to 6, it was confirmed that front luminance was increased by 156% or more in 3D display, and by 169% or more in 2D display in the lens sheet 50 having each of the shapes, due to the effect of the lens sheet 50, compared to that in Comparative example 1. Moreover, in Example 6, Rx was larger than Px, which causes a moderate curved surface. Accordingly, the line width in a 3D parallax direction at the time of performing 3D display was 45 µm, which was smaller than line widths in other Examples (57 µm). It was confirmed that this achieves a clearer 3D image. It is to be noted that the line width in the 3D parallax direction at the time of performing 3D display is over Px (60 µmm), light remarkably enters an adjacent pixel, which may cause double images to be worse.

In Example 7, the same was performed as in Example 1 except for arranging a linear ITO film that extended in the Y direction and having the width Wx in the X direction of 33 µm and the pitch Px in the X direction of 60 µm on a glass substrate (having a thickness of 700 µm) having a size of 50 mm×72 mm. In Comparative example 1, a configuration same as the configuration in Example 7 was employed except for that no lens sheet was provided on the top side of the light guide plate 10. In Example 7, it was confirmed that front luminance was increased by 140% in 3D display, and by 151% in 2D display due to the effect of the lens sheet, compared to that in Comparative example 2.

Moreover, for example, the present technology may achieve the following configurations.

(1)

An illumination unit used in a display apparatus provided with the illumination unit that is allowed to output illumination light and a display panel configured to modulate the illumination light based on a picture signal and thereby generate picture light, the illumination unit, including:

an illumination optical system configured to generate the illumination light; and a plurality of lenses configured to reduce a divergence angle of the illumination light, the illumination optical system including a first substrate and a second substrate arranged to be separated from each other and to be opposed to each other, a light source configured to apply light onto an end surface of one of the first substrate and the second substrate, a light modulation layer provided in a gap between the first substrate and the second substrate and configured to exhibit scattering characteristics or transparent characteristics, with respect to the light from the light source, depending on magnitude of an electric field, and an electrode configured to generate an electric filed that generates, in the light modulation layer, a plurality of linear scattering regions or a plurality of first dot-like scattering regions in a three-dimensional display mode, and to generate an electric field that generates, in the light modulation layer, a planar scattering region or a plurality of second dot-like scattering regions in a two-dimensional display mode, the first dot-like scattering regions being arranged side by side in a plurality of lines, and the second dot-like scattering regions being arranged side by side in a matrix, and the lenses being arranged side by side in one of a direction in which the linear scattering regions extend, a direction in which the first dot-like scattering regions are arranged side by side in the respective lines, and a direction in which the second dot-like scattering regions are arranged side by side in the respective lines, the lenses also being arranged side by side in a direction intersecting with one of the direction in which the linear scattering regions extend, the direction in which the first dot-like scattering regions are arranged side by side in the respective lines, and the direction in which the second dot-like scattering regions are arranged side by side in the respective lines.

(2)

The illumination unit according to (1), wherein each of the lenses includes a curved surface in one of a light entering surface and a light exiting surface thereof.

(3)

The illumination unit according to (1) or (2), wherein each of the lenses has a convex shape, and the respective lenses are arranged to cause apex positions thereof to be opposed to the linear scattering regions, the first dot-like scattering regions that are arranged side by side in the respective lines, or the second dot-like scattering regions that are arranged side by side in the respective lines.

(4)

The illumination unit according to (3), wherein the lenses have a pitch represented by P1/n where P1 is a pitch of the linear scattering regions, the first dot-like scattering regions that are arranged side by side in the respective lines, or the second dot-like scattering regions that are arranged side by side in the respective lines, and n is number of perspectives in the three-dimensional display mode.

(5)

The illumination unit according to (3) or (4), wherein
the electrode is configured to generate an electric field that generates, in the light modulation layer, the first dot-like scattering regions that are arranged side by side in the lines in the three-dimensional display mode, and
the respective lenses are arranged to cause each of the lenses to correspond to one of the first dot-like scattering regions in a one-to-one relationship.

(6)

The illumination unit according to any one of (3) to (5), wherein
the electrode is configured to generate an electric field that generates, in the light modulation layer, the second dot-like scattering regions that are arranged side by side in the matrix in the two-dimensional display mode, and
the respective lenses are arranged to cause each of the lenses to correspond to one of the second dot-like scattering regions in a one-to-one relationship.

(7)

The illumination unit according to any one of (1) to (6), wherein the lenses are configured of a material having an isotropic refractive index.

(8)

The illumination unit according to any one of (3) to (7), wherein the lenses protrude toward the light modulation layer.

(9)

The illumination unit according to (8), wherein
the display panel includes a polarizing plate, and
the lenses are fixed onto the polarizing plate.

(10)

A display apparatus, including:
an illumination unit allowed to output illumination light; and
a display panel configured to modulate the illumination light based on a picture signal and thereby generate picture light,
the illumination unit including
an illumination optical system configured to generate the illumination light, and
a plurality of lenses configured to reduce a divergence angle of the illumination light,
the illumination optical system including
a first substrate and a second substrate arranged to be separated from each other and to be opposed to each other,
a light source configured to apply light onto an end surface of one of the first substrate and the second substrate,
a light modulation layer provided in a gap between the first substrate and the second substrate and configured to exhibit scattering characteristics or transparent characteristics, with respect to the light from the light source, depending on magnitude of an electric field, and
an electrode configured to generate an electric filed that generates, in the light modulation layer, a plurality of linear scattering regions or a plurality of first dot-like scattering regions in a three-dimensional display mode, and to generate an electric field that generates, in the light modulation layer, a planar scattering region or a plurality of second dot-like scattering regions in a two-dimensional display mode, the first dot-like scattering regions being arranged side by side in a plurality of lines, and the second dot-like scattering regions being arranged side by side in a matrix, and
the lenses being arranged side by side in one of a direction in which the linear scattering regions extend, a direction in which the first dot-like scattering regions are arranged side by side in the respective lines, and a direction in which the second dot-like scattering regions are arranged side by side in the respective lines, the lenses also being arranged side by side in a direction intersecting with one of the direction in which the linear scattering regions extend, the direction in which the first dot-like scattering regions are arranged side by side in the respective lines, and the direction in which the second dot-like scattering regions are arranged side by side in the respective lines.

This application claims the priority on the basis of Japanese Patent Application JP 2012-176490 filed Aug. 8, 2012 in Japan Patent Office, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An illumination unit used in a display apparatus provided with the illumination unit that is allowed to output illumination light and a display panel configured to modulate the illumination light based on a picture signal and thereby generate picture light, the illumination unit, comprising:
an illumination optical system configured to generate the illumination light; and
a plurality of lenses configured to reduce a divergence angle of the illumination light, the illumination optical system including
a first substrate and a second substrate arranged to be separated from each other and to be opposed to each other,
a light source configured to apply light onto an end surface of one of the first substrate and the second substrate,
a light modulation layer provided in a gap between the first substrate and the second substrate and configured to exhibit scattering characteristics or transparent characteristics, with respect to the light from the light source, depending on magnitude of an electric field, and
an electrode configured to generate an electric field that generates, in the light modulation layer, a plurality of first dot-like scattering regions in a three-dimensional display mode, and to generate an electric field that generates, in the light modulation layer, a plurality of second dot-like scattering regions in a two-dimensional display mode, the first dot-like scattering regions being arranged side by side in a plurality of lines having a pitch between the lines that is based on a number of perspectives in the three-dimensional display mode, and the second dot-like scattering regions being arranged side by side in a matrix, and
the lenses being arranged side by side in a first direction, the first direction being a direction in which the first dot-like scattering regions are arranged side by side in the respective lines, and the lenses also being arranged side by side in a second direction intersecting with the first direction, wherein the respective lenses are arranged to cause each of the lenses to correspond to one of the first dot-like scattering regions in a one-to-one relationship and wherein a pitch between the lenses in the first direction is based on the pitch between the lines of the plurality of lines of the first dot-like scattering regions.

2. The illumination unit according to claim 1, wherein each of the lenses includes a curved surface in one of a light entering surface and a light exiting surface thereof.

3. The illumination unit according to claim 2, wherein each of the lenses has a convex shape, and the respective lenses are arranged to cause apex positions thereof to be opposed to the linear scattering regions, the first dot-like scattering regions that are arranged side by side in the respective lines, or the second dot-like scattering regions that are arranged side by side in the respective lines.

4. The illumination unit according to claim 3, wherein the lenses have a pitch represented by P1/n where P1 is a pitch of the linear scattering regions, the first dot-like scattering regions that are arranged side by side in the respective lines, or the second dot-like scattering regions that are arranged side by side in the respective lines, and n is number of perspectives in the three-dimensional display mode.

5. The illumination unit according to claim 3, wherein
the electrode is configured to generate an electric field that generates, in the light modulation layer, the first dot-like scattering regions that are arranged side by side in the lines in the three-dimensional display mode.

6. The illumination unit according to claim 3, wherein
the electrode is configured to generate an electric field that generates, in the light modulation layer, the second dot-like scattering regions that are arranged side by side in the matrix in the two-dimensional display mode.

7. The illumination unit according to claim 1, wherein the lenses are configured of a material having an isotropic refractive index.

8. The illumination unit according to claim 3, wherein the lenses protrude toward the light modulation layer.

9. The illumination unit according to claim 8, wherein
the display panel includes a polarizing plate, and
the lenses are fixed onto the polarizing plate.

10. A display apparatus, comprising:
an illumination unit allowed to output illumination light; and
a display panel configured to modulate the illumination light based on a picture signal and thereby generate picture light,
the illumination unit including
an illumination optical system configured to generate the illumination light, and
a plurality of lenses configured to reduce a divergence angle of the illumination light, the illumination optical system including
a first substrate and a second substrate arranged to be separated from each other and to be opposed to each other,
a light source configured to apply light onto an end surface of one of the first substrate and the second substrate,
a light modulation layer provided in a gap between the first substrate and the second substrate and configured to exhibit scattering characteristics or transparent characteristics, with respect to the light from the light source, depending on magnitude of an electric field, and
an electrode configured to generate an electric field that generates, in the light modulation layer, a plurality of first dot-like scattering regions in a three-dimensional display mode, and to generate an electric field that generates, in the light modulation layer, a plurality of second dot-like scattering regions in a two-dimensional display mode, the first dot-like scattering regions being arranged side by side in a plurality of lines having a pitch between the lines that is based on a number of perspectives in the three-dimensional display mode, and the second dot-like scattering regions being arranged side by side in a matrix, and
the lenses being arranged side by side in a first direction, the first direction being a direction in which the first dot-like scattering regions are arranged side by side in the respective lines, and the lenses also being arranged side by side in a second direction intersecting with the first direction, wherein the respective lenses are arranged to cause each of the lenses to correspond to one of the first dot-like scattering regions in a one-to-one relationship and wherein a pitch between the lenses in the first direction is based on the pitch between the lines of the plurality of lines of the first dot-like scattering regions.

* * * * *